United States Patent
Abdur-Rashid et al.

(10) Patent No.: US 8,518,368 B2
(45) Date of Patent: Aug. 27, 2013

(54) METHOD FOR THE PRODUCTION OF HYDROGEN FROM AMMONIA BORANE

(75) Inventors: Kamaluddin Abdur-Rashid, Mississauga (CA); Todd Graham, York (CA); Chi-Wing Tsang, Toronto (CA); Xuanhua Chen, Mississauga (CA); Rongwei Guo, Mississauga (CA); Wenli Jia, Mississauga (CA); Dino Amoroso, Binbrook (CA); Christine Sui-Seng, Toronto (CA)

(73) Assignee: Kanata Chemical Technologies Inc., Toronto, Ontario (CA)

( * ) Notice: Subject to any disclaimer, the term of this patent is extended or adjusted under 35 U.S.C. 154(b) by 458 days.

(21) Appl. No.: 12/600,712

(22) PCT Filed: May 16, 2008

(86) PCT No.: PCT/CA2008/000943
§ 371 (c)(1),
(2), (4) Date: Dec. 6, 2010

(87) PCT Pub. No.: WO2008/141439
PCT Pub. Date: Nov. 27, 2008

(65) Prior Publication Data
US 2011/0070152 A1    Mar. 24, 2011

Related U.S. Application Data

(60) Provisional application No. 60/938,912, filed on May 18, 2007.

(51) Int. Cl.
*C01B 3/08* (2006.01)
*B01J 19/00* (2006.01)
*H01M 8/06* (2006.01)

(52) U.S. Cl.
USPC ......... 423/657; 423/648.1; 422/129; 429/421

(58) Field of Classification Search
None
See application file for complete search history.

(56) References Cited

U.S. PATENT DOCUMENTS

| | | | |
|---|---|---|---|
| 4,315,786 A | 2/1982 | English et al. | |
| 4,468,263 A | 8/1984 | Artz et al. | |
| 5,198,207 A | 3/1993 | Knott et al. | |
| 6,534,033 B1 | 3/2003 | Amendola et al. | |
| 7,285,142 B1 | 10/2007 | Mohajeri et al. | |
| 2006/0292068 A1 | 12/2006 | Stephens et al. | |
| 2007/0020172 A1 | 1/2007 | Withers-Kirby | |

(Continued)

FOREIGN PATENT DOCUMENTS

| JP | 2006213563 | 8/2006 |
|---|---|---|
| WO | WO 2007106459 | 9/2007 |

OTHER PUBLICATIONS

A high-performance hydrogen generation system: Transition metal-catalyzed dissociation and hydrolysis of ammonia-borane. Manish Chandra, Qiany Xu Journal of Power Sources 156 (2006) 190-194.*

(Continued)

*Primary Examiner* — Stanley Silverman
*Assistant Examiner* — Douglas Call
(74) *Attorney, Agent, or Firm* — Bereskin & Parr LLP/S.E.N.C.R.L., s.r.l.; Michael Fenwick

(57) ABSTRACT

The present disclosure relates to processes and methods of generating hydrogen via the hydrolysis or solvolyis of a compound of the formula (I), $R^1R^2HNBHR^3R^4$, using ligand-stabilized homogeneous metal catalysts.

40 Claims, 18 Drawing Sheets

(56) References Cited

U.S. PATENT DOCUMENTS

| | | |
|---|---|---|
| 2007/0025908 A1 | 2/2007 | Sandrock et al. |
| 2007/0062115 A1 | 3/2007 | Berry et al. |
| 2007/0068071 A1 | 3/2007 | Kelly et al. |
| 2007/0084115 A1 | 4/2007 | Berry et al. |

OTHER PUBLICATIONS

Room temperature hydrogen generation fom aqueous ammonia-borane using noble metal nano-clusters as highly active catalysts. Manish Chandra, Qiang Xu Journal of Power Sources 168 (2007)135-142.*

Chandra, M.; Xu. Q. J. Power Sciences, 2006, 156, 190-194.

Chandra, M.; Xu, Q. J. Power Sources 2006, 159, 855-860.

Xu, Q. J.; Chandra, M.; Power Sources 2006, 163, 364.

Chandra, M.; Xu, Q. J. Power Sources 2007, 168, 135-142.

Clarke, Z. E.; Maragh, P. T.; Dasgupta, T. P.; Gusev, D. G.; Lough, A. J.; Abdur-Rashid, K. Organometallics 2006, 25, 4113-4117.

Clark, T. J.; Whittel, G. R.; Manners, I. Inorg. Chem. 2007, 46, 7522-7527.

Denney, M. C.; Pons, V.; Hebden, T. J.; Heinekey, D. M.; Goldberg, K. I. J. Am. Chem. Soc. 2006, 128, 12048-12049.

Diyabalanage, H. V. K.; Shrestha, R. P.; Semelsberger, T. A.; Scott, B. L.; Bowden, M. E.; Davis, B. L.; Burrell, A. K. Angew. Chem. Int. Ed. 2007, 46, 8995-8997.

Diwan, M.; Diakov, V.; Shafirovich, E.; Varma, A. Int. J. Hydrogen Energy 2008, 33, 1135-1141.

Göttker-Schnetmann, I.; White, P.; Brookhart, M. J. Am. Chem. Soc. 2004, 126, 1804-1811.

Keaton, Richard J.; Blacquiere, Johanna M. and Baker R. Tom; J. Amer. Chem. Soc. 2007, 129:1844-1845.

Mohajeri, M.; T-Raissi, A.; Adebiyi, O. J. Power Sources 2007, 167, 482-485.

Morales-Morales, D.; Redon, R.; Yung, C.; Jensen, C. M. Inorganica Chimica Acta 2004, 357, 2953-2956.

Ramachandran, P. V.; Gagare, P. D. Inorg. Chem. 2007, 46, 7810-7817.

Stephens, F. H.; Baker, R. T.; Matus, M. H.; Grant, D. J.; Dixon, D. A. Angew, Chem. Int. Ed. 2007, 46, 746-749.

Xiong, Z.; Yong, W. K.; Wu, G.; Chen, P.; Shaw, W.; Karkamkar, A.; Autrey, T.; Jones, M. O.; Johnson, S. R.; Edwards, P. P.; David, W. I. F. Nature Materials 2008, 7, 138.

Xu, Q.; Chandra, M. J. Alloys Cmpd. 2007, 446-447, 729-732.

Yan, Jun-Min et al. Angew. Chem., Int. Ed. 2008, 47, 2287-2289.

Yoon, C. W.; Sneddon, L. G. J. Am. Chem. Soc. 2006, 128, 13993-13992.

Zhang, X.-B.; Han, S.; Yan, J.-M.; Chandra, M.; Shioyama, H.; Yasuda, K.; Kuriyama, N.; Kobayashi, T.; Xu, Q. J. Power Sources 2007, 168, 167-171.

\* cited by examiner

METHOD FOR THE PRODUCTION OF HYDROGEN FROM AMMONIA BORANE

CROSS REFERENCE TO RELATED APPLICATIONS

This is a national stage application of PCT/CA2008/000943, filed May 16, 2008, which claims priority from U.S. Provisional patent application serial number 60/938,912 filed May 18, 2007, both of which are incorporated herein by reference in their entirety.

FIELD OF THE DISCLOSURE

The present disclosure relates to methods of producing hydrogen, in particular from the transition-metal catalyzed hydrolysis or solvolysis of ammonia borane and its derivatives.

BACKGROUND

The world is currently experiencing a severe environmental crisis due to high atmospheric carbon dioxide levels, in addition to an impending energy shortage. Both of these problems are a direct result from excessive fossil fuel utilization. The use of hydrogen ($H_2$) as a fuel offers one highly attractive solution to these problems since the combustion of hydrogen (in a fuel cell, for example) produces only water and hence is free of emissions containing carbon and other pollutants.

Hydrogen gas contains more energy per mass unit than any known combustible fuel (approximately three times as much as gasoline). However, the use of hydrogen as a fuel has some drawbacks, since under ambient conditions it is an extremely low density gas. Hydrogen can be liquefied, cryogenically or with very high pressures (b.p., 1 atm.: $-253°$ C.). These extreme conditions limit the potential widespread and large scale use of hydrogen.

A simple solution to these problems is to store the hydrogen chemically in a material that contains a very high weight percentage of hydrogen in a system that is capable of releasing the hydrogen on demand. Various compounds are known that contain a high gravimetric amount of hydrogen. Many of these compounds (e.g. lithium hydride (LiH, 12.8 wt % hydrogen) or lithium aluminum hydride ($LiAlH_4$, 10.6 wt % hydrogen)) or alane ($AlH_3$, 9 wt % hydrogen, Sandrock, G.; Reilly, J.; Graetz, J.; Wegrzyn, J. "Activated Aluminum Hydride Hydrogen Storage Compositions and Uses Thereof" U.S. Patent Application Publication No. 2007-0025908) suffer from being highly reactive or even potentially explosive and thus it is unlikely that commercial applications utilizing these compounds will be developed. Hydrogen generation by hydrolysis of magnesium hydride ($MgH_2$) is a safer method but usage of metal hydrides will be problematic due to their inherent water sensitivity (U.S. Pat. No. 5,198,207, "Method for the Preparation of Active Magnesium Hydride-Magnesium Hydrogen Storage Systems, Which Reversibly Absorb Hydrogen", Wilfried Knott, Klaus-Dieter Klein, Gotz Koerner, Th. Goldschmidt A G, Oct. 30, 1991) which can easily cause hydrogen formation under unwanted conditions.

The relatively benign compound ammonia borane ($AB=NH_3BH_3$, 19.6 wt % hydrogen) has been indicated by the United States Department of Energy to be number two on the list of potential hydrogen storage materials in terms of hydrogen content; the number one material is methane ($CH_4$), combustion of which will lead to the obvious problem of further carbon dioxide emissions. Clearly, AB has significant advantages over all other known materials in applications where hydrogen is required as an energy carrier.

The United States Department of Energy has funded a significant amount of research, summarized below, that is relevant to this work. For example, a very efficient homogenous iridium catalyst for the dehydrogenation of AB was discovered by Goldberg's group which demonstrates fast release of $H_2$ gas within 20 minutes at room temperature (Denney, M. C.; Pons, V.; Hebden, T. J.; Heinekey, D. M.; Goldberg, K. I. *J. Am. Chem. Soc.* 2006, 128, 12048-12049). However, the system can only generate one equivalent of hydrogen and the insoluble boron-nitrogen containing materials (borazanes) that are formed are very difficult to recycle. Baker and co-workers described the acid initiation of AB dehydrogenation for hydrogen storage. (Stephens, F. H.; Baker, R. T.; Matus, M. H.; Grant, D. J.; Dixon, D. A. *Angew. Chem. Int. Ed.* 2007, 46, 746-749). However, their use of an air sensitive, strong Brønsted acid (e.g. trifluoromethanesulfonic acid) or strong Lewis acid (e.g. tris(pentafluorophenyl)borane) may prohibit their actual on-board applications. Baker has also reported the use of a homogeneous nickel containing catalyst that is capable of effecting ammonia borane dehydrogenation (R. J. Keaton, J. M. Blacquiere, R. T. Baker *J. Am. Chem. Soc.* 2007, 129, 1844). This highly air sensitive system exhibits very poor efficiency and requires heating to $60°$ C. for three hours to afford a 94% yield of hydrogen.

Several reports have appeared from Xu and coworkers regarding heterogeneous ammonia borane hydrolysis catalysts containing noble metals (a) Xu, Q.; Chandra, M. *J. Alloys Cmpd.* 2007, 446-447, 729-732; (b) Chandra, M.; Xu, Q. *J. Power Sources* 2007, 168, 125-142) or base metals ((a) Chandra, M.; Xu, Q. *J. Power Sources* 2006, 163, 364; (b) Man, J.-M.; Zhang, X.-B.; Han, S.; Shioyama, H.; Xu, Q. *Angew. Chem., Int. Ed.* 2008, 47, 2287). Mohajeri et al have reported a similar system using $K_2PtCl_6$ as a precatalyst (Mohajeri, M.; T-Raissi, A.; Adebiyi, O. *J. Power Sources* 2007, 167, 482-485) as well as using other noble metal catalysts (Mohajeri, M.; T-Raissi, A.; Bokerman, G. U.S. Pat. No. 7,285,142, issued Oct. 23, 2007). These systems all use relatively high catalyst loadings and are expected to exhibit limited air stability. Additionally, the systems produce nanoparticles as the active catalysts which have unknown and potentially problematic health effects. Manners has reported heterogeneous catalysts that are capable of hydrolyzing ammonia borane which contain cobalt, rhodium or iridium (Clark, T. J.; Whittel, G. R.; Manners, I. *Inorg. Chem.* 2007, 46, 7522). Again, the catalysts are relatively inefficient (cobalt), and require somewhat high catalyst loadings (rhodium, iridium). Xu and Chandra have demonstrated an ammonia borane hydrolysis system utilizing the solid acids Amberlyst or Dowex (Chandra, M.; Xu, Q. *J. Power Sources* 2006, 159, 855-860, Japan patent JP 2006213563). The acids need to be regenerated periodically to retain activity. Ramachandran et al have reported catalytic hydrogen generation from ammonia borane via methanolysis (Ramachandran, P. V.; Gagare, P. D. *Inorg. Chem.* 2007, 46, 7810, WO 2007106459). A non-catalytic system has been reported by Varma and coworkers which contains ammonia borane, aluminum powder and water (Diwan, M.; Diakov, V.; Shafirovich, E.; Varma, A. *Int. J. Hydrogen Energy* 2008, 33, 1135-1141) and produces hydrogen via a combustion process. The system is expected to be problematic owing to the highly exothermic and potentially dangerous reaction between aluminum powder, water and ammonia borane, in addition to its non-catalytic nature. Xu and coworkers have demonstrated an electrochemical cell that utilizes a platinum or gold electrode for direct oxidation of ammonia borane (Zhang, X.-B.; Han, S.; Yan, J.-M.; Chandra, M.; Shioyama, H.; Yasuda, K.; Kuriyama, N.; Kobayashi, T.; Xu, Q. *J. Power Sources* 2007, 168, 167-171). The authors note that the efficiency of the system must be improved before usage is feasible. Sneddon and co-workers have reported a heterogenous system using ammonia triborane ($NH_3B_3H_7$, 17.9 wt % hydrogen) and rhodium for chemical storage of hydrogen (Yoon, C. W.; Sneddon, L. G. *J. Am. Chem. Soc.* 2006, 128, 13993). However, ammonia triborane requires more synthetic steps and contains a lower gravimetric amount of hydrogen than ammonia borane and these facts will limit the application of ammonia triborane as a hydrogen storage material. Another ammonia borane derivative that has been reported recently is $MNH_2BH_3$ (M=Li or Na). The material releases approximately 11 wt % (M=Li) or 7.5 wt % (M=Na) upon heating to 90° C. over ca. 19 hours (Xiong, Z.; Yong, W. K.; Wu, G.; Chen, P.; Shaw, W.; Karkamkar, A.; Autrey, T.; Jones, M. O.; Johnson, S. R.; Edwards, P. P.; David, W. I. F. *Nature Materials* 2008, 7, 138). The rate of hydrogen release will need to be improved upon dramatically before this system could be commercialized. A closely related material is $Ca(NH_2BH_3)_2$ (Diyabalanage, H. V. K.; Shrestha, R. P.; Semelsberger, T. A.; Scott, B. L.; Bowden, M. E.; Davis, B. L.; Burrell, A. K. *Angew. Chem. Int. Ed.* 2007, 46, 8995-8997). Heating this material results in hydrogen release, although it suffers from the same problem as $MNH_2BH_3$ (M=Li or Na) in that the process occurs over a long time period. Other heterogenous systems that have been investigated include the use of polyhedral borane anion salts (such as $B_{11}H_{14}^-$, $B_{12}H_{12}^{2-}$ and $B_{10}H_{10}^{2-}$) and rhodium boride (RhB), but these studies are still very preliminary (Hawthorne, M. F. et al. "Chemical Hydrogen Storage Using Polyhedral Borane Anion Salts", FY 2006 Annual Progress Report, DOE Hydrogen program, IV.B.4f, 416-417). The use of anionic polyhedral borane salts will be problematic since their cost will be significantly higher than ammonia borane. Another material that is used for hydrogen generation via transition metal catalyzed hydrolysis is sodium borohydride ($NaBH_4$; 10.7 wt % hydrogen; Amendola et al, U.S. Pat. No. 6,534,033 granted to Millennium Cell). Sodium borohydride suffers from water sensitivity and contact of these two materials can result in hydrogen liberation in circumstances where it was not intended, dramatically increasing the risk of fire or explosion. Compared to sodium boroyhydride, ammonia borane forms relatively stable aqueous solutions and hence the risk of fire with ammonia borane is much lower than with sodium borohydride. Heterogeneous transition metal-catalyzed dissociation and hydrolysis of AB has been reported (Chandra, M.; Xu. Q. *J. Power Sciences*, 2006, 156, 190-194).

SUMMARY OF THE DISCLOSURE

The present disclosure describes a method for extremely rapid hydrogen generation from the relatively benign compound ammonia borane (AB), and its derivatives $R^1R^2HNBHR^3R^4$), by metal catalyzed hydrolysis (with water) and solvolysis (with alcohols). This method produces easily recyclable and environmentally friendly ammonium borate salts as the only detectable boron containing residue. The method typically produces hydrogen from AB in approximately 80-98% yield (2.4 to 2.9 equivalents hydrogen) within minutes.

The AB hydrolysis and solvolysis reactions disclosed herein utilize ligand-stabilized homogeneous catalysts. Several remarkably active and reusable catalysts have been discovered which contain Co, Ru or Ir and other metals with a variety of ligand systems. These include phosphines ($PR_3$), bis(phosphinoxy)benzenes, bis(phosphineamino)benzenes, bis(alkylphosphino)benzenes, aminophosphines ($H_2NCH_2CH_2PR_2$), aminodiphosphines ($HN(CH_2CH_2PR_2)_2$), imidazolidenes, and related ligands. AB and its derivatives form relatively stable aqueous solutions and hence the risk of fire with AB is much lower than with other boron hydride materials.

Accordingly the present disclosure includes a method for the production of hydrogen comprising
(a) contacting a solution comprising at least one ligand-stabilized metal catalyst with at least one compound of the formula I,

$$R^1R^2HNBHR^3R^4 \quad\quad\quad (I),$$

in a solvent under conditions for the solvolysis of the compound of formula (I),
wherein $R^1$, $R^2$, $R^3$ and $R^4$ are each simultaneously or independently selected from H, branched or unbranched fluoro-substituted-$C_{1-20}$alkyl, branched or unbranched $C_{1-20}$alkyl and $C_{6-14}$aryl or any two of $R^1$, $R^2$, $R^3$ and $R^4$ are linked to form a branched or unbranched $C_{2-10}$alkylene, which together with the nitrogen and/or boron atoms to which they are attached, forms a ring, and
(b) optionally collecting hydrogen produced in the solvolysis of the compounds of formula (I).

The present disclosure further includes a method for the solvolysis of a compound of formula (I) comprising contacting at least one compound of formula (I) with at least one ligand-stabilized metal catalyst in the presence of a solvent under conditions for the solvolysis of the compound of formula (I).

When the solvent comprises water the solvolysis reaction is referred to as a hydrolysis reaction.

Also included within the present disclosure is a hydrogen generation system comprising at least one amine borane of the formula (I) as defined above, at least one ligand-stabilized metal catalyst and a solvolytic and/or hydrolytic solvent. In an embodiment of the disclosure, the hydrogen generation system comprises a first compartment comprising the at least one amine borane of the formula (I) as defined above, a second compartment comprising the at least one ligand-stabilized metal catalyst, wherein the first or second compartment further comprises the solvent. The hydrogen generation system further comprises a means for combining the contents of the first compartment with the second compartment so that when the contents are combined, hydrogen is generated. At least one flow controller controls a flow rate of the at least one catalyst or the at least one amine borane.

In a further embodiment of the present disclosure, a proton exchange membrane fuel cell (PEMFC) is used as an electrical generator. The PEMFC comprises an ion-exchange membrane located between an anode and a cathode, said membrane, anode and cathode forming a membrane/electrode assembly (MEA), said MEA being located between a fuel gas diffusion layer and an oxidant gas diffusion layer. An oxidant flow network is in fluid connection with the fuel gas diffusion layer, the oxidant network having an input portion for supplying oxidant, and a fuel flow network fluid in fluid connection with the fuel gas diffusion layer. The fuel network has an input portion for supplying fuel, wherein the fuel flow network is fluidly connected to an amine borane dehydrogenation in-situ hydrogen generator. The generator comprises a first compartment that comprises at least one amine borane of the formula (I) as defined above, a second compartment comprising at least one ligand-stabilized metal catalyst, wherein the first or said second compartment comprises a solvolytic and/or hydrolytic solvent. A means for combining the contents of the first compartment with the second compartment so that when the contents are combined, hydrogen is generated is included. At least one flow controller controls a flow rate of the at least one catalyst or the at least one amine borane.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

BRIEF DESCRIPTION OF THE DRAWINGS

The present disclosure will now be described in greater detail with reference to the following drawings in which.

DETAILED DESCRIPTION OF THE DISCLOSURE

Definitions

Figure 1:
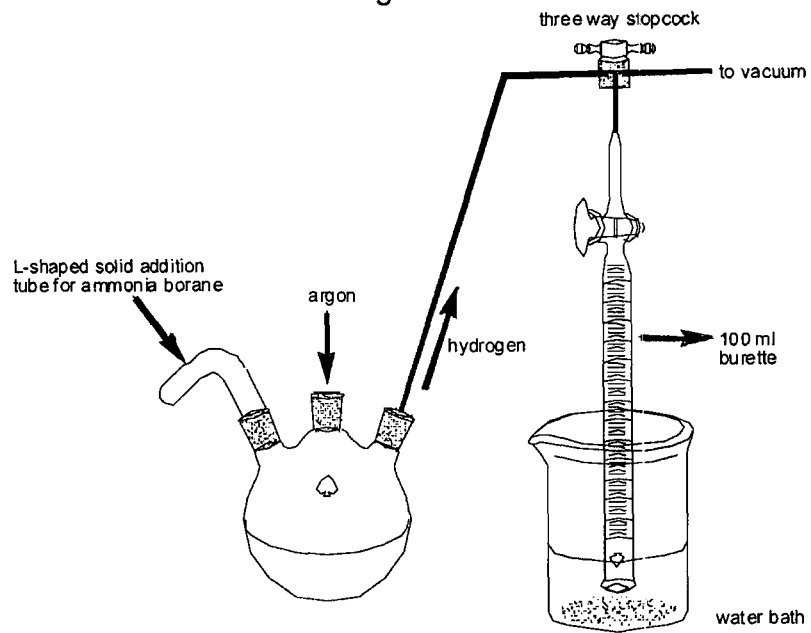
FIG. 1 is a schematic showing the equipment used for the metal-catalyzed hydrolysis of AB when less than 100 ml of hydrogen was generated.

The term "$C_{1-n}$alkyl" as used herein means straight or branched chain, saturated alkyl groups containing from one to n carbon atoms and includes (depending on the identity of n) methyl, ethyl, propyl, isopropyl, n-butyl, s-butyl, isobutyl, t-butyl, 2,2-dimethylbutyl, n-pentyl, 2-methylpentyl, 3-methylpentyl, 4-methylpentyl, n-hexyl and the like, where the variable n is an integer representing the largest number of carbon atoms in the alkyl group.

The term "$C_{1-n}$alkenyl" as used herein means straight or branched chain, unsaturated alkyl groups containing from one to n carbon atoms and one to three double bonds, and includes (depending on the identity of n) vinyl, allyl, 2-methylprop-1-enyl, but-1-enyl, but-2-enyl, but-3-enyl, 2-methylbut-1-enyl, 2-methylpent-1-enyl, 4-methylpent-1-enyl, 4-methylpent-2-enyl, 2-methylpent-2-enyl, 4-methylpenta-1,3-dienyl, hexen-1-yl and the like, where the variable n is an integer representing the largest number of carbon atoms in the alkenyl group.

The term "$C_{6-n}$aryl" as used herein means a monocyclic, bicyclic or tricyclic carbocyclic ring system containing from 6 to n carbon atoms and at least one aromatic ring and includes, depending on the identity of n, phenyl, naphthyl, anthracenyl, 1,2-dihydronaphthyl, 1,2,3,4-tetrahydronaphthyl, fluorenyl, indanyl, indenyl and the like, where the variable n is an integer representing the largest number of carbon atoms in the aryl group.

The term "heteroaryl as used herein means a monocyclic, bicyclic or tricyclic ring system containing from 5 to 14 atoms of which one or more, for example 1-8, suitably, 1-6, more suitably 1-5, and more suitably 1-4, of the atoms are a heteromoiety selected from O, S, NH and NC$_{1-6}$alkyl, with the remaining atoms being C or CH, said ring system containing at least one aromatic ring. Examples of heteroaryl groups, include, but are not limited to thienyl, imidazolyl, pyridyl, oxazolyl, indolyl, furanyl, benzothienyl, benzofuranyl and the like.

The suffix "ene" added on to any of the above groups means that the group is divalent, i.e. inserted between two other groups. When the group is a ring system, the two other groups may be located at any location on the ring system, including at adjacent and non-adjacent nodes. For example, if the group is phenylene, the two other groups may be located at positions 1 and 2, 1 and 3 or 1 and 4.

The term "substituted" as used herein, unless otherwise specified, means that the group is substituted with one or more, optionally one to six, suitably one to three, groups independently selected from OH, SH, NH$_2$, NHC$_{1-6}$alkyl, N(C$_{1-6}$alkyl)(C$_{1-6}$alkyl), C$_{1-6}$alkyl, C$_{1-6}$alkoxy, C$_{1-6}$thioalkoxy, halo, fluoro-substituted C$_{1-6}$alkyl, fluoro-substituted C$_{1-6}$alkoxy, fluoro-substituted C$_{1-6}$thioalkoxy, fluoro-substituted NHC$_{1-6}$alkyl and fluoro-substituted N(C$_{1-6}$alkyl)(C$_{1-6}$alkyl). In an embodiment of the disclosure, the substituents are selected from one or more, optionally one to six, suitably one to three, groups independently selected from OH, SH, $NH_2$, $NHCH_3$, $N(CH_3)_2$, $CH_3$, $OCH_3$, $SCH_3$, halo, $CF_3$, $OCF_3$, $SCF_3$, $NHCF_3$ and $N(CF_3)_2$.

The term "halo" as used herein means halogen and includes chlorine, bromine, iodine and fluorine.

The term "fluoro-substituted" as used herein means that one or more, including all, of the hydrogens in the group have been replaced with fluorine.

The term "ring system" as used herein refers to a carbon-containing ring system, that includes monocycles, fused bicyclic and polycyclic rings, bridged rings and metalocenes. Where specified, the carbons in the rings may be substituted or replaced with heteroatoms.

The term "coordinating" as used herein refers to a chemical grouping which formally bonds to or shares electrons with the metal center in a covalent bond.

The term "non-coordinating" as used herein refers to a chemical grouping which does not formally bond to or share electrons with the metal center in a covalent bond.

By "ligand stabilized" it is meant that the ligand stabilizes the metal to allow easier handling of an otherwise reactive center. The coordinating atoms of such ligands include, but is not limited to phosphorus, nitrogen, oxygen, carbon, silicon, germanium, sulfur, selenium and arsenic. Such ligands include compounds having one or more type of coordinating atoms, in various combinations, including but not limited to phosphines, arsines, diphosphines, imines, pyridines, amines, carbenes, aminophosphines, diamines, aminodiphosphines, diaminodiphosphines, dicarbenes, aminocarbenes, phosphinocarbenes, alcohols, ethers, aminoethers, phosphinoethers, aminoalcohols, aminothiols, aminothiophenes, imidazoles, etc.

The term "solvent" as used herein means a solvolytic and/or hydrolytic solvent which participates as a reactant in generating hydrogen and is known as a hydrolytic or solvolytic dehydrogenation agent (i.e. the solvent hydrolyzes or solvolyzes the amine borane). This type of solvent generally includes a hydroxyl group, such as water, methanol or ethanol, for the production of hydrogen. Also included within the term "solvent" are co-ordinating solvents such as tetrahydrofuran, diglyme and triglyme. Generally, solvent systems will contain a mixture of a hydrolytic solvent such as water or an alcohol, and a coordinating solvent, such as tetrahydrofuran.

The term "homogeneous" as used herein means that the ligand stabilized catalyst is essentially soluble in the reaction solvent(s) and remains essentially in solution throughout the reaction process with minimal amounts of precipitation of the catalyst.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

Methods of the Disclosure

The present disclosure includes a method for the production of hydrogen comprising (a) contacting a solution comprising at least one ligand-stabilized metal catalyst with at least one compound of the formula I, $$R^1R^2HNBHR^3R^4 \quad (I),$$

in a solvent under conditions for the solvolysis of the compound of formula (I), wherein $R^1$, $R^2$, $R^3$ and $R^4$ are each simultaneously or independently selected from H, branched or unbranched fluoro-substituted-$C_{1-20}$alkyl, branched or unbranched $C_{1-20}$alkyl and $C_{6-14}$aryl or any two of $R^1$, $R^2$, $R^3$ and $R^4$ are linked to form a branched or unbranched $C_{2-10}$alkylene, which together with the nitrogen and/or boron atoms to which they are attached, forms a ring, and (b) optionally collecting hydrogen produced in the solvolysis of the compounds of formula (I).

In an embodiment of the disclosure, $R^1$, $R^2$, $R^3$ and $R^4$ are different. In a further embodiment, $R^1$, $R^2$, $R^3$ and $R^4$ are each simultaneously or independently selected from H, branched or unbranched fluoro-substituted-$C_{1-10}$-alkyl, branched or unbranched $C_{1-10}$alkyl, and $C_{6-10}$aryl or any two of $R^1$, $R^2$, $R^3$ and $R^4$ are linked to form a branched or unbranched $C_{2-6}$alkylene, which together with the nitrogen and/or boron atoms to which they are attached, forms a ring. In another embodiment, $R^1$, $R^2$, $R^3$ and $R^4$ are each simultaneously or independently selected from H, branched or unbranched fluoro-substituted-$C_{1-6}$alkyl, branched or unbranched $C_{1-6}$alkyl, and phenyl or $R^1$ and $R^2$ and/or $R^3$ and $R^4$ are linked to form a branched or unbranched $C_{2-6}$alkylene, which together with the nitrogen atom and/or boron atom to which they are attached, forms a ring. In a further embodiment of the disclosure, $R^1$, $R^2$, $R^3$ and $R^4$ are each H.

Conditions for the solvolysis of the compound of the formula (I) can vary depending on a number of factors including, for example, the identity of the catalyst and the scale of the reaction, as would be known to a person skilled in the art. In embodiments of the present disclosure, the conditions include the use of a water-soluble or water miscible solvent, for example, ethers and tetrahydrofuran, and alcohols and ethanol, and suitable reaction temperatures, for example, but not limited to, in the range of about 20° C. to about 60° C., suitably about 40° C. In an embodiment, the catalyst is dissolved in a mixture of the solvent and water in a volume ratio of between about 90:10 to 10:90 (solvent:water). In this embodiment, the reaction is referred to as a hydrolysis reaction. In another embodiment, the conditions include the use of an alcohol as the solvent, for example a $C_{1-10}$ alcohol, optionally a $C_{1-4}$ alcohol, and suitably ethanol, methanol, 1-propanol, 2-propanol, 1-butanol or 2-butanol. In this embodiment, the reaction is referred to as a solvolysis reaction. In a suitable embodiment, the catalyst is dissolved in a mixture of the solvent and water in a volume ratio of 50:50 and the compound of formula (I) is added directly to this solution.

The hydrogen that is generated in this reaction may optionally be captured using any known means. The reaction produces, in addition to hydrogen gas, easily recyclable and environmentally friendly ammonium borate salts as the only detectable boron-containing residue. The hydrolysis reaction has been performed in air but may also be performed in an inert atmosphere, for example, under argon, if the catalyst is air sensitive.

The present disclosure is the first to report that the solvolysis of AB, and its derivatives, to produce hydrogen gas may be catalyzed by ligand-stabilized metal catalysts under homogeneous reaction conditions. In the present disclosure, it has been shown that a wide variety of ligands and metals may be used to catalyze the hydrolysis or solvolysis of hydrolysis or solvolysis of AB, and its derivatives. For example the metal includes all known metals, including, the alkali metals lithium (Li), sodium (Na), potassium (K), rubidium (Rb), cesium (Cs) and francium (Fr); the alkaline earth metals beryllium (Be), magnesium (Mg), calcium (Ca), strontium (Sr), barium (Ba) and radium (Ra); the p-block metals aluminum (Al), gallium (Ga), indium (In), tin (Sn), thallium (Tl), lead (Pb), and bismuth (Bi); the d-block or transition metals scandium (Sc), titanium (Ti), vanadium (V), chromium (Cr), manganese (Mn), iron (Fe), cobalt (Co), nickel (Ni), copper (Cu), zinc (Zn), yttrium (Y) zirconium (Zr), niobium (Nb), molybdenum (Mo), technetium (Tc), ruthenium (Ru), palladium (Pd), silver (Ag), cadium (Cd), hafnium (Hf), tantalum (Ta), tungsten (W), rhenium (Re), osmium (Os), iridium (Ir), platinum (Pt), gold (Au) and mercury (Hg); the lanthanides lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium; and the actinides actinium (Ac), thorium (Th), protactinium (Pa), uranium (U), neptunium (Np), plutonium (Pu), americium (Am). Curium, Cm, Berkelium, (Bk), californium (Cf), einsteinium (Es), fermium (Fm), mendelevium (Md), nobelium (No) and lawrencium (Lr). In embodiments of the disclosure, the metal is a transition metal. In other embodiments of the disclosure, the metal is selected from Ru, Co, Ni, Ru and Ir.

With respect to the identity of the ligands, the present disclosure extends to any ligand associated with metal-based catalysts. Ligands that may be used in the catalysts of the present disclosure, include, but are not limited to, one or more of:
(a) Phosphines of the formula (II):

which are bidentate or tridentate and are chiral or achiral monodentate phosphine ligands in which $R^5$, $R^6$ and $R^7$ are simultaneously or independently selected from unsubstituted or substituted $C_{1-10}$alkyl, unsubstituted or substituted $C_{2-10}$alkenyl, unsubstituted or substituted $C_{3-10}$cycloalkyl, unsubstituted or substituted $C_{6-14}$aryl, $OR^8$ and $N(R^8)_2$ and $R^8$ is simultaneously or independently selected from unsubstituted or substituted $C_{1-10}$alkyl, unsubstituted or substituted $C_{2-10}$alkenyl, unsubstituted or substituted $C_{3-10}$cycloalkyl, unsubstituted or substituted $C_{6-14}$aryl, or two of $R^5$, $R^6$, $R^7$ and $R^8$ are bonded together to form an unsubstituted or substituted ring having 4 to 8 atoms, including the phosphorous, nitrogen and/or oxygen atom to which said groups are bonded. In an embodiment of the application $R^5$, $R^6$, $R^7$ and $R^8$ are independently selected from $C_{6-14}$aryl and $C_{1-6}$alkyl. In further embodiments of the disclosure, $R^5$, $R^6$, $R^7$ and $R^8$ are independently selected from phenyl and $C_{1-6}$alkyl. In still further embodiments $R^5$, $R^6$ and $R^7$ are all phenyl and $R^8$ is independently selected from phenyl and $C_{1-6}$alkyl;
(b) Bis(phosphino) bi-, tri- or tetradentate ligands of the formula (III):

wherein $R^9$, $R^{10}$, $R^{11}$ and $R^{12}$ are, independently, as defined for $R^5$, $R^6$ and $R^7$, and $Q^1$ is selected from unsubstituted or substituted $C_1$-$C_{10}$alkylene and unsubstituted or substituted $C_2$-$C_{10}$alkenylene where adjacent or geminal substituents on $Q^1$ are joined together to form, including the atoms to which they are attached, one or more unsubstituted or substituted 5-14-membered monocyclic, polycyclic, heterocyclic, carbocyclic, saturated, unsaturated or metallocenyl ring systems, and/or one or more of the carbon atoms in $Q^1$ is optionally replaced with a heteromoiety selected from O, S, NH and $N(C_{1-6}$alkyl) and $Q^1$ is chiral or achiral. In further embodiments of the disclosure, $R^9$, $R^{10}$, $R^{11}$ and $R^{12}$ are independently selected from phenyl, $C_{1-6}$alkyl and $C_{5-10}$cycloalkyl, with the phenyl being optionally substituted with one to five substituents independently selected from $C_{1-4}$alkyl, fluoro-substituted $C_{1-4}$alkyl, halo, $C_{1-4}$alkoxy and fluoro-substituted $C_{1-4}$alkoxy and $Q^1$ is selected from unsubstituted or substituted $C_1$-$C_8$alkylene where the substituents on $Q^1$ are independently selected from one to four $C_{1-4}$alkyl, fluoro-substituted $C_{1-4}$alkyl, halo, $C_{1-4}$alkoxy, fluoro-substituted $C_{1-4}$alkoxy, unsubstituted and substituted phenyl and substituted and unsubstituted naphthyl, and/or adjacent or geminal substituents may be joined together to form, including the atoms to which they are attached, one or more unsubstituted or substituted phenyl, pyridyl, cyclohexyl, naphthyl or ferrocenyl groups, and/or one or two of the carbon atoms in $Q^1$ is replaced with a heteromoiety selected from O, $NCH_3$ and NH, and $Q^1$ is chiral or achiral.

Bis(phosphino) ligands of the formula (III) include, for example, 1,3-bis(di-iso-propylphosphinooxy)benzene, 1,3-bis(di-tert-butylphosphinooxy)benzene, 1,3-bis(diphenylphosphinooxy)benzene, 1,3-bis(diethylphosphinooxy) benzene, 1,3-bis((ditertiarybutylphosphino)methyl)benzene, 1,3-bis((diisopropylphosphino)methyl)benzene, 2,6-bis((di-iso-propylphosphino)methyl)pyridine, $N^1$,$N^3$-bis(di-iso-propylphosphino)benzene-1,3-diamine, 2,2'-oxybis(ethane-2,1-diyl)bis(di-iso-propylphosphine), 2,2'-oxybis(ethane-2,1-diyl)bis(ditertiarybutylphosphine), bis(2-ditertiarybutylphosphino)ethyl)amine, bis(2-(di-1-propylphosphino)ethyl)amine, bis(2-(di-ethylphosphino) ethyl)amine, bis(2-(dicyclohexylphosphino)ethyl)amine, bis (2-(ditertiarybutylphosphino)ethyl)amine, bis(2-(diadamantylphosphino)ethyl)amine, bis(2-(diisopropylphosphino)ethyl)methylamine, bis(2-(ditertiarybutylphosphino)ethyl)methylamine, bis(2-(diadamantylphosphino)ethyl)methylamine, bis(2-diphenylphosphino)ethyl)methylamine, bis(2-diisopropylphosphino-4-methylphenyl)amine, bis(di-m-isopropylphosphino-di-p-tolyl)amine, $N^1$,$N^2$-bis(2-(diphenylphosphino)benzyl)cyclohexane-1,2-diamine, N,N-bis(2-(di-p-tolylphosphino)benzyl)cyclohexane-1,2-diamine, $N^1$,$N^2$-bis(2-(bis(3,5-dimethylphenyl)phosphino)-benzyl)-cyclo-hexane-1,2-diamine, $N^1$,$N^2$-bis(2-(diphenylphosphino)-benzylidene)-cyclohexane-1,2-diamine, and $(N^1E,N^2E)$-$N^1$,$N^2$-bis(2-(diphenylphosphino)benzylidene)cyclohexane-1,2-diamine.

Other bis(phosphino) ligands include, for example, each optical isomer of 2,2'-bis-(diphenylphosphino)-1,1'-binaphthyl (abbreviated name: BINAP); BINAP derivatives in which the naphthalene ring of BINAP is partially reduced, such as each optical isomer of 2,2'-bis(diphenylphosphino)-5,5',6,6',7,7',8,8'-octahydro-1,1'-binaphthyl (abbreviated name: $H_8$BINAP); BINAP derivatives in which the naphthalene ring of BINAP carries substituent(s), such as each optical isomer of 2,2'-bis-(diphenylphosphino)-6,6'-dimethyl-1,1'-binaphthyl (abbreviated name: 6MeBINAP); BINAP derivatives in which the benzene ring on the phosphorus atom of BINAP is substituted with lower alkyl group(s), such as each optical isomer of 2,2'-bis-(di-p-tolylphosphino)-1-,1'-binaphthyl (abbreviated name: Tol-BINAP), each optical isomer of 2,2'-bis[bis(3-methylphenyl)phosphino]-1,1'-binaphthyl, each optical isomer of 2,2'-bis[bis(3,5-di-tert-butylphenyl)phosphino]-1,1'-binaphthyl-, each optical isomer of 2,2'-bis[bis(4-tert-butylphenyl)phosphino]-1,1'-binaphthyl, each optical isomer of 2,2'-bis[bis(3,5-dimethylphenyl)phosphino]-1,1'-binaphthyl (abbreviated name:

Xyl-BINAP), and each optical isomer of 2,2'-bis[bis(3,5-dimethyl-4-methoxyphenyl)phosphino]-1,1'-binaphthyl (abbreviated name: Dmanyl-BINAP); BINAP derivatives in which the naphthalene ring of BINAP carries substituent(s) and the benzene ring on the phosphorus atom of BINAP is substituted with from 1 to 5 lower alkyl substituents, such as each optical isomer of 2,2'-bis[bis-(3,5-dimethylphenyl)phosphino]-6,6'-dimethyl-1,1'-binaphthyl (abbreviated name: Xyl-6MeBINAP); and, BINAP derivatives in which the naphthalene ring of BINAP is condensed with a saturated hydrocarbon ring, such as each optical isomer of 3,3'-bis-(diphenylphosphanyl)-13,13'-dimethyl-12,13,14,15,16,17,12',13',14',15',16',17'-dodecahydro-11H,11'H-[4,4']bi[cyclopenta[a]phenanthrenyl]. Further, particular examples include each optical isomer of 2,2'-bis[bis-(3,5-dimethylphenyl)phosphino]-1,1'-binaphthyl (abbreviated name: Xyl-BINAP); each optical isomer of 2,2'-bis[bis(3,5-dimethyl-4-methoxyphenyl)phosphino]-1,1'-binaphthyl (abbreviated name: Dmanyl-BINAP); and BINAP derivatives in which the naphthalene ring of BINAP carries substituent(s) and the benzene ring on the phosphorus atom of BINAP is substituted with from 1 to 5 lower alkyl substituents, such as each optical isomer of 2,2'-bis[bis-(3,5-dimethylph-enyl)phosphino]-6,6'-dimethyl-1,1'-binaphthyl (abbreviated name: Xyl-6MeBINAP).

Representative examples of the preparation of bis(phosphinoxy) ligands are found in Pandarus V. et al. Chem. Commun. 2007, 978-980; Morales-Morales, D. et al. Inorganica Chim. Acta 2004, 357, 2953-2956; and Göttker-Schnetmann, I, et al. J. Am. Chem. Soc. 2004, 126, 1804-1811). Representative examples of the preparation of bis(alkylphosphino) ligands are found in Gupta, M. et al. Chem. Commun. 1996, 2083-2084; Moulton, C. J. J. Chem. Soc. Dalton, 1976, 1020-1024). Representative examples of the preparation of aminodiphosphines ligands are found in Clarke, Z. E. et al. Organometallics 2006, 25, 4113-4117). Representative examples of the preparation of diaminodiphosphine ligands are found in Li, Y-Y. et al. 2004, 218, 153-156;

(c) Bidentate aminophosphine ligands of the formula (IV):

$$R^{13}R^{14}P-Q^2-NR^{15}R^{16} \quad (IV)$$

wherein $R^{13}$ and $R^{14}$ are, independently, as defined for $R^5$-$R^7$, $Q^2$ is as defined for $Q^1$, and $R^{15}$ and $R^{16}$ are independently selected from H, $C_{6-14}$aryl, $C_{1-10}$alkyl and $C_{3-12}$cycloalkyl, with the $C_{6-14}$aryl and $C_{3-12}$cycloalkyl being optionally substituted. In embodiments of the disclosure, $R^{13}$ and $R^{14}$ are independently selected from phenyl, $C_{1-6}$alkyl, and $C_{5-10}$cycloalkyl, with the phenyl and $C_{5-10}$cycloalkyl being optionally substituted with one to five substituents independently selected from $C_{1-4}$alkyl, fluoro-substituted halo, $C_{1-4}$alkoxy and fluoro-substituted $C_{1-4}$alkoxy, $R^{15}$ and $R^{16}$ are independently selected from H, phenyl and $C_{1-6}$alkyl and $Q^2$ is selected from unsubstituted or substituted $C_1$-$C_8$alkylene where the substituents on $Q^2$ are independently selected from one to four of $C_{1-8}$alkyl, fluoro-substituted $C_{1-6}$alkyl, halo, $C_{1-6}$alkoxy, fluoro-substituted $C_{1-6}$alkoxy and unsubstituted or substituted phenyl and/or adjacent or geminal substituents on $Q^2$ may be joined together to form, including the carbon atoms to which they are attached, one or more unsubstituted or substituted phenyl, naphthyl or ferrocenyl ring systems, and/or one or two of the carbon atoms in $Q^1$ is replaced with a heteromoiety selected from O, $NCH_3$ and NH, and $Q^2$ may be chiral or achiral.

Ligands of the formula (IV) include, for example, N,N'-(phenylphosphinediyl)bis(methylene)dipropan-2-amine;

(d) Heterocyclic ligands of the formula (V):

$$Hy-Q^3-Hy \quad (V)$$

which are bi- or tridentate ligands wherein Hy is an unsubstituted or substituted aromatic or non-aromatic heterocycle containing from 3 to 10 atoms of which 1 to 3 are a heteromoiety selected from O, S, N, NH and $NC_{1-6}$alkyl with the remaining atoms being C and $Q^3$ is as defined for $Q^1$. In an embodiment of the application Hy is selected from imidazole, pyridine, oxazole and dihydrooxazole.

Ligands of the formula (V) include, for example, 1,3-bis((R)-4-isopropyl-4,5-dihydrooxazol-2-yl)benzene, $N^1$,$N^2$-bis(pyridin-2-ylmethylene)cyclohexane-1,2-diamine, 3'-(1,3-phenylenebis(methylene))bis(1-butyl-1H-imidazol-3-ium)chloride, bis[2-(1-butyl-1H-imidazol-3-ium)ethyl]ammonium chloride, 1,1'-(pyridine-2,6-diyl)bis(3-butyl-1H-imidazol-3-ium)chloride, 2,6-bis(1-n-butylimidazolium)pyridine dibromide and 2-bis(1-n-butylimidazolium)ethyl)amine.

Representative examples of the preparation of imidazolidenes ligands are found in Loch J.A. et al. Organomet. 2002, 21, 700-706; Poyatos, M. et al. Organomet. 2003, 22, 1110-1114;

(e) Diaminophosphines of the formula (VI) or (VII):

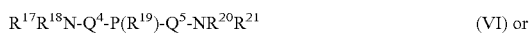

$$R^{17}R^{18}N-Q^4-P(R^{19})-Q^5-NR^{20}R^{21} \quad (VI) \text{ or}$$

$$R^{17}NH-Q^4-P(R^{19})-Q^5-NHR^{20} \quad (VII)$$

wherein $R^{17}$-$R^{18}$ and $R^{20}$, $R^{21}$ are, independently, as defined for $R^{15}$ and $R^{16}$, $R^{19}$ is as defined for $R^5$ and $Q^4$ and $Q^5$ are as defined for $Q^1$;

Ligands of the formula (VI) include, for example, N,N'-(phenylphosphinediyl)bis(methylene)dipropan-2-amine;

(f) Diamines of the formula VIII or IX:

$$R^{22}R^{23}N-Q^6-NR^{24}R^{25} \quad (VIII) \text{ or}$$

$$R^{22}NH-Q^6-NHR^{24} \quad (IX)$$

wherein $R^{22}$-$R^{25}$ are, independently, as defined for $R^{15}$ and $R^{16}$ and $Q^6$ is as defined for $Q^1$;

Examples of the diamine ligands include, for example, methylenediamine, ethylenediamine, 1,2-diaminopropane, 1,3-diaminopropane, 1,4-diaminobutane, 2,3-diaminobutane, 1,2-cyclopentanediamine, 1,2-cyclohexanediamine, 1,1-diphenylethylenediamine, 1,1-di(p-methoxyphenyl)ethylenediamine, 1,1-di(3,5-dimethoxyphenyl)ethylenediamine, and 1,1-dinaphthylethylenediamine. Optically active diamine compounds may be also used. Examples thereof include, for example, optically active 1,2-diphenylethylenediamine (abbreviated name: DPEN), 1,2-di(p-methoxyphenyl)ethylenediamine, 1,2-cyclohexanediamine, 1,2-cycloheptanediamine, 2,3-dimethylbutanediamine, 1-methyl-2,2-diphenylethylenediamine, 1-isobutyl-2,2-diphenylethylenediamine, 1-isopropyl-2,2-diphenylethylenediamine, 1-benzyl-2,2-diphenylethylenediamine, 1-methyl-2,2-di(p-methoxyphenyl)ethylenediamine (abbreviated name: DAMEN), 1-isobutyl-2,2-di(p-methoxyphenyl)-ethylenediamine (abbreviated name: DAIBEN), 1-isopropyl-2,2-di(p-methoxyphenyl)ethylenediamine (abbreviated name: DAIPEN), 1-benzyl-2,2-di(p-methoxyphenyl)ethylenediamine, 1-methyl-2,2-di(3,5-dimethoxyphenyl)ethylenediamine, 1-isopropyl-2,2-di(3,5-dimethoxyphenyl)ethylenediamine, 1-isobutyl-2,2-di(3,5-dimethoxy-phenyl)ethylenediamine, 1-benzyl-2,2-di(3,5-dimethoxyphenyl)ethylenediamine, 1-methyl-2,2-dinaphthylethylenediamine, 1-isobutyl-2,2-dinaphthylethylene-diamine, 1-isopropyl-2,2-dinaphthylethylenediamine, and 1-benzyl-2,2- dinaphthylethylenediamine. Further, optically active diamine compounds which can be used are not limited to the above-mentioned optically active ethylenediamine derivatives. Optically active propanediamine, butanediamine and cyclohexanediamine derivatives may be also used. In addition, these diamine ligands may be prepared by the process starting from .alpha.-amino acid described in the literature (Burrows, C. J., et al., Tetrahedron Letters, 34(12), pp. 1905-1908 (1993)), or by a variety of processes described in the general remark (T. Le Gall, C. Mioskowski, and D. Lucet, Angew. Chem. Int. Ed., 37, pp. 2580-2627 (1998));

(g) Thiophenes of the formula (X):

$$T-Q^7-NH_2 \quad (X)$$

which are bidentate, wherein T is unsubstituted or substituted thiophene and $Q^7$ is as defined for $Q^1$.

Ligands of the formula (X) include, for example, thiophen-2-ylmethanamine; and (h) Thioamines of the formula (XI):

$$R^{25}S-Q^8-NH_2 \quad (XI)$$

which are bidentate, wherein $R^{25}$ is as defined for $R^5$, $R^6$ or $R^7$, S is sulphur and $Q^8$ is as defined for $Q^1$.

Ligands of the formula (XI) include, for example, 2-(benzylthio)ethanamine.

It is to be understood that the above-described ligands are representative examples and the disclosure is not limited to such examples.

The catalysts useful in the processes of the present disclosure, may also comprise one or more of non-coordinating or coordinating, neutral or anionic and/or Lewis basic ligands, depending on the valency and size characteristics of the metal as would be known to those skilled in the art. Examples of such ligands include, but are not limited to halo (in particular Cl), OH, H, CO, pyridine, acetonitrile. The catalyst may also be monocationic or dicationic.

The catalysts may be prepared and isolated prior to use in the processes of the disclosure or they may be generated in situ.

The present disclosure further includes a method for the solvolysis of a compound of the formula (I) comprising contacting at least one compound of the formula (I) as defined above with at least one ligand-stabilized transition metal catalyst in the presence of a solvent under conditions for the hydrolysis of the compound of formula (I).

Hydrogen Generation Systems

There are expected to be many applications for the methods of the present disclosure. In one embodiment, the methods of the disclosure are used to generate hydrogen, which is supplied to a hydrogen fuel cell, such as a PEMFC. Hydrogen generators may include a first compartment holding a catalyst-comprising solution and a second compartment holding the one or more amine boranes of the formula (I) as defined above, wherein the catalyst is a ligand-stabilized metal catalyst. Control electronics are coupled to catalyst mass flow controllers and hydrogen mass flow controllers. Catalyst mass flow controllers control the flow of the catalyst solution, which enters second compartment to achieve a desired hydrogen flow generated by the hydrogen generator. A coupling connector delivers hydrogen generated by hydrogen generator to the anode of a PEMFC.

In the embodiment of the disclosure, the one or more amine boranes of formula (I) are stored in a second compartment as a solid or as a solution in the solvent. In operation, as soon as the hydrogen generator is turned on, control electronics send a signal to a mass flow controller (or a flow controller) to allow a predetermined flow rate of the one or more ligand-stabilized metal catalysts in a solvolytic and/or hydrolytic solvent in a first compartment to flow into the second compartment which holds the one or more amine boranes. As a result, hydrogen gas in generated. The reaction by-products are captured and remain in the second compartment. In alternate embodiments the one or more amine boranes can be provided in the first compartment and be pumped into the second compartment holding the one or more metal catalysts in the solvent.

Hydrogen generators disclosed herein are capable of delivering PEMFC grade hydrogen at low reaction temperatures, safely and reliably in an integrated and self-sustaining device that offers high specific energy storage density. Hydrogen PEM fuel cells are optimal for applications in the power range of 5-500 W where batteries and internal combustion engines do not deliver cost-effective and convenient power generation solutions. Unlike secondary batteries, the hydrogen generators disclosed here and formulations therein provide a constant source of power in a compact size that does not require electrical recharging.

The systems disclosed herein can thus provide a viable solution to many military and civilian applications in need of a lightweight, highly dependable power source. Examples include, among others, auxiliary power units for small and remote applications, shelter power, emergency power, external power pack, battery charger, portable power for soldiers, unmanned aerial vehicles, and robotics.

Accordingly, also included within the present disclosure is a hydrogen generation system comprising at least one amine borane of the formula (I) as defined above, at least one ligand-stabilized metal catalyst, and a solvolytic and/or hydrolytic solvent. In an embodiment of the disclosure, the hydrogen generation system comprises a first compartment comprising the at least one amine borane of the formula (I) as defined above, a second compartment comprising the at least one ligand-stabilized metal catalyst, wherein the first or second compartment further comprises the solvent. The hydrogen generation system further comprises a means for combining the contents of the first compartment with the second compartment so that when the contents are combined, hydrogen is generated. At least one flow controller controls a flow rate of the at least one catalyst or the at least one amine borane.

In a further embodiment of the present disclosure, a proton exchange membrane fuel cell (PEMFC) is used as an electrical generator. The PEMFC comprises an ion-exchange membrane located between an anode and a cathode, said membrane, anode and cathode forming a membrane/electrode assembly (MEA), said MEA being located between a fuel gas diffusion layer and an oxidant gas diffusion layer. An oxidant flow network is in fluid connection with the fuel gas diffusion layer, the oxidant network having an input portion for supplying oxidant, and a fuel flow network fluid in fluid connection with the fuel gas diffusion layer. The fuel network has an input portion for supplying fuel, wherein the fuel flow network is fluidly connected to an amine borane dehydrogenation in-situ hydrogen generator. The generator comprises a first compartment that comprises at least one amine borane, a second compartment comprising at least one ligand-stabilized metal catalyst, wherein the first or said second compartment comprises a solvolytic and/or hydrolytic solvent. A means for combining the contents of the first compartment with the second compartment so that when the contents are combined, hydrogen is generated is included. At least one flow controller controls a flow rate of the at least one catalyst or the at least one amine borane.

The following non-limiting examples are illustrative of the disclosure:

EXPERIMENTAL EXAMPLES

Materials and Methods

All ligands and their metal complexes were prepared under an argon atmosphere in an Innovative Technologies inert atmosphere glovebox or with standard Schlenk techniques, unless otherwise stated. All heterogeneous catalysts were prepared in air unless otherwise stated. Ammonia borane was obtained from Boroscience Ltd. Ruthenium trichloride trihydrate ($RuCl_3 \cdot 3H_2O$) was obtained from Pressure Chemicals Company. Rhodium cyclooctadiene acetylacetonate [Rh(COD)(acac)], and [iridium bis(cyclooctene)chloride]dimer{[Ir(COE)$_2$Cl]$_2$} were obtained from Colonial Metals Inc. Palladium cyclooctadiene dichloride [Pd(COD)Cl$_2$] was prepared using standard procedures. All other metal salts were obtained from Sigma-Aldrich Ltd. and were used as received. Dichloromethane ($CH_2Cl_2$), diethyl ether ($Et_2O$), hexanes ($C_6H_{14}$), tetrahydrofuran and toluene ($C_7H_8$) were dried and degassed with an Innovative Technologies solvent column containing alumina ($CH_2Cl_2$), or alumina and copper oxide catalyst (ether, hexanes and tetrahydrofuran). Isopropanol was dried and degassed by distillation from calcium hydride ($CaH_2$) under an argon atmosphere.

Hydrogen Measurement Experiments

Figure 2:
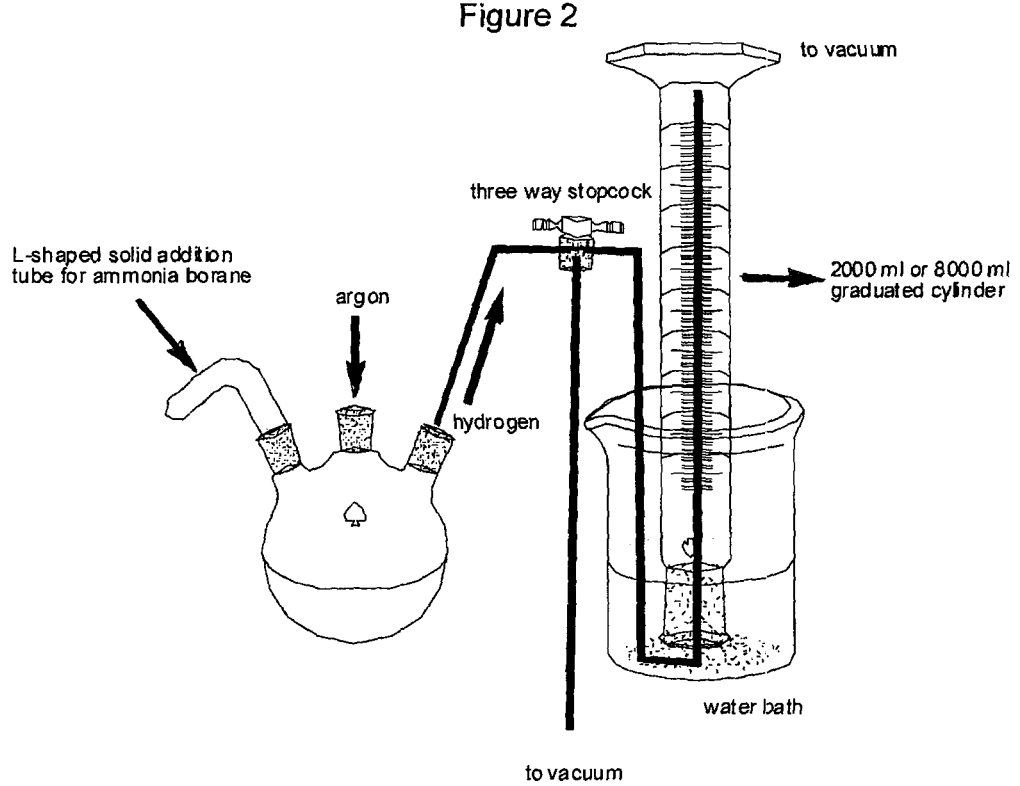
FIG. 2 is a schematic showing the equipment used for the metal-catalyzed hydrolysis of AB when 2000 to 8000 ml of hydrogen was generated.

These reactions were performed in a 3-neck round bottom flask that was connected to a calibrated burette (<100 ml hydrogen, FIG. 1) or an inverted graduated cylinder (2000 to 8000 ml hydrogen, FIG. 2) and a standard vacuum manifold. The ammonia borane was added either via an L-shaped solid addition tube (<100 ml to 2000 ml hydrogen) or was added rapidly to the reaction mixture through a solid addition funnel; in the latter case the reaction vessel was sealed rapidly and opened to the hydrogen measurement apparatus immediately. For air sensitive samples, the flask containing the catalyst precursor, L-shaped solid addition tube with AB and tetrahydrofuran were assembled in a glovebox, sealed and then connected to a vacuum manifold. Degassed water was then added with a syringe. In experiments where AB portions were added in an argon atmosphere, the L-shaped tube was removed with an argon flow and replaced with a tube containing a new sample of AB and the flask was then purged gently with argon for approximately 2 minutes. The reaction vessel was then assembled and connected to the hydrogen measurement apparatus. The system was then placed in a water bath at the desired reaction temperature and was allowed to equilibrate for approximately 5 minutes before starting each run. The water level in the burette or inverted graduated cylinder was then set to the 'zero' point, the ammonia borane was then added and the evolved hydrogen volume was measured as a function of time.

Preparation of Ligands.

Example 1

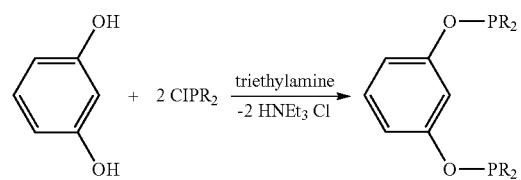

R = $^t$Bu, $^i$Pr, Et, Ph (a) R=iso-propyl: 1,3-bis(di-iso-propylphosphinooxy)benzene Resorcinol (3.5 g, 32 mmol) was dissolved in 100 ml of toluene and triethylamine (9.3 ml, 67 mmol) was then added to the reaction mixture. Chloro-di-iso-propylphosphine (10.6 ml, 67 mmol) in toluene (50 ml) was added dropwise to the reaction mixture at room temperature After 3 hours, the reaction mixture was then concentrated in vacuo. The product was then filtered in the drybox to remove the small amount of residual salt. Yield: 9.07 g (83%). $^1$H NMR (300 MHz, $C_6D_6$): δ 7.07 (m, 1 H, 2-H), 6.8 (m, 1 H, 5-H), 6.70 (m, 2H, 4- and 6-H), 1.89 (dsept., 4H, CH(CH$_3$)$_2$), 1.10 (m, 24H, CH(CH$_3$)$_2$). $^{31}$P{$^1$H}NMR (300 MHz, $C_6D_6$): δ 150.

(b) R=tertiary butyl: 1,3-bis(di-tert-butylphosphinooxy)benzene

This material was prepared according to a literature method (Göttker-Schnetmann, I.; White, P.; Brookhart, M. *J. Am. Chem. Soc.* 2004, 126, 1804-1811). Yield: 4.50 g (45%) Spectroscopic data are similar to the literature value (Göttker-Schnetmann, I.; White, P.; Brookhart, M. *J. Am. Chem. Soc.* 2004, 126, 1804-1811).

(c) R=phenyl: 1,3-bis(diphenylphosphinooxy)benzene

Resorcinol (3.5 g, 32 mmol) was dissolved in 100 ml of toluene and triethylamine (9.3 ml, 67 mmol) was added to the reaction. Chloro-di-phenylphosphine (14.78 g, 67 mmol) in toluene (50 ml) was then added dropwise at room temperature. The reaction mixture was filtered after 3 hours; the filtrate was collected and the solvent was then removed in vacuo to afford a white solid. Yield: 11.6 g (75%). $^1$H NMR (400 MHz, $C_6D_6$): δ 7.6-7.4 (m, 20 H, PPh$_2$), 7.19 (m, 1H, 2-H), 6.98 (m, 1H, 5-H), 6.84 (m, 2H, 4- and 6-H). $^{31}$P{$^1$H} NMR (400 MHz, $C_6D_6$): δ 113.

(d) R=ethyl: 1,3-bis(diethylphosphinooxy)benzene

This product was prepared analogously to 1,3-bis(di-iso-propylphosphinooxy)-benzene as described in Example 1(a). Yield: (94%). $^1$H NMR (400 MHz, $C_6D_6$): δ 6.98 (m, 1 H, 2-H), 6.68 (m, 1H, 5-H), 6.59 (m, 2H, 4- and 6-H), 1.60 (dsept., 8H, PCH$_2$CH$_3$), 1.04 (m, 12H, CH$_3$). $^{31}$P{$^1$H} NMR (400 MHz, $C_6D_6$): δ141.

The tridentate 'POP' ligand system was also investigated. Thus, 1,3-$C_6H_4$(OPR$_2$)$_2$ (R=isopropyl, tertiarybutyl, phenyl and ethyl) was prepared via the reaction of ClPR$_2$ with resorcinol in the presence of excess triethylamine. The new compound 1,3-bis(diisopropylphosphinooxy)benzene has a $^{31}$P NMR resonance at δ 150. An analogous reaction of chloro-diisopropylphosphine with 1,3-phenylenediamine affords the ligand N$^1$,N$^3$-bis(diisopropylphosphino)benzene-1,3-diamine.

Example 2

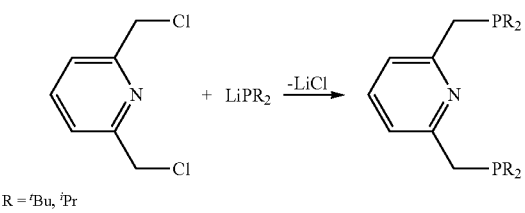

R = tBu, iPr

R=iso-propyl: 2,6-bis((di-iso-propylphosphino)methyl)pyridine

Chloro-di-iso-propylphosphine (10.0 g, 65.5 mmol) in 50 ml of tetrahydrofuran was added dropwise to a suspension of lithium (containing ca. 0.5% Na) granules (1.18 g, 170 mmol) in 50 ml of tetrahydrofuran and the mixture was stirred for 72 hours. The reaction mixture was then filtered, cooled to −80° C., and a solution of 2,6-bis(chloromethyl)pyridine (5.98 g, 34 mmol) in 20 ml of tetrahydrofuran was slowly added via a dropping funnel with vigorous stirring, resulting in the formation of a red solution. The mixture was allowed to warm to room temperature and was then refluxed for 1 hour; the color slowly changed from red to pale yellow with the formation of a precipitate. The reaction was followed by $^{31}P$ NMR spectroscopy to ensure completion and then the solvent was removed in vacuo. Hexanes (50 ml) and water (25 ml) were then added and the water layer was then removed. The hexanes layer was then filtered sequentially through a layer of sodium sulphate ($Na_2SO_4$) and silica gel and then the hexane was removed in vacuo to afford a yellow oil. Excess unreacted di-iso-propylphosphine was removed in vacuo at 70° C. for 2 hours. Yield: 8.2 g (37%). $^1H$ NMR (400 MHz, $C_6D_6$): δ 7.28 (m, 2 H, 3- and 5-H), 7.13 (m, 1H, 4-H), 3.12 (s, 4H, $CH_2$), 1.89 (m, 4H, $CH(CH_3)_2$), 1.23 (m, 24H, $CH(CH_3)_2$). $^{31}P\{^1H\}$ NMR (400 MHz, $C_6D_6$): δ 7.

Example 3

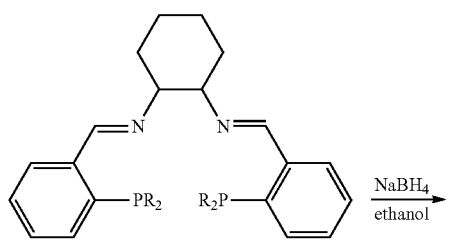

R = Ph, Tol, Xyl (a) R=Ph: $N^1,N^2$-bis(2-(diphenylphosphino)benzyl)cyclohexane-1,2-diamine;

(b) R=4-$CH_3$—$C_6H_4$ (Tol): N,N-bis(2-(di-p-tolylphosphino)benzyl)cyclohexane-1,2-diamine; (c) R=3,5-$(CH_3)_2C_6H_3$ (Xyl): $N^1,N^2$-bis(2-(bis(3,5-dimethylphenyl)phosphino)-benzyl)-cyclo-hexane-1,2-diamine.

A mixture of $N^1,N^2$-bis(2-(di-phenylphosphino)-benzylidene)-cyclohexane-1,2-diamine (2.18 g, 2.83 mmol) (prepared according to the literature procedure: Laue, S.; Greiner, L.; Woltinger, J.; Liese, A. *Adv. Synth. Catal.* 2001, 343, 711) and sodium borohydride ($NaBH_4$) (0.64 g, 17 mmol) in ethanol (30 ml) was refluxed with stirring for 6 hours. The resulting solution was cooled to room temperature and water (15 ml) was added to destroy excess $NaBH_4$. The mixture was extracted with $CH_2Cl_2$ and the combined extracts were washed with saturated ammonium chloride solution [$NH_4Cl$(aq)] and then water. The organic layer was dried over $MgSO_4$ and then filtered through silica gel. The filtrate was then evaporated to dryness to obtain a yellow solid. Yield: 2.0 g (91%). $^1H$ NMR (400 MHz, $CD_2Cl_2$): δ 7.58-6.80 (m, 20 H, Ph-H), 3.86 (d, 4H, $NCH_2$), 3.65 (br, 2H, NH), 2.21 (s, 24H, $CH_3$), 1.80 (m, 8H, cyclohexane-H). $^{31}P\{^1H\}$ NMR (400 MHz, $CD_2Cl_2$): δ−13.

The tetradentate 'P$_2$N$_2$' ligand $N^1,N^2$-bis(2-(diphenylphosphino)-benzylidene)cyclohexane-1,2-diamine was prepared in high yield by the condensation of diaminocyclohexane with 2-(diphenylphosphino)-benzaldehyde in the presence of magnesium sulfate (J.-X. Gao, H. Zhang, X.-D. Yi, P.-P. Xu, C.-L. Tang, H.-L. Wan, K.-R. Tsai, T. Ikariya, *Chirality* 2000, 12, 383). A sodium borohydride reduction of the material readily affords another tetradentate ligand (Laue, S.; Greiner, L.; Woltinger, J.; Liese, A. *Adv. Synth. Catal.* 2001, 343, 711).

Example 4

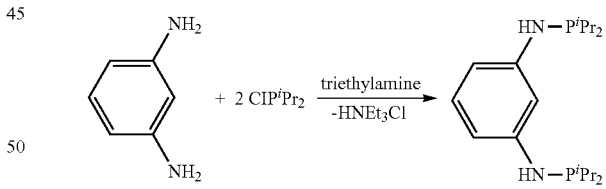

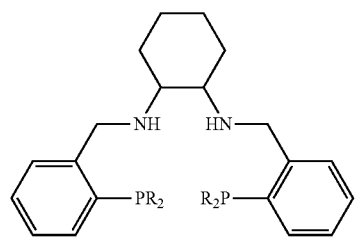

$N^1,N^3$-bis(di-iso-propylphosphino)benzene-1,3-diamine

Chloro-di-iso-propylphosphine (5.92 g, 38.8 mmol) was added dropwise to a flask charged with 1,3-phenylenediamine (2 g, 18.5 mmol) and triethylamine (3.92 g, 38.8 mmol) in toluene (50 ml). After 3 hours, a solid precipitate was removed by filtration and then the solvent was removed from the filtrate. The residue was then extracted with hexanes (50 ml×2); the hexanes portions were filtered and the solvent was evaporated to give a pale yellow solid. Yield 3.92 g (62%). $^1H$ NMR (300 MHz, $C_6D_6$): δ 7.02 (m, 1 H, 2-H), 6.98 (m, 1H, 5-H), 3.30 (d, 2H, NH), 1.37 (dsept., 4H, CH(CH$_3$)$_2$), 0.88 (m, 24H, CH(CH$_3$)$_2$). $^{31}$P{$^1$H} NMR (300 MHz, C$_6$D$_6$): δ 42.

Example 5

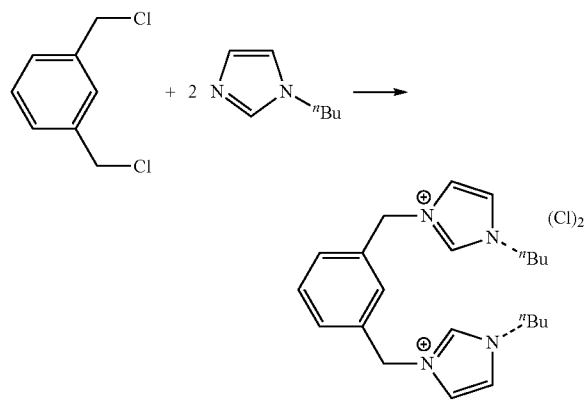

3,3'-(1,3-phenylenebis(methylene))bis(1-butyl-1H-imidazol-3-ium)chloride

A neat solution of 1,3-bis(chloromethyl)benzene (3.5 g, 20 mmol) and n-butyl imidazole (5.0 g, 40 mmol) was stirred at 140° C. for 20 hours. After the mixture was cooled to room temperature, the residue was dissolved in CH$_2$Cl$_2$ and the product precipitated by the addition of Et$_2$O (500 ml), affording a very hygroscopic pale yellow solid. Yield: 6.7 g (78%). $^1$H NMR (400 MHz, CDCl$_3$): δ 10.82 (s, 2H, NCHN), 8.26 (s, 2H, imidazole-H), 7.61 (d, 2H, $^3$J$_{HH}$=9.2 Hz, pyridine-H), 7.34 (s, 2H, imidazole-H), 7.23 (t, 1H, $^3$J$_{HH}$=8 Hz, pyridine-H), 5.61 (s, 4H, CH$_2$), 4.24 (t, 4H), 1.84 (quintet, 4H), 1.30 (sextet, 4H), 0.91 (t, 6H).

Example 6

(a) 2,2'-oxybis(ethane-2,1-diyl)bis(di-iso-propylphosphine)

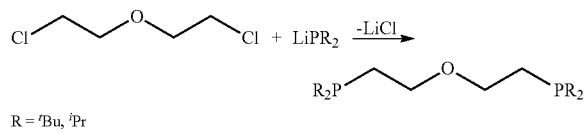

R = $^t$Bu, $^i$Pr

Chloro-di-iso-propylphosphine (10.0 g, 65.5 mmol) in 50 ml of tetrahydrofuran was added dropwise to a suspension of lithium (containing ca. 0.5% Na) granules (1.18 g, 170 mmol) in 50 ml of tetrahydrofuran and the mixture was stirred for 72 hours. The reaction mixture was then filtered, cooled to 0° C., and a solution of 1-chloro-2-(2-chloroethoxy)ethane (4.68 g, 32 mmol) in 20 ml of tetrahydrofuran was slowly added via a dropping funnel with vigorous stirring, resulting in the formation of a grey solution. The mixture was allowed to warm to room temperature and was then refluxed for 2 hour; the color slowly changed from grey to pale yellow and a large amount of precipitate formed. The reaction was followed by $^{31}$P NMR spectroscopy to ensure completion and then the solvent was removed in vacuo. Hexanes (50 ml) and water (25 ml) were then added and the water layer was then removed. The hexanes layer was then filtered sequentially through a layer of sodium sulfate (Na$_2$SO$_4$) and silica gel and then the hexane was removed in vacuo to afford a colorless liquid. Excess unreacted di-iso-propylphosphine and 1-chloro-2-(2-chloroethoxy)ethane can be removed in vacuo at 70° C. for 2 hours. Yield: 8.3 g (83%). $^1$H NMR (400 MHz, C$_6$D$_6$): δ 3.56 (m, 8H, CH$_2$), 1.64 (m, 4H, CH(CH$_3$)$_2$), 1.02 (m, 24H, CH(CH$_3$)$_2$). $^{31}$P{$^1$H} NMR (400 MHz, C$_6$D$_6$): d −7.

(b) 2,2'-oxybis(ethane-2,1-diyl)bis(ditertiarybutylphosphine)

The compound 2,2'-oxybis(ethane-2,1-diyl)bis(ditertiarybutylphosphine) was prepared according to the literature procedure (Timmer, K.; Thewissen, D. H. M. W.; Marsman, J. W. *Recl. Trav. Chim. Pays-Bas* 1988, 107, 248).

The 'POP' pincer ligand 2,2'-oxybis(ethane-2,1-diyl)bis(diisopropylphosphine) was prepared by the reaction of 1-chloro-2-(2-chloroethoxy)ethane with lithium diisopropylphosphide. The ligand has a $^{31}$P NMR resonance at 8-7 and the expected $^1$H NMR signals. The tertiarybutyl analogue 2,2'-oxybis(ethane-2,1-diyl)bis(ditertiarybutylphosphine) was prepared similarly.

Example 7

(a) Bis(2-ditertiarybutylphosphino)ethyl)amine (R$_2$PCl; R=tertiarybutyl)

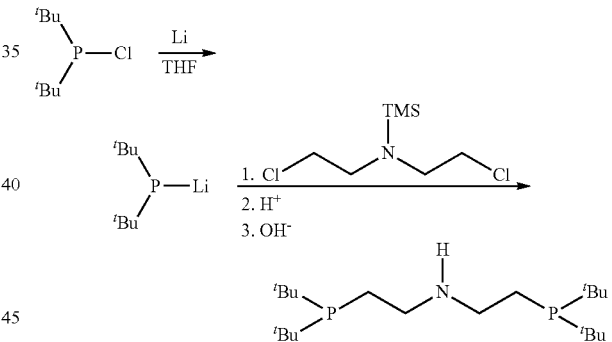

Chloroditertbutylphosphine (15.0 g, 83 mmol) in tetrahydrofuran (50 ml) was added through a dropping funnel to a suspension of lithium granules (containing ca. 0.5% Na, 1.50 g, 216 mmol) in tetrahydrofuran (50 ml). The resulting suspension was stirred vigorously at room temperature for 72 hours. The reaction mixture was then decanted through a metal cannula; the solution was then cooled to −80° C. and a solution of bis(chloroethyl)trimethylsilyl amine (9.00 g, 42.0 mmol) in tetrahydrofuran (10 ml) was slowly added through a dropping funnel with vigorous stirring. The mixture was then allowed to warm to room temperature and refluxed for 1 hour. The reaction was then cooled to room temperature and cooled to 0° C. again. Degassed sulfuric acid (2M, 42 ml) was added to the reaction mixture through a dropping funnel. It was then stirred at room temperature for 1 hour. Sodium hydroxide solution (4M, 40 ml, 160 mmol) was then added through a dropping funnel. After thirty minutes, the aqueous layer was removed by cannula and the organic layer was washed with two portions of degassed water. The organic layer was then dried with magnesium sulfate. After stirring for one hour, the magnesium sulfate was filtered off through a pad of silica gel and the solvent was removed in vacuo to yield a colorless liquid (10.34 g, 68%). $^1$H NMR (400 MHz, $C_6D_6$): δ 2.72 (q, 4 H, $CH_2$), 1.47 (m, 4H, $CH_2$), 1.00 (d, 36H, $CH_3$). $^{31}P\{^1H\}$ NMR (162 MHz, $C_6D_6$): δ 22.2.

The tridentate 'PNP' ligands $N(H)(CH_2CH_2PR_2)_2$ (R=tertiarybutyl, adamantyl, isopropyl, cyclohexyl, ethyl) were prepared by reaction of the appropriate phosphide (e.g. lithium ditertiarybutyl phosphide, $LiP^tBu_2$) with bis(chloroethyl) trimethylsilyl amine, followed by nitrogen deprotection (Scheme 1). The $^{31}P$ NMR resonance for bis(2-(ditertiarybutyl)ethyl)amine appears at δ 22.2 and the $^1$H NMR spectrum of this material shows the expected chemical shifts. The isopropyl, ethyl, cyclohexyl, and adamantyl substituted derivatives were prepared similarly in good yield and purity.

(b) Bis(2-(di-1-propylphosphino)ethyl)amine ($R_2PCl$; R=isopropyl)

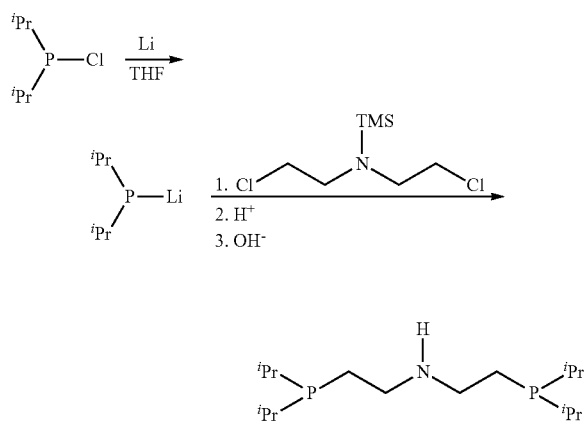

Chlorodiisopropylphosphine (14.5 g, 95.3 mmol) in tetrahydrofuran (100 ml) was added through a dropping funnel to a suspension of lithium granules (containing ca. 0.5% Na 1.72 g, 247 mmol) in tetrahydrofuran (50 ml). The resulting suspension was stirred vigorously at room temperature for 72 hours. The reaction mixture was then decanted through a metal cannula; the solution was then cooled to −80° C. and a solution of bis(chloroethyl) trimethylsilyl amine (10.33 g, 48.2 mmol) in tetrahydrofuran (10 ml) was slowly added through a dropping funnel with vigorous stirring. The mixture was then allowed to warm to room temperature and was refluxed for four hours. The reaction was then cooled to room temperature and cooled to 0° C. again. Degassed sulfuric acid (2M, 50 ml) was added to the reaction mixture through a dropping funnel and the mixture was then stirred at room temperature for one hour. Sodium hydroxide solution (4M, 50 ml) was then added through a dropping funnel. After 30 minutes, the aqueous layer was decanted by cannula and the organic layer was washed with two portions of degassed water. The organic layer was then dried with magnesium sulfate. After stirring for one hour, the magnesium sulfate was filtered off through a pad of silica gel and the solvent was removed in vacuo to yield a colorless liquid (8.0 g, 54%). $^1$H NMR (400 MHz, $C_6D_6$): δ 2.70 (q, 4 H, $CH_2$), 1.47 (t, 4H, $CH_2$), 1.47 (overlapped, m, 4H, $CH_2$), 0.90 (m, 24H, $CH_3$). $^{31}P\{^1H\}$ NMR (162 MHz, $C_6D_6$): δ−0.95.

c) R=Bis(2-(di-ethylphosphino)ethyl)amine ($R_2PCl$; R=ethyl)

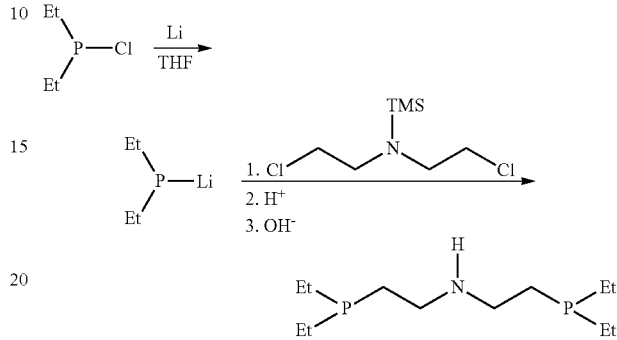

Chlorodiethylphosphine (10 g, 9.7 ml, 80.3 mmol) in tetrahydrofuran (15 ml) was added through a dropping funnel to a suspension of lithium granules (containing ca. 0.5% Na) (1.46 g, 210 mmol) in tetrahydrofuran (50 ml). The resulting suspension was stirred vigorously at room temperature for 72 hours. The reaction mixture was then decanted through a metal cannula; the solution was then cooled to −80° C. and a solution of bis(chloroethyl)trimethylsilyl amine (8.56 g, 40.0 mmol) in tetrahydrofuran (10 ml) was slowly added through a dropping funnel with vigorous stirring. The mixture was then allowed to warm to room temperature and was refluxed for 6 hours. The reaction was then cooled to 0° C. Degassed sulfuric acid (2M, 40 ml) was added to the reaction mixture through a dropping funnel. It was then stirred at room temperature for 1 hour. Sodium hydroxide solution (4 M, 40 ml, 160 mmol) was then added through a dropping funnel. After thirty minutes, the aqueous layer was decanted by cannula and the organic layer was washed with two portions of degassed water. The organic layer was then dried with magnesium sulfate. After stirring for one hour, the magnesium sulfate was filtered off through a pad of silica gel and the solvent was concentrated to yield a colorless liquid (7 g, 70%). $^1$H NMR (400 MHz, $C_6D_6$): δ 2.65 (q, 4 H, $CH_2$), 1.47 (t, 4H, $CH_2$), 1.25 (quartet, 8H, ethyl-$CH_2$), 0.96 (quintet, 12H, ethyl-$CH_3$). $^{31}P\{^1H\}$ NMR (162 MHz, $C_6D_6$): δ−26.8.

Example 8

(a) Bis(2-(dicyclohexylphosphino)ethyl)amine ($R_2PH$; R=cyclohexyl)

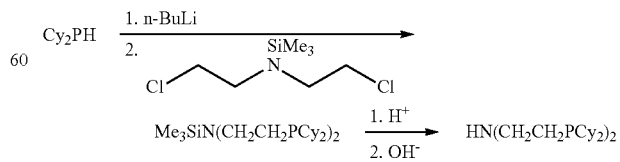

To dicyclohexylphosphine (5.09 g, 25.6 mmol) in tetrahydrofuran (50 ml) was added n-butyllithium (11.3 ml, 2.5 M in hexanes, 28.3 mmol) through a dropping funnel at 0° C. The resulting suspension was allowed to reflux for one hour at 60° C. and then the solution was cooled to −80° C. A solution of bis(chloroethyl) trimethylsilyl amine (2.75 g, 12.8 mmol) in tetrahydrofuran (30 ml) was slowly added through a dropping funnel with vigorous stirring. The mixture was then allowed to warm to room temperature and was refluxed for 3 hours and then the reaction was cooled to room temperature and cooled to 0° C. again. Degassed sulfuric acid (2 M, 13 ml, 26 mmol) was added to the reaction mixture through a dropping funnel. It was then stirred at room temperature for 1 hour. Sodium hydroxide (4 M, 13 ml, 52 mmol) was then added through a dropping funnel. After 30 minutes, the aqueous layer was decanted by cannula and the organic layer was washed with two portions of degassed water. The organic layer was then dried with magnesium sulfate. After stirring for one hour, the magnesium sulfate was filtered off through a pad of silica gel and the solvent was concentrated to yield a colorless liquid (4.8 g, 80%). $^1$H NMR (400 MHz, C$_6$D$_6$): δ 2.65 (m, 4 H, CH$_2$), 1.60-1.80 (b, 20H, cyclohexyl-H), 1.50 (m, 4H, CH$_2$), 1.05-1.30 (b, 24H, cyclohexyl-H). $^{31}$P{$^1$H} NMR (162 MHz, C$_6$D$_6$): δ −16.9.

(b) Bis(2-(ditertiarybutylphosphino)ethyl)amine (R$_2$PH; R=tertiarybutyl)

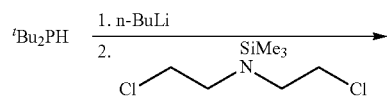

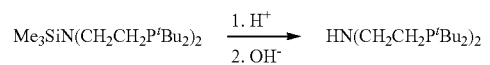

c) Bis(2-(diadamantylphosphino)ethyl)amine (R$_2$PH; R=adamantyl)

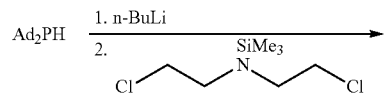

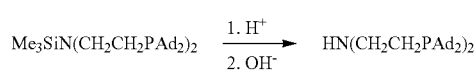

Prepared analogously to the R=cyclohexyl analogue. The yield and purity are similar to that obtained by method using lithium metal reduction of the chloro ditertiarybutylphosphine. Yield: (4.6 g, 84%) $^1$H NMR (400 MHz, C$_6$D$_6$): δ 2.60 (m, 4 H, CH$_2$), 1.80 (d, 20H, adamantyl-H), 1.65 (s, 24 H, adamantyl-H). $^{31}$P{$^1$H} NMR (162 MHz, C$_6$D$_6$): δ 20.9.

Example 9 a) Bis(2-(diisopropylphosphino)ethyl)methylamine

CH$_3$N(CH$_2$CH$_2$PR$_2$)$_2$ (R=isopropyl)

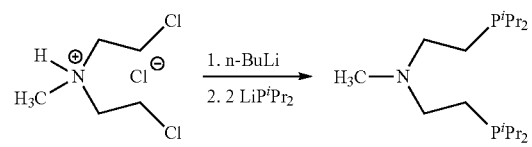

Chlorodiisopropylphosphine (4.76 g, 4.76 ml, 31 mmol) in tetrahydrofuran (50 ml) was added through a dropping funnel to a suspension of lithium granules (containing ca. 0.5% Na) (0.63 g) in tetrahydrofuran (50 ml). The resulting suspension was stirred vigorously at room temperature for 72 hours to afford a lithium diisopropylphosphide solution. The reaction mixture was then decanted through a metal cannula, and the solution was then cooled to −80° C. To bis(chloroethyl)methyl ammonium chloride (3 g, 15.6 mmol) in tetrahydrofuran (30 ml) was added dropwise n-butyllithium (2.5 M in hexanes, 6.24 ml, 15.6 mmol) through a dropping funnel at 0° C. The reaction was stirred at 0° C. for thirty minutes. This solution was then added to the above lithium diisopropylphosphide solution at 0° C. with vigorous stirring. The mixture was then allowed to warm to room temperature and was refluxed for 3 hours. Degassed water (50 ml) was then added to the reaction mixture. The aqueous layer was decanted by cannula and the organic layer was washed with two portions of degassed water. The organic layer was then dried with magnesium sulfate. After stirring for an hour, the magnesium sulfate was filtered off through a pad of silica gel and the solvent was concentrated to yield a colorless liquid (3.5 g, 70%). $^1$H NMR (400 MHz, C$_6$D$_6$): δ 2.64 (m, 4 H, CH$_2$), 2.21 (s, 3H, CH$_3$), 1.59 (overlapped, m, 4H, CH$_2$), 1.59 (overlapped, m, 4 H, PCH(CH$_3$)$_2$), 1.03 (m, 24 H, PCH(CH$_3$)$_2$). $^{31}$P{$^1$H} NMR (162 MHz, C$_6$D$_6$): δ 1.6.

b) Bis(2-(ditertiarybutylphosphino)ethyl)methylamine

CH$_3$N(CH$_2$CH$_2$PR$_2$)$_2$ (R=tertiarybutyl)

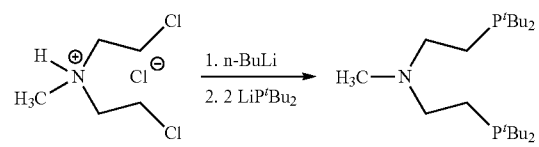

n-Butyllithium (12.4 ml of 2.5 M in hexanes, 31 mmol) was added dropwise to 45.4 ml of 10 wt % (31 mmol) ditertiarybutyl phosphine in tetrahydrofuran and the mixture was heated to reflux for one hour to afford a ditertiarybutylphosphide solution, which was subsequently cooled to −80° C. A suspension of 2-chloro-N-(2-chloroethyl)-N-methylethanaminium chloride (3.0 g, 15.5 mmol) was cooled to 0° C. in 50 ml of tetrahydrofuran and then 6.2 ml of 2.5 M n-butyllithium (15.5 mmol, solution in hexanes) was added dropwise over ca. ten minutes. The mixture was stirred at 0° C. for twenty minutes and was then was cooled to −80° C. The solution was then transferred via cannula to the reaction vessel containing the lithium di-tertiarybutylphosphide solution at −80° C. and was warmed to room temperature. After refluxing the mixture for 4 hours the solution was concentrated to ca. 20 ml and then 50 ml of hexanes was added. The solution was washed with three 20 ml portions of degassed water and was then dried over magnesium sulfate. After filtration through a small plug of magnesium sulfate and silica gel, the solvent was removed in vacuo to afford a colorless high purity oil. Yield 4.7 g, 80%. $^1$H NMR (400 Mhz, $C_6D_6$): δ 2.49 (m, 4H, $CH_2$); 2.01 (s, 3H, $NCH_3$); 1.39 (m, 4H, $CH_2$); 0.82 (d, $^3J_{PH}$=10.5 Hz, 36H, $C(CH_3)_3$). $^{31}$P NMR (121.5 Hz, $C_6D_6$): δ 25.6.

c) Bis(2-(diadamantylphosphino)ethyl)methylamine $$CH_3N(CH_2CH_2PR_2)_2 \ (R=adamantyl)$$

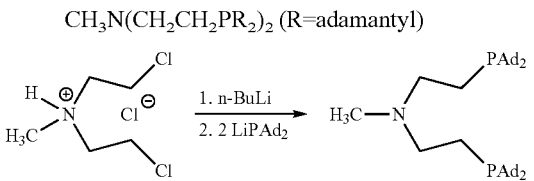

The adamantyl analogue was prepared in a similar fashion except that the di-adamantylphosphide was prepared by reacting diadamantylphosphine with n-butyllithium under reflux for 2 hours (Yield: 8.3 g, 77%). $^1$H NMR (400 MHz, $C_6D_6$): δ 2.47 (m, 4 H, $CH_2$), 2.29 (s, 3H, $CH_3$), 1.73-1.92 (b, 60H, adamantyl-H), 1.53 (m, 4H, $CH_2$). $^{31}$P{$^1$H} NMR (162 MHz, $C_6D_6$): δ 22.5 (ca. 60%), 18.8 (ca. 40%).

(d) Bis(2-diphenylphosphino)ethyl)methylamine $$CH_3N(CH_2CH_2PR_2)_2 \ (R=phenyl)$$

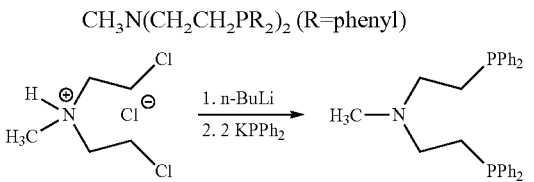

n-Butyllithium (6.2 ml of 2.5 M in hexanes, 15.5 mmol) was added dropwise to 3.00 g (15.5 mmol) of 2-chloro-N-(2-chloroethyl)-N-methylethan-aminium chloride in 50 ml of tetrahydrofuran at 0° C. over ca. ten minutes. The mixture was stirred for twenty minutes at 0° C. and was then cooled to −80° C. 62 ml of 0.5 M (31 mmol) of potassium diphenylphosphide in tetrahydrofuran was added and the mixture was then heated to reflux for two hours. After concentrating the solution in vacuo to ca. 20 ml, 50 ml of hexanes was added. The solution was washed with two 20 ml portions of degassed water, dried over magnesium sulfate and then filtered through a plug of magnesium sulfate and silica gel. The solvent was removed in vacuo affording a colorless oil. Yield 5.705 g, 87%. $^1$H NMR (400 Mhz, $C_6D_6$): δ 7.04-7.7.47 (m, 20H, $C_6H_5$); 2.46 (m, 4H, $CH_2$); 2.11 (m, 4H, $CH_2$); 2.02 (s, 3H, $CH_3$). $^{31}$P NMR (162 MHz, $C_6D_6$): δ−18.8.

A ligand system $N(CH_3)(CH_2CH_2PR_2)_2$ (R=isopropyl, tertiarybutyl, adamantyl, phenyl was prepared via the reaction of a phosphide (e.g. lithium ditertiarybutyl phosphide, $LiP^tBu_2$) with bis(chloroethyl)methyl amine. This latter material was prepared in situ by the reaction of bis(chloroet-hyl)methyl ammonium chloride with n-butyl lithium at 0° C. The $^{31}$P NMR spectrum of bis(2-(ditertiarybutyl)ethyl)methylamine has a resonance at δ 25.6 whereas the $^1$H NMR spectrum of this ligand indicates the presence of tertiarybutyl, methylene and methyl groups.

Other structurally similar 'PNP' ligand systems were prepared using previously reported procedures. For example, bis(2-diisopropylphosphino-4-methylphenyl)amine was synthesized (Scheme 12) as described by Ozerov and coworkers (Fan, L.; Foxman, B. M.; Ozerov, O. V. *Organometallics* 2004, 23, 326-328), whereas 2,6-bis((diisopropylphosphino)methyl)pyridine (Scheme 13) was prepared via the reaction of lithium diisopropylphosphide with 2,6-bis(chloromethyl)pyridine. A 'PNN' ligand system $N^1$-(2-(di-adamantylphosphino)ethyl)-$N^2$,$N^2$-diethylethane-1,2-diamine was prepared analogously to a literature procedure (Choualeb, A.; Lough, A. J.; Gusev, D. G. *Organometallics* 2007, 26, 5224-5229).

Example 10

Bis(2-diisopropylphosphino-4-methylphenyl)amine a) Synthesis of bis(2-bromo-4-methylphenyl)amine

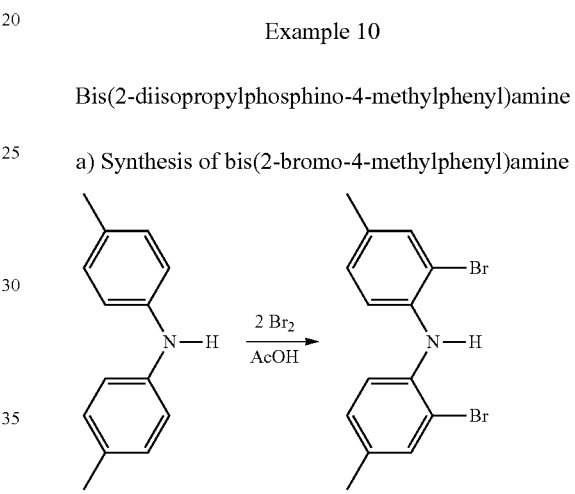

The compound was prepared according to the literature procedure (Gilman, H.; Zuech, E. A.; *J. Org. Chem.* 1961, 3481-3484). Yield: (4.51 g, 49%). $^1$H NMR (400 MHz, $CDCl_3$): δ 7.38 (s, 1H, PhH), 7.08 (d, 1H, PhH), 6.9 (d, 1H, PhH), 6.1 (br s, 1H, NH), 2.26 (s, 6H, $CH_3$).

b) Synthesis of bis(2-diisopropylphosphino-4-methylphenyl)amine

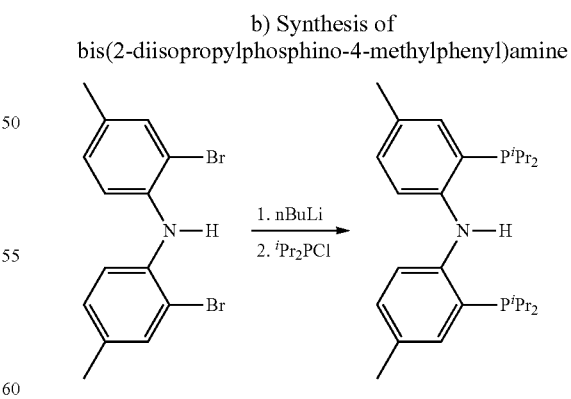

The compound was prepared according to the literature procedure (Fan, L.; Foxman, B. M.; Ozerov, O. V.; *Organometallics* 2004, 23, 326-328). Yield: (2.38 g, 98%) $^1$H NMR (400 MHz, $C_6D_6$): δ 8.28 (t, 1H, $J_{P-H}$=8 H, NH), 7.38 (d, 2H, J=6 Hz, PhH), 7.19 (s, 2H, PhH), 6.91 (d, 2H, J=8 Hz, PhH), 2.18 (s, 6H, $PhCH_3$), 2.01 (m, 4H, $CHCH_3$), 1.12 (dd, 12H, J=15 Hz, J=7 Hz, CHCH$_3$), 0.97 (dd, 12H, CHCH$_3$). $^{31}$P{$^1$H} NMR (162 MHz, C$_6$D$_6$): δ –12.9.

Example 11

2,6-bis((diisopropylphosphino)methyl)pyridine

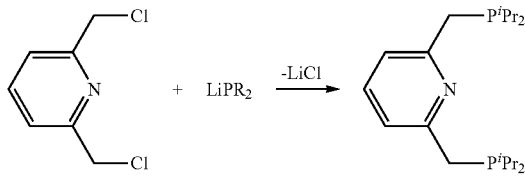

Chloro diisopropylphosphine (10.0 g, 65.5 mmol) in 50 ml of tetrahydrofuran was added dropwise to a suspension of lithium (containing ca. 0.5% Na) granules (1.18 g, 170 mmol) in 50 ml of tetrahydrofuran and the mixture was stirred for 72 hours. The reaction mixture was then filtered, cooled to –80° C., and a solution of 2,6-bis(chloromethyl)pyridine (5.98 g, 34 mmol) in 20 ml of tetrahydrofuran was slowly added via a dropping funnel with vigorous stirring, resulting in the formation of a red solution. The mixture was allowed to warm to room temperature and was then refluxed for one hour. The reaction was followed by $^{31}$P NMR spectroscopy to ensure completion and then the solvent was removed in vacuo. Hexanes (50 ml) and water (25 ml) were then added and the water layer was then removed. The hexanes layer was then filtered sequentially through a layer of sodium sulfate (Na$_2$SO$_4$) and silica gel and then the hexane was removed in vacuo to afford a yellow oil. Excess unreacted diisopropylphosphine can be removed in vacuo at 70° C. for 2 hours. Yield: 8.2 g (37%). $^1$H NMR (400 MHz, C$_6$D$_6$): δ 7.28 (m, 2 H, 3- and 5-H), 7.13 (m, 1H, 4-H), 3.12 (s, 4H, CH$_2$), 1.89 (m, 4H, CH(CH$_3$)$_2$), 1.23 (m, 24H, CH(CH$_3$)$_2$). $^{31}$P{$^1$H} NMR (162 MHz, C$_6$D$_6$): δ 7.0.

The compound 2,6-bis((ditertiarybutylphosphino)methyl)pyridine was prepared in an analogous manner. $^{31}$P NMR spectroscopy indicated a mixture formed. $^{31}$P{$^1$H} NMR (162 MHz, C$_6$D$_6$): δ 35.7 (40%); 31.4 (10%); 31.1 (50%).

Example 12

(Phenylphosphinediyl)dimethanol

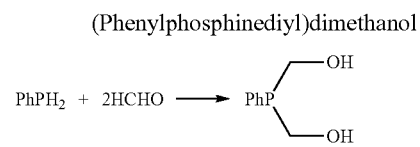

This material was prepared according to the literature procedure: Higham, L. J.; Whittlesey, M. K.; Wood, P. T. *J. Chem. Soc., Dalton Trans.* 2004, 4202). $^1$H NMR (400 Mhz, C$_6$D$_6$): δ 7.50 (m, 2H, C$_6$H$_5$); 7.15 (m, 3H, C$_6$H$_5$); 4.10 (d, $_2$J$_{PH}$=9.9 Hz, CH$_2$); 2.41 (br s, 2H, OH). $^{31}$P NMR (162 Mhz, C$_6$D$_6$): –14.9.

Example 13

N,N'-(phenylphosphinediyl)bis(methylene)dipropan-2-amine

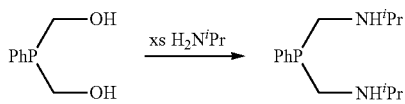

Degassed isopropyl amine (1 ml, 11.6 mmol) of was added to 491 mg (2.886 mmol) of (phenylphosphinediyl)dimethanol (PhP(CH$_2$OH)$_2$) and the mixture was stirred overnight. The excess amine was removed in vacuo to afford the product as a viscous colorless oil. $^1$H NMR (400 Mhz, C$_6$D$_6$): δ 7.55 (m, 2H); 7.09 (m, 3H); 3.11 (m, 4H); 2.68 (m, 2H); 0.89 (m, 12H). $^{31}$P NMR (162 Mhz, C$_6$D$_6$): –29.5.

Example 13

N$^1$-(2-(diadamantylphosphino)ethyl)-N$^2$,N$^2$-diethyl-ethane-1,2-diamine a) N$^1$,N$^1$-diethyl-N$^2$-(2-hydroxyethyl)ethane-1,2-diamine hydrochloride

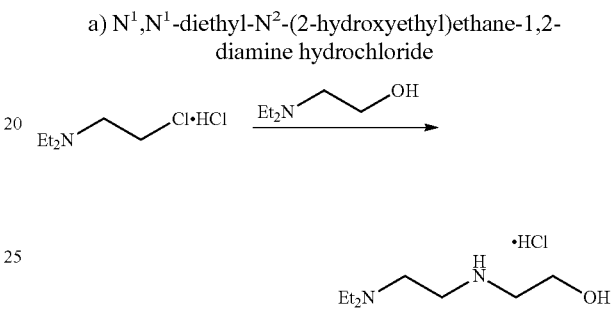

The compound was prepared according to the literature procedure (Choualeb, A.; Lough, A. J.; Gusev, D. G. *Organometallics* 2007, 26, 5224-5229). $^1$H NMR (methanol-d$_4$): δ 3.68 (t, $^3$J$_{HH}$=5.6, 2H, CH$_2$O), 3.06 (t, $^3$J$_{HH}$=5.6, 2H, CH$_2$NH), 2.97 (m, 4H, NCH$_2$CH$_2$N), 2.84 (q, $^3$J$_{HH}$=7.3, 4H, NCH$_2$), 1.11 (t, $^3$J$_{HH}$=7.3, 6H, CH$_3$).

b) N$^1$-(2-chloroethyl)-N$^2$,N$^2$-diethylethane-1,2-diaminium chloride

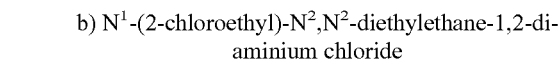

A solution of thionyl chloride (SOCl$_2$) (16.9 g, 0.14 mol) in dichloromethane (20 ml) was added dropwise to a vigorously stirred suspension of N$^1$,N$^1$-diethyl-N$^2$-(2-hydroxyethyl)ethane-1,2-diaminium chloride (21 g, 0.11 mol) in dichloromethane (120 ml) which was cooled at 0° C. The ice bath was removed and the reaction mixture was allowed to stir at room temperature for 1 hour. The mixture was then allowed to reflux for 1 hour. After cooling, the suspension was filtered and the product was washed with dichloromethane (40 ml) to give a colorless solid. (20 g, 78%). $^1$H NMR (methanol-d$_4$): δ 4.03 (t, $^3$J$_{HH}$=6.1, 2H, CH$_2$Cl), 3.68 (br s, 4 H, CH$_2$NH), 3.61 (t, $^3$J$_{HH}$=5.7, 2H, Et$_2$NCH$_2$), 3.38 (q, $^3$J$_{HH}$=7.3, 4H, CH$_3$CH$_2$), 1.43 (t, $^3$J$_{HH}$=7.3, 6H, CH$_3$).

c) N[1]-(2-(diadamantylphosphino)ethyl)-N[2],N[2]-diethylethane-1,2-diamine

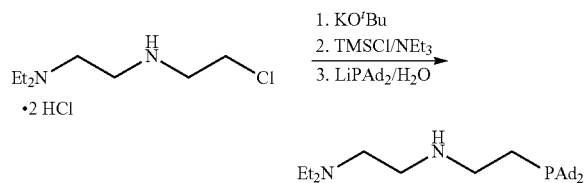

A solution of lithium diadamantylphosphide was prepared by refluxing 5.92 ml of 2.5 M n-butyllithium (14.8 mmol) in hexanes with diadamantylphosphine (4.47 g, 14.8 mmol) in tetrahydrofuran for one hour. The mixture was cooled to −80° C. and was transferred by cannula to the N[1]-(2-chloroethyl)-N[2], N[2]-diethyl-N[1]-(trimethylsilyl)ethane-1,2-diamine solution (also at −80° C.). The mixture was warmed to room temperature, and then heated at reflux for one hour. 10 ml of water was then added and the mixture was heated to reflux for three hours. The volume was concentrated in vacuo to ca. 10 ml and then 50 ml of hexanes was added. The solution was washed with three 20 ml portions of degassed water and was then dried over magnesium sulfate. It was then filtered through a small plug of silica gel/magnesium sulfate and the plug was washed with 20 ml of hexanes. The solvent was removed in vacuo to afford a colorless solid. The spectroscopic data was not obtained due to the low solubility of the ligand.

Example 14

(N[1]E,N[2]E)-N[1],N[2]-bis(2-(diphenylphosphino)benzylidene)cyclohexane-1,2-diamine

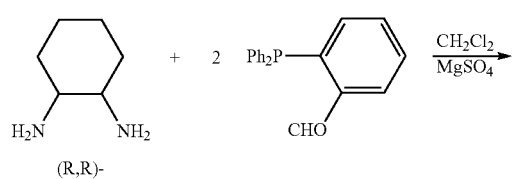

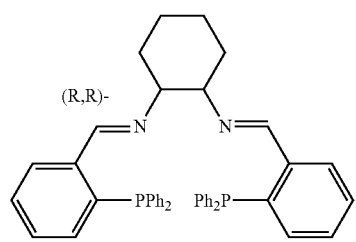

This material was prepared according to a literature procedure (J.-X. Gao, H. Zhang, X.-D. Yi, P.-P. Xu, C.-L. Tang, H.-L. Wan, K.-R. Tsai, T. Ikariya, *Chirality* 2000, 12, 383). Yield: 8.0 g (92%). $^1$H NMR (400 MHz, CD$_2$Cl$_2$): δ 8.51 (m, 2H); 7.65 (m, 2H); 7.23-7.10 (m, 24H); 6.75 (m, 2H); 2.97 (m, 2H); 1.59 (m, 2H); 1.33 (m, 4H); 1.19 (m, 2H). $^{31}$P{$^1$H} NMR (162 MHz, CD$_2$Cl$_2$): δ−12.4.

Example 15

N[1],N[2]-bis(2-(diphenylphosphino)benzyl)cyclohexane-1,2-diamine

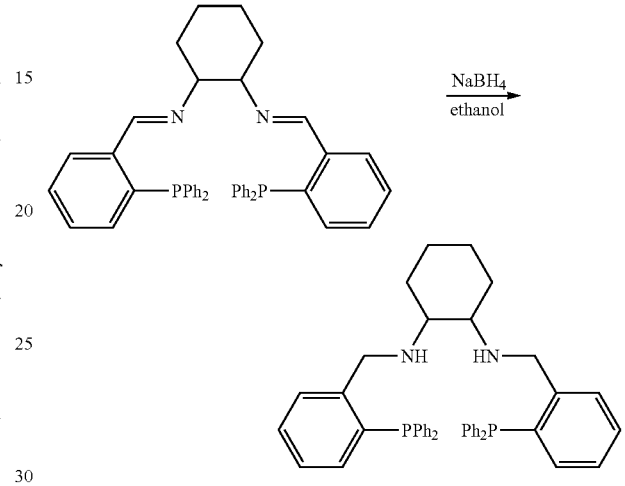

A mixture of N[1],N[2]-bis(2-(diphenylphosphino)benzylidene)cyclohexane-1,2-diamine (2.18 g, 2.83 mmol) (prepared according to the literature procedure: Laue, S.; Greiner, L.; Woltinger, J.; Liese, A. *Adv. Synth. Catal.* 2001, 343, 711) and sodium borohydride (NaBH$_4$) (0.64 g, 17 mmol) in ethanol (30 ml) was refluxed with stirring for 6 hours. The resulting solution was cooled to room temperature and water (15 ml) was added to destroy excess NaBH$_4$. The mixture was extracted with dichloromethane and the combined extracts were washed with saturated aqueous ammonium chloride solution [NH$_4$Cl] and then water. The organic layer was dried over magnesium sulfate and then filtered through silica gel. The filtrate was then evaporated to dryness to obtain a yellow solid. Yield: 2.0 g (91%). $^1$H NMR (400 MHz, CD$_2$Cl$_2$): δ 7.58-6.80 (m, 20H, Ph-H), 3.86 (d, 4H, NCH$_2$), 3.65 (br, 2H, NH), 2.21 (s, 24H, CH$_3$), 1.80 (m, 8H, cyclohexane-H). $^{31}$P{$^1$H} NMR (162 MHz, CD$_2$Cl$_2$): δ−13.

Example 16

3,3'-(1,3-phenylenebis(methylene))bis(1-butyl-1H-imidazol-3-ium)chloride

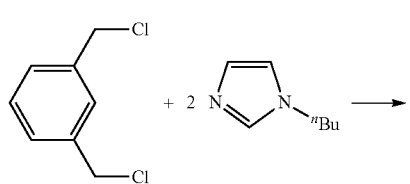

-continued

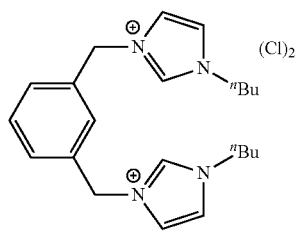

The compounds were prepared according to the literature procedure (Caballero, A.; Diez-Barra, E.; Jalon, F. A.; Merino, S.; Tejeda, J. *J. Organomet. Chem.* 2001, 617-618, 395-398 and b) Simons, R. S.; Custer, P.; Tessier, C. A.; Youngs, W. J.; *Organometallics* 2003, 22, 1979-1982). A neat solution of 1,3-bis(chloromethyl)benzene (3.5 g, 20 mmol) and n-butyl imidazole (5.0 g, 40 mmol) was stirred at 140° C. for 20 hours. After the mixture was cooled to room temperature, the residue was dissolved in dichloromethane and the product precipitated by the addition of diethyl ether (500 ml), affording a very hygroscopic pale yellow solid. Yield: 6.7 g (78%). $^1$H NMR (400 MHz, CDCl$_3$): δ 10.82 (s, 2H, NCHN), 8.26 (s, 2H, imidazole-H), 7.61 (d, 2H, $^3J_{HH}$=9.2 Hz, pyridine-H), 7.34 (s, 2H, imidazole-H), 7.23 (t, 1H, $^3J_{HH}$=8 Hz, pyridine-H), 5.61 (s, 4H, CH$_2$), 4.24 (t, 4H), 1.84 (quintet, 4H), 1.30 (sextet, 4H), 0.91 (t, 6H).

A pincer ligand containing two 'NCN-carbene' fragments was synthesized by the reaction of 1,3-bis(chloromethyl)benzene with n-butyl imidazole at 140° C. This reaction afforded the dication 3,3'-(1,3-phenylenebis(methylene))bis(1-butyl-1H-imidazol-3-ium)chloride. The $^1$H NMR spectrum of this material confirms the cationic nature with a resonance for the imidazolium protons in the 3 and 3' positions appearing at δ 10.82.

Example 17

Bis(2-chloroethyl)ammonium chloride with n-butyl imidazole

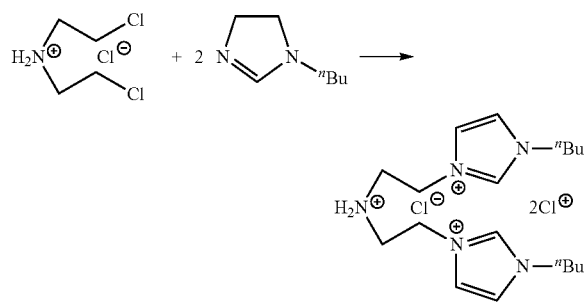

A 0.74 ml (5.63 mmol) aliquot of n-butyl imidazole was added to 0.500 g (2.8 mmol) of bis(2-chloroethyl)ammonium chloride [H$_2$N(CH$_2$CH$_2$Cl)$_2$]Cl in 10 ml of toluene and the mixture was refluxed overnight. The solvent was removed in vacuo and the residue was triturated in ether for three days. The solvent was decanted and the residue dried in vacuo and was used directly for production of the catalysts.

Preparation of Metal Complexes

Metal Complexes with (—P—N—P) Ligands

Example 18

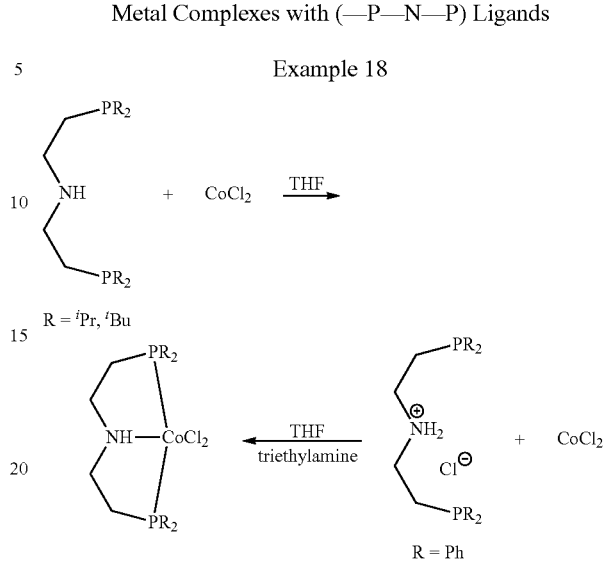

(a) bis(2-(di-iso-propylphosphino)ethyl)amine dichloro cobalt and (b) bis(2-(di-tert-butylphosphino)ethyl) amine dichloro cobalt R=iso-propyl and tert-butyl These compounds were prepared in an analogous manner and only the synthesis of bis(2-(di-iso-propylphosphino) ethyl)amine dichloro cobalt is described herein. Excess bis (2-(di-iso-propylphosphino)ethyl)amine [HN(CH$_2$CH$_2$P$^i$Pr$_2$)$_2$], 1.85 g, 6.06 mmol] in 5 mL of tetrahydrofuran was added dropwise to a vigorously stirred suspension of CoCl$_2$ (0.690 g, 5.31 mmol) in 20 ml of THF. The mixture was stirred overnight and then the solvent was removed in vacuo. The solid was triturated in 50 ml of ether and was then collected on a glass frit and dried in vacuo. Yield: 2.065 g, 84%. A single crystal of bis(2-(di-iso-propylphosphino)ethyl)amine dichloro cobalt suitable for X-ray crystallography was obtained by slow evaporation of a dichloromethane/hexanes solution of the compound and the structure is shown below in FIG. 5. The resulting crystal structure confirmed the structure of the product. The compound exhibited a good activity towards ammonia borane hydrolysis.

(c) Bis-(2-(diphenylphosphino)ethyl)amine dichloro cobalt

R=phenyl

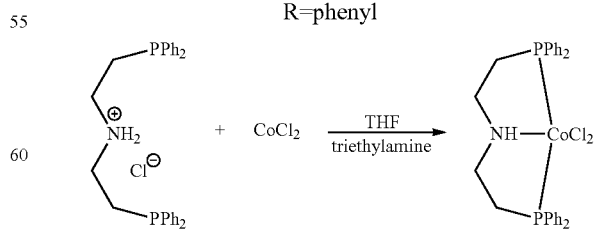

160 μl (1.148 mmol) of triethylamine (NEt$_3$) was added to 250 mg (0.523 mmol) of bis(2-(di-iso-propylphosphino) ethyl)amine hydrochloride [HN(CH$_2$CH$_2$PPh$_2$)$_n$HCl] in 10 ml of THF and the mixture was stirred for 10 minutes. 65 mg (0.501 mmol) of cobalt dichloride was added and the mixture was refluxed for 30 minutes. The solvent was removed in vacuo and the purple solid was washed with 3×5 ml of isopropanol and was then dried in vacuo. Yield: 80%. NMR spectra were not obtained. The compound exhibited a good activity towards ammonia borane hydrolysis.

(d) Bis(2-(diadamantylphosphino)ethyl)aminedichlorocobalt(II)

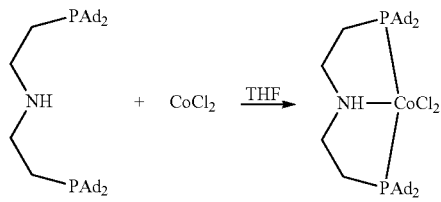

In a typical experiment, to a solution of bis(2-(diadamantylphosphino)ethyl)amine (0.20 g, 0.30 mmol) in tetrahydrofuran (20 ml) was added cobalt(II)chloride (0.04 g, 0.30 mmol). The reaction mixture was then stirred and refluxed for 4 hours. The solvent was then evaporated, and the residue was precipitated by the addition of hexanes. The blue precipitate was filtered and then washed with hexanes to obtain a blue solid. Yield: 0.18 g, 75%. NMR spectra were not obtained. 10 mg of the product was dissolved in 10 ml of tetrahydrofuran and 10 ml of water in a scintillation vial to form a pink solution. The material was tested for ammonia borane hydrolysis.

Figure 3:
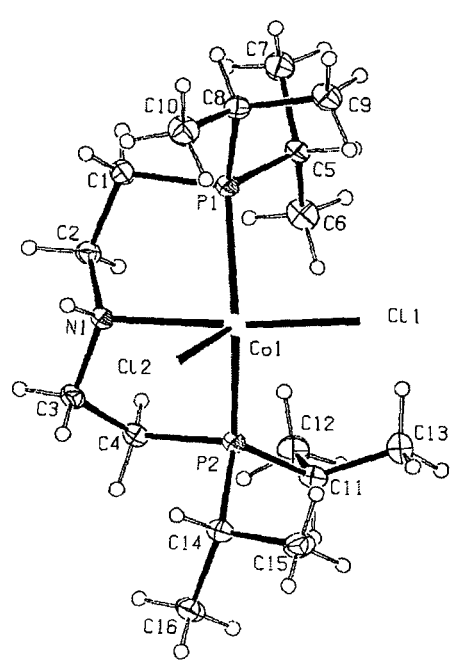
FIG. 3 is an ORTEP diagram of bis(2-(diisopropylphosphino)ethyl)aminedichlorocobalt(II).

Cobalt PNP complexes were prepared by the reactions of $N(H)(CH_2CH_2PR_2)_2$ (R=isopropyl, phenyl, adamantyl) with cobalt(II)chloride. For R=isopropyl, the product is a pink solid that was isolated in high yield. In order to characterize the paramagnetic material, a single crystal was obtained and the X-ray structure was determined (as seen in FIG. 3). The structure consists of a five coordinate square pyramidal cobalt center with the PNP ligand bound meridionally. The phosphorus atoms, the nitrogen and a chlorine atom comprise the base of the square pyramid. A chloride ligand is at the apex.

Example 19

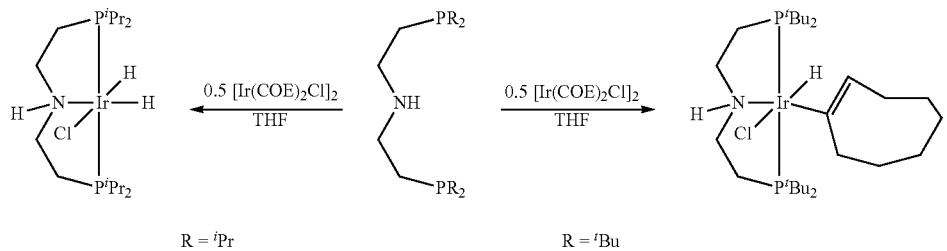

(a) Bis(2-(diisopropylphosphino)ethyl)aminechlorodihydridoiridium(III)

R=iso-propyl

This was prepared according to the literature procedure (Clarke, Z. E.; Maragh, P. T.; Dasgupta, T. P.; Gusev, D. G.; Lough, A. J.; Abdur-Rashid, K. *Organometallics* 2006, 25, 4113). Ammonia borane was added (50 mg, 1.620 mmol) and the hydrolysis rate is moderate to good. $^1$H NMR ($C_6D_6$): δ−25.13 (td, $J_{HH'}$=8.0 Hz, $J_{HP}$=14.7 Hz, 1H, IrH); −19.83 (td, $J_{HH'}$=8.0 Hz, $J_{HP}$=13.5 Hz, 1H, IrH); 0.84 (dd, $J_{HH}$=7.0 Hz, $J_{HP}$=14.1 Hz, 6H, CH$_3$); 1.13 (m, 12H, CH$_3$); 1.59 (dd, $J_{HH'}$=7.0 Hz, $J_{HP}$=14.1 Hz, 6H, CH$_3$); 1.65-1.87 (m, 8H); 2.93 (m, 4H, CH$_2$); 3.99 (br, 1H, NH). $^{31}$P{$^1$H} NMR($C_6D_6$): δ 54.17.

(b) Bis(2-(di-tert-butylphosphino)ethyl)amine dihydrido chloro cyclooct-1-enyl iridium R=tert-butyl A mixture of [iridium bis(cyclooctene)chloride]dimer [Ir(COE)$_2$Cl]$_2$ (0.675 g, 0.75 mmol) and bis(2-(di-tert-butylphosphino)ethyl)amine (0.540 g, 1.49 mmol) was dissolved in toluene (5 ml) and stirred for 20 minutes. Hexanes (10 ml) was added and then the precipitated solid was collected by filtration and dried in vacuo. Yield: 0.772 g, 74%. $^1$H NMR($C_6D_6$), δ: −25.46 (t, broad, 1H, IrH); 1.21 (vt, J=6.0 Hz, 18H, CH$_3$); 1.52 (vt, J=6.0 Hz, 18H, CH$_3$); 1.68-1.92 (m, br, 12H, CH$_2$); 2.12 (br, 2H, CH$_2$); 2.34 (m, 2H, CH$_2$; 2.58 (m, 2H, CH$_2$); 3.29 (m, 2H, CH$_2$); 5.51 (br, 1H, CH); 6.03 (br, 1H, NH). $^{31}$P{$^1$H} NMR($C_6D_6$), d: 31.6.

(c) Bis(2-(dicyclohexylphosphino)ethyl)aminechlorodihydridoiridium(III)

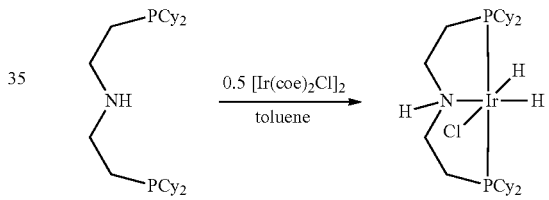

A mixture of chlorobis(cyclooctene)iridium(I)dimer [Ir(COE)$_2$Cl]$_2$ (0.19 g, 0.21 mmol) and bis(2-(dicyclohexylphosphino)ethyl)amine (0.20 g, 4.29 mmol) was dissolved in toluene (5 ml) and stirred for 4 hours at room temperature. The solvent was then evaporated and hexanes (20 ml) was added and then the precipitated white solid was collected by filtration and dried in vacuo. Yield: 0.18 g, 60%. 10 mg of the product was dissolved in 10 ml of tetrahydrofuran and 10 ml of water in a scintillation vial to form a red solution. Ammonia borane was added (50 mg, 1.620 mmol) and the hydrolysis rate is good and is comparable to the iso-propyl analogue. $^1$H NMR (400 MHz, $C_6D_6$): δ 3.15 (b, 4H, CH$_2$), 2.70 (b, 4H, CH$_2$), 1.60-1.80 (b, 20H, cyclohexyl-H), 1.20-1.40 (b, 24H, cyclohexyl-H), −25.30 (t, broad, 1H, IrH). $^{31}P\{^1H\}$ NMR (162 MHz, $C_6D_6$): δ 20.3. The compound transforms into bis(2-(dicyclohexylphosphino)ethyl)aminedichlorohydridoiridium(III) in dichloromethane.

(d) Bis(2-(diadamantylphosphino)ethyl)aminechlorodihydridoiridium(III)

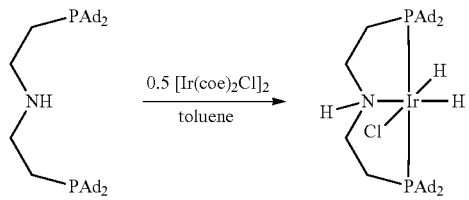

A mixture of chlorobis(cyclooctene)iridium(I)dimer [Ir(COE)$_2$Cl]$_2$ (0.13 g, 0.15 mmol) and bis(2-(diadamantylphosphino)ethyl)amine (0.20 g, 2.97 mmol) was dissolved in tetrahydrofuran (5 ml) and stirred for 4 hours at room temperature. The solvent was then evaporated and hexanes (20 ml) was added and then the precipitated white solid was collected by filtration and dried in vacuo. Yield: 0.19 g, 70%. 10 mg of the product was dissolved in 10 ml of tetrahydrofuran and 10 ml of water in a scintillation vial to form a red solution. Ammonia borane was added (50 mg, 1.620 mmol) and the hydrolysis rate is exceptionally good and is comparable to the tertiarybutyl analogue. $^{31}P\{^1H\}$ NMR (162 MHz, methanol-$d_4$): δ 70.6. Due to the insolubility of this catalyst in many solvents, it was not possible to obtain a good $^1H$ NMR spectrum.

(e) Bis(2-(di-ethylphosphino)ethyl)amine with chlorobis(cyclooctene)iridium(I)dimer

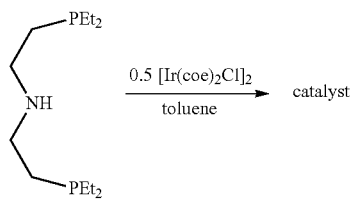

The compound is prepared in a similar fashion as the cyclohexyl analogue to obtain a red color solid. Yield: 0.3 g, 31%. $^1H$ NMR (400 MHz, $C_6D_6$): δ 3.15 (b, 4H, $CH_2$), 1.47 (b, 4H, $CH_2$), 1.30 (b, 8H, ethyl-$CH_2$), 0.80 (b, 12H, ethyl-$CH_3$). $^{31}P\{^1H\}$ NMR (162 MHz, $C_6D_6$): δ 42.5 (d, $^2J_{PP}$=368 Hz); 34.9 (d, $^2J_{PP}$=368 Hz). 10 mg of the product was dissolved in 10 ml of tetrahydrofuran and 10 ml of water in a scintillation vial to form a red solution. The material was tested for ammonia borane hydrolysis.

Figure 4:
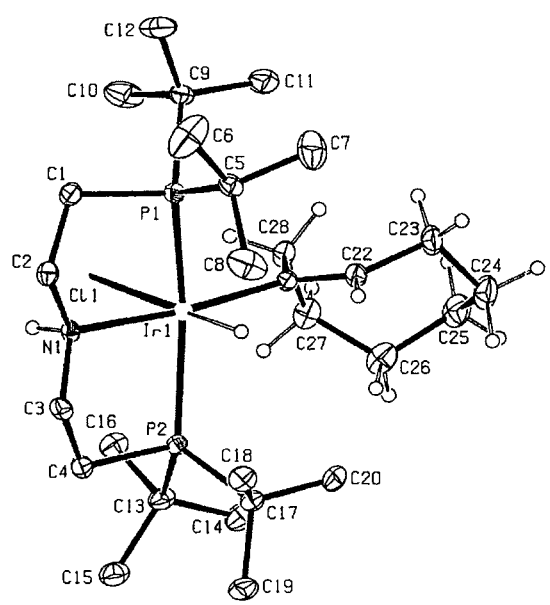
FIG. 4 is an ORTEP diagram of bis(2-(di-tert-butylphosphino)ethyl)aminechlorocycloct-1-enylhydridoiridium (III).

The reaction of $(R_2PCH_2CH_2)_2NH$ (R=tertiarybutyl, adamantyl, isopropyl, cyclohexyl, ethyl) with chlorobis(cyclooctene)iridium(I)dimer readily affords 'PNP' iridium complexes. For R=tertiarybutyl, the complex bis(2-(ditertiarybutylphosphino)ethyl)aminechlorocyclooct-1-enyldihydridoiridium(III) is obtained in high yield and purity. The $^1H$ NMR spectrum suggests the presence of a cyclooctenyl group in addition to a hydride resonance (δ−25.46). The $^{31}P\{^1H\}$ NMR spectrum of the complex shows a chemical shift at δ 31.6. A single crystal of bis(2-(di-tert-butylphosphino)ethyl)-aminechlorocyclooct-1-enyldihydridoiridium(III) was obtained and the X-ray structure (as seen in FIG. 4) confirms the formulation of the complex. The structure consists of a psuedooctahedral ligand arrangement with the PNP group bound in a meridional orientation. The metal-bound chloride ligand is syn to the NH moiety and this may be due to a weak interaction between these two groups. The cyclooctenyl group is bound trans to the amine nitrogen and cis to the hydride ligand.

Figure 5:
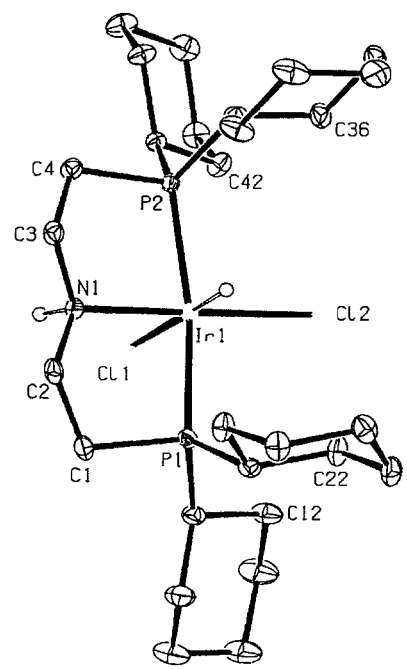
FIG. 5 is an ORTEP diagram of bis(2-(di-cyclohexylphosphino)ethyl)aminedichlorohydridoiridium(III).

For R=isopropyl, cyclohexyl, and adamantyl, the complexes $IrCl(H)_2\{N(H)(CH_2CH_2PR_2)_2\}$ were obtained. The $^1H$ NMR spectra of these materials indicate that no cyclooctenyl group is present. For R=isopropyl, the $^1H$ NMR spectrum shows the presence of two hydride ligands with resonances at δ−25.13 and −19.83. The compound was characterized crystallographically previously (Clarke, Z. E.; Maragh, P. T.; Dasgupta, T. P.; Gusev, D. G.; Lough, A. J.; Abdur-Rashid, K. *Organometallics* 2006, 25, 4113) and the X-ray structure confirmed the formulation. For R=cyclohexyl, a single crystal of the complex was obtained from dichloromethane. The X-ray structure showed that the putative dihydride species was transformed to a dichloro hydride complex. The ORTEP depiction of the compound is shown in FIG. 5.

For R=adamantyl, the low solubility of the compound precluded analysis via NMR but the compound is anticipated to have a structure comparable to the isopropyl analogue.

For R=ethyl, a material is formed that has two doublets in the $^{31}P\{^1H\}$ NMR spectrum at δ 41.0 and 34.9 (J=368 Hz).

Example 20

Bis(2-(diphenylphosphino)ethyl)ammonium chloride with chloro bis(cyclooctene)iridium(I)dimer

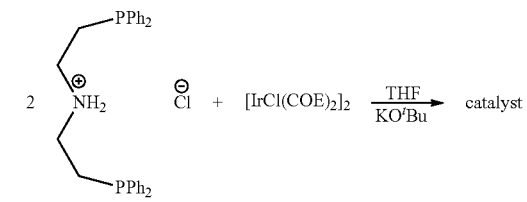

A 170 mg (1.515 mmol) portion of potassium tertiary butoxide was added to 665 mg (1.394 mmol) of bis(2-(diphenylphosphino)ethyl)ammonium chloride in 10 ml of tetrahydrofuran and the mixture was stirred for 15 minutes. The solvent was removed and the residue was extracted with 3×5 ml of toluene. The solution was filtered through Celite and then the solvent was removed in vacuo. 10 ml of degassed isopropanol and 550 mg (0.614 mmol) of chlorobis(cyclooctene)iridium(I)dimer [IrCl(COE)$_2$]$_2$ was added and then the mixture was refluxed for 15 minutes. The solvent volume was reduced to ca. 5 ml and then 20 ml of diethyl ether was added. The brown solid was collected on a frit and dried in vacuo (yield 550 mg). NMR spectroscopy indicated that a mixture had formed. The material was tested for ammonia borane hydrolysis.

Example 21

(a) bis(2-(ditertiarybutylphosphino)ethyl)methylaminechlorocyclo-octenyl-hydridoiridium(III)

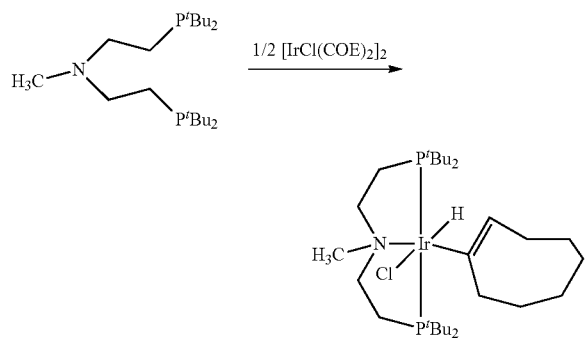

A 230 mg (0.257 mmol) sample of chlorobis(cyclooctene)iridium(I) dimer [IrCl(COE)$_2$]$_2$ was added to 210 mg (0.559 mmol) of bis(2-(ditertiarybutylphosphino)ethyl)methylamine in ca. 3 ml of toluene. The mixture was stirred for 45 minutes and then 10 ml of hexanes was added dropwise and the precipitate was collected by vacuum filtration and dried in vacuo. $^1$H NMR (400 Mhz, C$_6$D$_6$): δ 5.32 (d, $^3$J$_{HH}$=8.0 Hz, =CH); 2.76 (m, 2H, CH$_2$); 2.05 (s, 3H, NCH$_3$); 1.27-1.96 (m, 16H, CH$_2$); 1.22 (m, 18H, C(CH$_3$)$_3$); 0.95 (m, 18H, C(CH$_3$)$_3$); −23.06 (t, $^2$J$_{PH}$=16.0 Hz, Ir—H). $^{31}$P NMR (161.2 Mhz, C$_6$D$_6$): δ 23.1.

(b) Bis(2-(ditertiarybutylphosphino)ethyl)methylaminechloro-hydridophenyl-iridium(III)

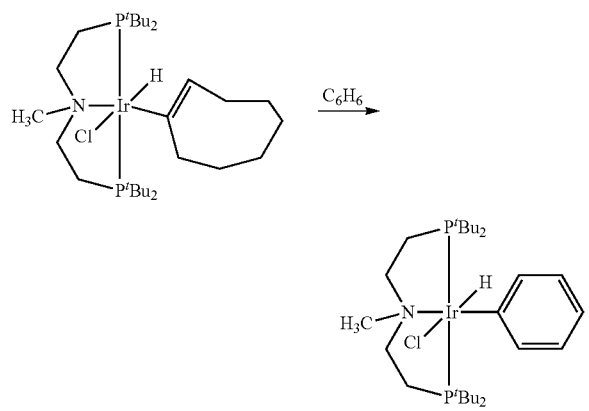

Upon standing for several days, a solution of the pure compound bis(2-(ditertiarybutylphosphino)ethyl)methylaminechlorocyclooctenylhydridoiridium(III) (from procedure Example 21(a) above) in benzene deposited X-ray quality crystals. The NMR data were not obtained and the yield has not been determined.

(c) Bis(2-(diisopropylphosphino)ethyl)methylaminechlorodihydridoiridium(III)

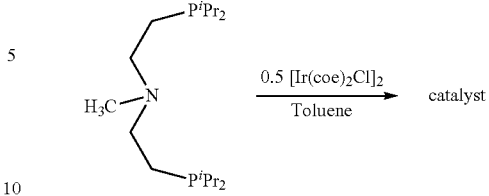

A mixture of chloro bis(cyclooctene)iridium(I)dimer [Ir(COE)$_2$Cl]$_2$ (0.28 g, 0.31 mmol) and bis(2-(diisopropylphosphino)ethyl)methylamine (0.20 g, 0.63 mmol) was dissolved in toluene (5 ml) and stirred for 4 hours at room temperature. The solvent was then evaporated and hexanes (20 ml) was added and then the precipitated pale orange solid was collected by filtration and dried in vacuo. Yield: 0.30 g, 87%. $^1$H NMR (400 MHz, C$_6$D$_6$): δ 3.95, 3.50, 1.59, 0.70-1.30. $^{31}$P{$^1$H} NMR (162 MHz, C$_6$D$_6$): δ 21.9. 10 mg of the product was dissolved in 10 ml of tetrahydrofuran and 10 ml of water in a scintillation vial to form a red solution. Ammonia borane was added (50 mg, 1.620 mmol) and the hydrolysis rate is very good and is comparable to bis(2-(diisopropylphosphino)-ethyl)aminechlorodihydridoiridium(III) (from procedure in Example 21(a)).

The ligand system, N(CH$_3$)(CH$_2$CH$_2$PR$_2$)$_2$ (R=isopropyl, tertiarybutyl, adamantyl, phenyl), was also used to prepare iridium PNP complexes. The reaction of bis(2-(ditertiarybutylphosphino)ethyl)methylamine with chlorobis(cyclooctene)iridium(I)dimer results in clean formation of the new complex bis(2-(ditertiarybutylphosphino)ethyl)methylaminechlorocyclooctenyl-hydridoiridium(I). The $^{31}$P NMR spectrum of the complex has a resonance appearing at δ 23.1. The $^1$H NMR spectrum of the complex clearly shows the presence of a cyclooctenyl ligand in addition to a hydride resonance at δ−23.06 and based upon this evidence we propose the structure shown in the scheme below.

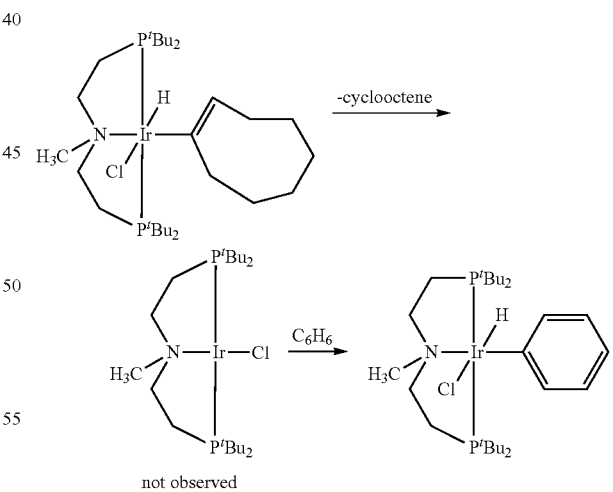

In benzene solution the compound transforms slowly to the new complex bis(2-(di-tert-butylphosphino)ethyl)methylaminechlorohydrophenyl-iridium(III). The reaction likely proceeds via reductive elimination of cyclooctene to form a putative four-coordinate bis(2-(di-tert-butylphosphino)-ethyl)methylaminechloroiridium(I) complex which then activates a C—H moiety of the benzene solvent to form the product.

Figure 6:
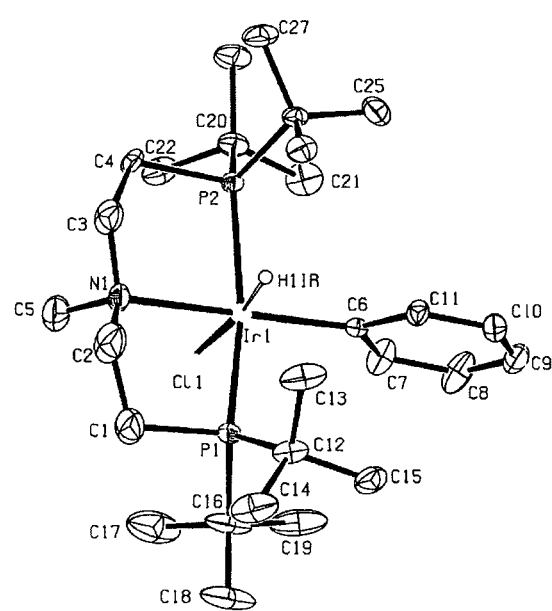
FIG. 6 is an ORTEP diagram of bis(2-(di-tert-butylphosphino)ethyl)methylaminechlorohydridophenyliridium(III).

A single crystal of bis(2-(di-tert-butylphosphino)ethyl) methyl-aminechlorohydridophenyliridium(III) was obtained and the ORTEP diagram is shown in FIG. 6. The PNP ligand is bound in a merdional mode and the geometry about iridium is pseudooctahedral. The phenyl group is trans to the aminophosphine nitrogen atom.

The reaction of bis(2-(diisopropylphosphino)ethyl)methylamine with chlorobis(cyclooctene)iridium(I)dimer yielded a mixture of products were used in situ.

Example 22

(a) Bis(2-(diisopropylphosphino)ethyl)aminedichlororuthenium(II)dimer

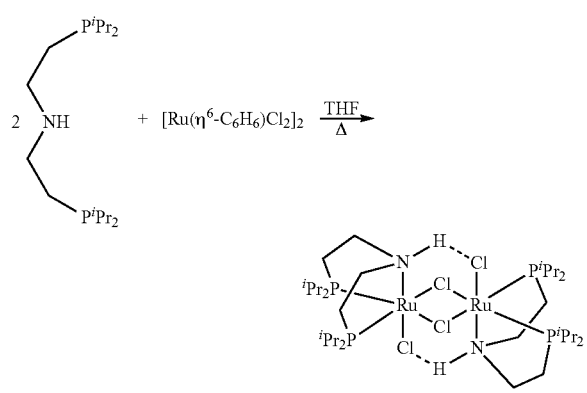

A 300 mg (0.982 mmol) sample of bis(2-(diisopropylphosphino)ethyl)amine [HN(CH$_2$CH$_2$P$^i$Pr$_2$)$_2$] and 246 mg (0.492 mmol) of benzenedichlororuthenium(II)dimer [Ru($\eta^6$-C$_6$H$_6$)Cl$_2$]$_2$ were refluxed in 20 ml of tetrahydrofuran overnight, resulting in the formation of a brown suspension. The solvent was removed in vacuo and the residue was triturated with 25 ml of diethyl ether. The solid was collected on a frit, washed with 5 ml of ether and then dried in vacuo. X-ray quality crystals were obtained by diffusion of diethyl ether into a dichloromethane solution of the compound. Yield 330 mg, 66%. $^1$H NMR (400 MHz, CD$_2$Cl$_2$): δ 6.17 (2H); 3.01 (4H); 2.74 (4H); 2.48 (4H); 1.91 (4H); 1.10-1.46 (24H). $^{31}$P NMR (162 MHz, CD$_2$Cl$_2$): δ 73.5. A solution of the compound in a 1:1 mixture of tetrahydrofuran and water exhibited a good activity towards ammonia borane hydrolysis.

(b) Bis(2-(dicycloyhexylphosphino)ethyl)amine with benzenedichloro-ruthenium(II)dimer

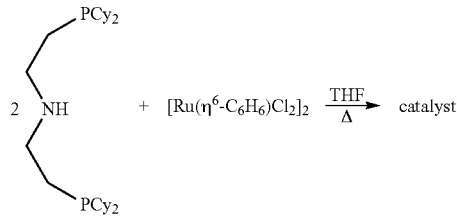

A 220 mg (0.608 mmol) portion of bis(2-(dicyclohexylphosphino)ethyl)amine HN(CH$_2$CH$_2$PCy$_2$)$_2$ was added to 150 mg (0.245 mmol) of benzenedichlororuthenium(II)dimer [RuCl$_2$($\eta^6$-benzene)]$_2$ in 10 ml of tetrahydrofuran. The mixture was refluxed for 2.5 hours and then the solvent was removed in vacuo. The residue was triturated in 5 ml of hexanes and then collected on a frit and dried in vacuo. Yield 250 mg. NMR spectroscopy indicated that a mixture had formed. The material was tested for ammonia borane hydrolysis.

(c) Reaction of bis(2-(ditertiarybutylphosphino)ethyl)amine with benzene-dichlororuthenium(II)dimer

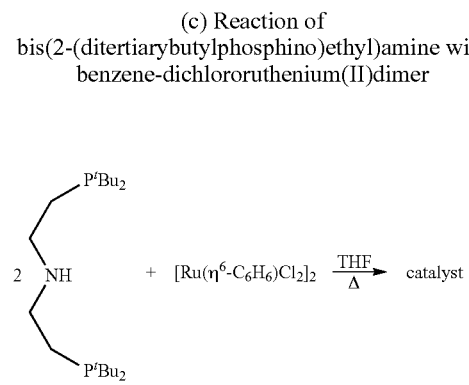

A 181 mg (0.500 mmol) portion of bis(2-(ditertiarybutylphosphino)ethyl)amine HN(CH$_2$CH$_2$P$^t$Bu$_2$)$_2$ in 2 ml of tetrahydrofuran was added to 150 mg (0.245 mmol) of benzenedichlororuthenium(II)dimer [RuCl$_2$($\eta^6$-benzene)]$_2$ in 10 ml of tetrahydrofuran. The mixture was refluxed for 2.5 hours and then the solvent was removed in vacuo. The residue was triturated in 5 ml of hexanes, collected on a frit and dried in vacuo. Yield 200 mg. NMR spectroscopy indicated that a mixture had formed. The material was tested for ammonia borane hydrolysis.

Figure 7:
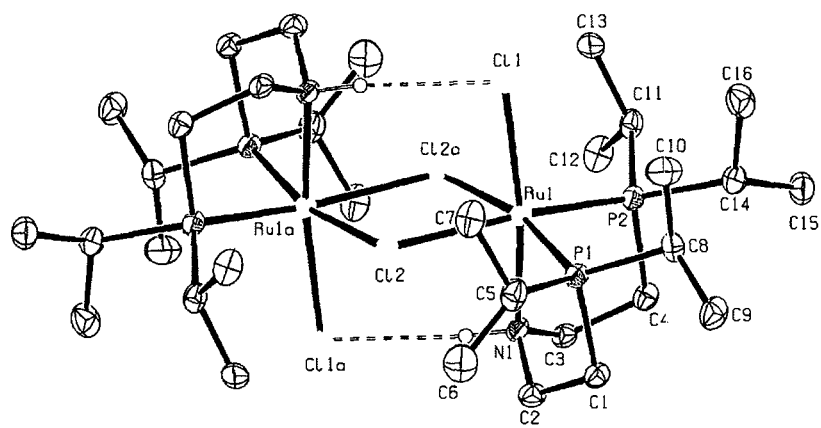
FIG. 7 is an ORTEP depiction of bis(2-(di-iso-propylphosphino)ethyl)aminedichlororuthenium(II)dimer[RuCl(μ-Cl) {NH(CH$_2$CH$_2$PiPr$_2$)$_2$}]$_2$.

Ruthenium PNP complexes were prepared by two methods. The reaction of bis(2-(diisopropylphosphino)ethyl)amine with dichloro benzene ruthenium dimer afforded a single compound that has a $^{31}$P NMR resonance at δ 73.5. The $^1$H NMR spectrum of the new material displays the expected isopropyl, methylene and NH signals. A single crystal was obtained and the X-ray structure was determined (as seen in FIG. 7). The structure indicates that a dimeric complex was formed where the bis(2-(diisopropylphosphino)-ethyl)amine is bound facially to the ruthenium center. The metals are bridged by two chloride ligands and the terminal chloride is involved in a weak hydrogen bonding interaction with the NH moiety on the opposite metal center.

Example 23

(a) Bis(2-(diisopropylphosphino)ethyl)aminedichlorotriphenylphosphine-ruthenium(II)

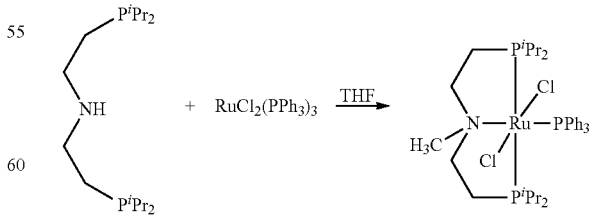

A 200 mg (0.655 mmol) portion of (2-(diisopropylphosphino)ethyl)amine HN(CH$_2$CH$_2$P$^i$Pr$_2$)$_2$ in 1 ml of tetrahydrofuran was added to a suspension of 620 mg (0.647 mmol) of dichlorotris(triphenylphosphine)ruthenium(II) in 5 ml of tetrahydrofuran and the mixture was stirred for two hours. The solvent was removed in vacuo and then 2 ml of tetrahydrofuran was added, followed by the dropwise addition of 20 ml of hexanes. The mixture was stirred for 30 minutes and the solid was isolated by vacuum filtration. Yield 300 mg, 63%. $^1$H NMR (400 MHz, CD$_2$Cl$_2$): δ 6.40-7.07 (m, 15H, P(C$_6$H$_5$)$_3$); 3.42 (broad s, 1H, NH); 2.26 (m, 4H, CH$_2$); 1.74 (m, 4H, CH$_2$); 2.33 (m, 2H, CH(CH$_3$)$_2$); 1.84 (m, 2H, CH(CH$_3$)$_2$); 0.40 (m, 12H, CH(CH$_3$)$_2$; 0.16 (m, 6H, CH(CH$_3$)$_2$); 0.02 (m, 6H, CH(CH$_3$)$_2$). $^{31}$P NMR (162 MHz, CD$_2$Cl$_2$: d 39.5 (t, $^2J_{PP}$=27.5 Hz); 27.5 (d, $^2J_{PP}$=27.5 Hz). The compound exhibited a good activity towards ammonia borane hydrolysis.

(b) Bis(2-(ditertiarybutylphosphino)ethyl)aminewith-dichlorotris(tri-phenylphosphine)ruthenium(II)

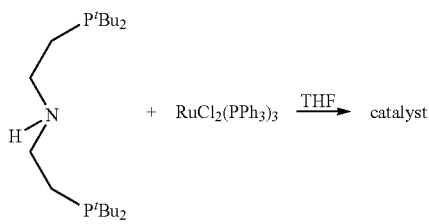

A 235 mg (0.650 mmol) sample of bis(2-(ditertiarybutylphosphino)ethyl)amine in 0.5 ml of tetrahydrofuran was added to 0.600 g (0.626 mmol) of dichlorotris(triphenylphosphine)ruthenium(II) in 5 ml of tetrahydrofuran. After stirring for one hour the solvent was removed in vacuo and then 5 ml of toluene was added. The mixture was stirred overnight and then the solid product was collected by vacuum filtration, washed with 5 ml of diethyl ether and dried in vacuo. NMR spectroscopy indicated that a mixture had formed.

(c) 2-(diphenylphosphino)-N-(2-(diphenylphosphino)ethyl)-N-methyl-ethanamine with dichlorotris(triphenylphosphine)ruthenium(II)

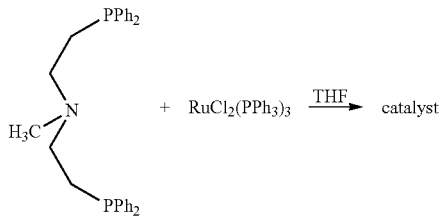

A 0.648 molar toluene solution (0.98 ml, 0.635 mmol) of a of 2-(diphenylphosphino)-N-(2-(diphenylphosphino)ethyl)-N-methylethanamine was added to 0.600 g (0.626 mmol) of dichlorotris(triphenylphosphine)ruthenium(II) [RuCl$_2$(PPh$_3$)$_3$] in 5 ml of tetrahydrofuran and the mixture was stirred for two hours. The solvent was removed in vacuo and then 3 ml of tetrahydrofuran was added, followed by 15 ml of diethyl ether. After stirring for 30 minutes the solid was collected by vacuum filtration and dried in vacuo. NMR spectroscopy indicated that a mixture had formed.

A related type of ruthenium PNP complex was obtained by the reaction of bis(2-(diisopropylphosphino)ethyl)amine with dichloro tris(triphenylphosphine) ruthenium(II). The $^{31}$P NMR spectrum of the complex displays a triplet at δ 39.5 and a doublet at 27.5 ppm ($^2J_{PP}$=27.5 Hz). The triplet corresponds to the triphenylphosphine ligand whereas the doublet indicates the presence of the of bis(2-(diisopropylphosphino)ethyl)amine ligand. The $^1$H NMR spectrum of the complex shows that the triphenylphosphine and of bis(2-(diisopropylphosphino)ethyl)amine ligands are present in a 1:1 ratio. The trans orientation of the chloride ligands is proposed since the cis arrangement would cause unfavorable steric interactions between the triphenylphosphine ligand and the backbone of the bis(2-(diisopropylphosphino)ethyl)amine ligand. Analogous compounds have been prepared by the reactions of bis (2-(ditertiarybutyl)ethyl)amine or 2-(diphenylphosphino)-N-(2-(diphenylphosphino)ethyl)-N-methylethanamine with dichlorotris(triphenylphosphine)ruthenium(II) and these displayed similar NMR properties.

Example 24

Bis(2-(ditertiarybutylphosphino)ethyl)amine-2,4-pentanedionate rhodium(I)

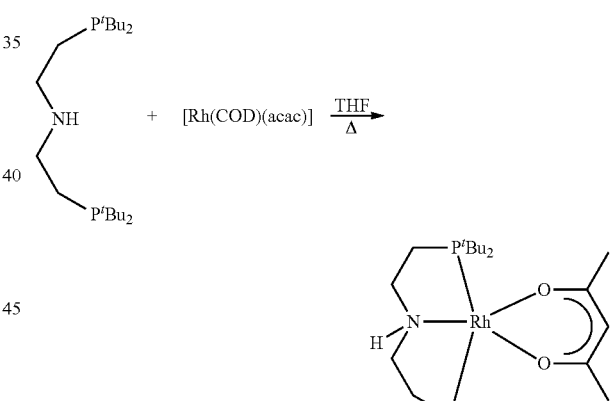

A solution of 135 mg (0.373 mmol) of bis(2-(ditertiarybutylphosphino)ethyl)amine in 1 ml of tetrahydrofuran was added to a solution of 106 mg (0.342 mmol) of 1,5-cyclooctadiene-2,4-pentanedionaterhodium(I) in 5 ml of tetrahydrofuran. The mixture was heated to reflux for ten minutes and then the solvent was removed in vacuo. $^{31}$P NMR (162 MHz, C$_6$D$_6$): δ 63.6 (d, $^1$J=161 Hz). $^1$H NMR spectroscopy indicated that a mixture had formed.

A rhodium PNP complex was prepared by the reaction of bis(2-(di-tertiarybutylphosphino)ethyl)amine with cyclooctadiene(2,4-pentanedionate)rhodium(I). The $^{31}$P NMR spectrum of the product showed a doublet at δ 63.6 ($^1J_{RhP}$=161 Hz). Although the $^{31}$P NMR spectrum showed mostly one resonance, $^1$H NMR spectrum of the material indicated that the other species were present.

Example 25

Bis(2-(diisopropylphosphino)ethyl)amine with dichloro-cyclooctadienepalladium(II)

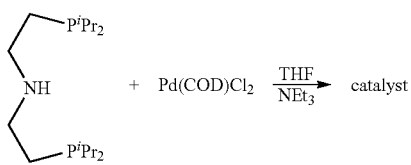

A 103 mg (0.337 mmol) sample of bis(2-(diisopropylphosphino)ethyl)amine [HN(CH$_2$CH$_2$P$^i$Pr$_2$)$_2$] was added to 96 mg (0.336 mmol) of dichloro-1,5-cyclooctadienepalladium (II) [Pd(COD)Cl$_2$] in 10 ml of tetrahydrofuran. 94 µl (1.28 mmol) of triethylamine was added and then the mixture was refluxed for 30 minutes. NMR spectroscopy indicated that a mixture had formed. $^{31}$P{$^1$H} NMR (162 MHz, tetrahydrofuran —H$_8$): δ 65.6 (ca. 15%); 45.7 (ca. 35° A)); 45.1 (50%). The material was used without further purification for ammonia borane hydrolysis experiments.

Example 26

Bis(2-(diisopropylphosphino)ethyl)amine with octacarbonyldicobalt(0)

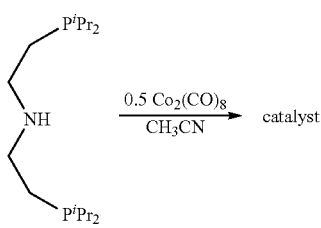

In a typical experiment, to a solution of bis(2-(diisopropylphosphino)ethyl)amine (0.20 g, 0.65 mmol) in tetrahydrofuran (20 ml) was added octacarbonyldicobalt(0) (0.22 g, 0.65 mmol). The reaction mixture was then stirred at room temperature overnight. Evolution of bubbles was observed during the reaction. The solvent was then evaporated, and the residue was precipitated by the addition of hexanes. The orange precipitate was then filtered and washed with hexanes under argon to obtain an orange solid. Yield: 0.24 g, 87%. $^{31}$P{$^1$H} NMR (400 MHz, C$_6$D$_6$): δ 96.97, 74.32. 10 mg of the product was dissolved in 10 ml of tetrahydrofuran and 10 ml of water in a scintillation vial to form a yellow solution. Ammonia borane was added (50 mg, 1.620 mmol) and the hydrolysis rate is very good with metal deposited after ca. 30 minutes.

The reaction of bis(2-(diisopropylphosphino)ethyl)amine with octacarbonyldicobalt(0) afforded a mixture which displayed two resonances in the $^{31}$P NMR spectrum. Separation of the compounds was not achieved.

Example 30

Bis(2-(diisopropylphosphino)ethyl)amine with cobalt(II) tetrafluoroborate hydrate

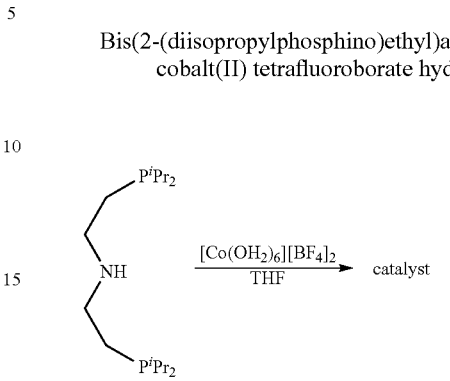

The reaction was carried out analogously to 26 above. Yield: 0.42 g, 58%. Black solid was deposited after a few minutes of hydrolysis of ammonia borane.

Example 28

Bis(2-(diisopropylphosphino)ethyl)amine with molybdenum(III)chloride

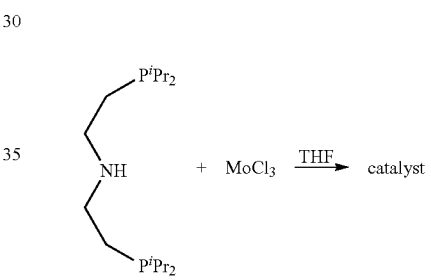

A 202 mg (0.661 mmol) sample of bis(2-(diisopropylphosphino)ethyl)amine [HN(CH$_2$CH$_2$P$^i$Pr$_2$)$_2$] in 2 ml of tetrahydrofuran was added to 125 mg (0.618 mmol) of molybdenum (III) chloride. The mixture was stirred overnight and then the solvent was removed in vacuo. The brown solid was triturated in hexanes (5 ml); the hexanes was decanted and the solid was dried in vacuo to give 280 mg of a brown solid. NMR spectra were not obtained. The material was tested for ammonia borane hydrolysis.

Example 29

Bis(2-(diisopropylphosphino)ethyl)amine with of iron(II) tetrafluoroborate hydrate

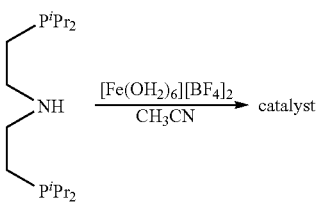

A 220 mg (0.720 mmol) portion of bis(2-(diisopropylphosphino)ethyl)amine was added dropwise to a solution of 220 mg (0.652 mmol) of iron(II) tetrafluoroborate hydrate in 5 ml of acetonitrile. The mixture was stirred for 30 minutes and then 20 ml of diethyl ether was added dropwise and the resulting solid was vacuum filtered and dried in vacuo. Yield 370 mg. NMR spectroscopy indicated that a mixture had formed. The material was tested for ammonia borane hydrolysis.

Example 30

Bis(2-(diphenylphosphino)ethyl)ammonium chloride with nickel(II)bromide

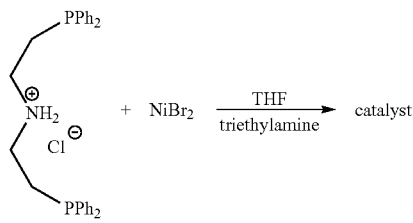

To a tetrahydrofuran (20 ml) solution of bis(2-(diphenylphosphino)-ethyl)ammonium chloride [HN(CH$_2$CH$_2$PPh$_2$)$_2$.HCl] (0.25 g, 0.558 mmol) and nickel(II) bromide (0.12 g, 0.558 mmol) was added dropwise 2 equivalents triethylamine (0.112 g, 1.12 mmol). The reaction mixture was then allowed to refluxed overnight. The solvent was then evaporated and hexane was added to precipitate the product. The orange solid was then washed with isopropanol (5 ml). Yield: 0.25 g (81.5%). $^1$H NMR (300 MHz, CD$_2$Cl$_2$): δ 8.10-7.23 (br, 10H, Ph), 3.60 (s, 1H, NH), 2.97-2.12 (m, 4H, NCH$_2$CH$_2$), 1.30-0.77 (m, 4H, NCH$_2$CH$_2$). $^{31}$P{$^1$H} NMR (300 MHz, CD$_2$Cl$_2$): δ 32.0 (ca. 40%), 28.0 (ca. 40%), −20.2 (ca. 20%).

Example 31

(a) Bis(2-(diisopropylphosphino)ethyl)amine with copper(I)chloride

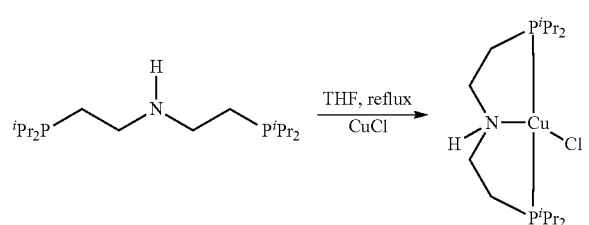

A 0.500 g (1.637 mmol) portion of bis(2-(diisopropylphosphino)ethyl)amine [HN(CH$_2$CH$_2$P$^i$Pr$_2$)$_2$] in 2 ml of tetrahydrofuran was added to 0.160 g (1.616 mmol) of copper (I)chloride in 20 ml of tetrahydrofuran and the mixture was refluxed overnight. The solvent was removed in vacuo to afford a colorless crystalline solid. Yield 490 mg (90%). The material was tested for ammonia borane hydrolysis.

(b) Bis(2-(ditertiarybutylphosphino)ethyl)aminechlorocopper(I)

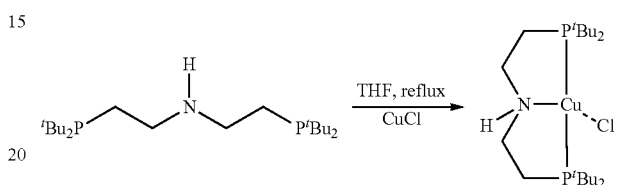

A 0.500 g (1.384 mmol) portion of bis(2-(ditertiarybutylphosphino)ethyl)amine [HN(CH$_2$CH$_2$P$^t$Bu$_2$)$_2$] in 2 ml of tetrahydrofuran was added to 134 mg (1.353 mmol) of copper (1)chloride in 20 ml of tetrahydrofuran and the mixture was heated to reflux overnight and then the solvent was removed in vacuo. The solid was washed briefly with ca. 2 ml of hexanes and was then in vacuo to afford a solid product. Yield 455 mg (73%). $^1$H NMR (300 MHz, CD$_2$Cl$_2$): δ 2.86 (m); 1.75 (m); 1.24 (m). $^{31}$P NMR (121 MHz, CD$_2$Cl$_2$): δ 17.5. The material was tested for ammonia borane hydrolysis.

Figure 8:
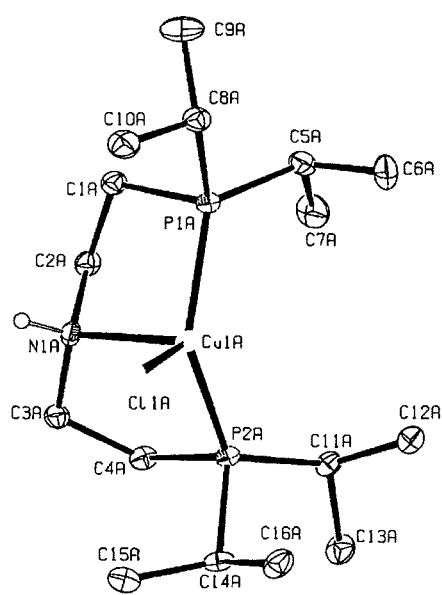
FIG. 8 is an ORTEP diagram of bis(2-(diisopropylphosphino)ethyl)aminecopper(I)chloride.

Copper complexes containing N(H)(CH$_2$CH$_2$PR$_2$)$_2$ (R=isopropyl, tertiarybutyl) ligands were readily prepared by the reaction of copper chloride with a slight excess of the ligand. The $^{31}$P NMR spectrum of bis(2-(di-tertiarybutylphosphino)ethyl)amine chloro copper (I) displays a resonance at δ 17.5 and the $^1$H NMR spectrum of the complex shows the expected resonances. A single crystal of the complex bis(2-(diisopropylphosphino)ethyl)amine chloro copper (I) was obtained and the X-ray structure was determined (as seen in FIG. 8). The structure features a distorted tetrahedral ligand arrangement about the copper.

Example 32 a) Synthesis of trichlorooxobis(triphenylphosphine)rhenium(V)

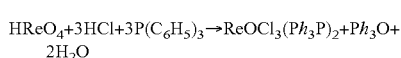

An aqueous solution of perrhenic acid (HReO$_4$) (5.0 g, 65-70 wt %, 3.25-3.50 mmol) was evaporated to a syrupy consistency, to which concentrated aqueous hydrochloric acid (7.0 ml) was added. The solution was then added to a suspension of triphenylphosphine (21.67 g, 8.26 mmol) in 250 ml of glacial acetic acid in a 500 ml round bottomed flask with a stirrer. The solution was stirred for 30 minutes, and the solid was removed by filtration and washed with glacial acetic acid (2×50 ml) and then with diethyl ether (6×50 ml). Yield: 12.9 g (90%) as a microcrystalline product. $^{31}P\{^1H\}$NMR (162 MHz, $C_6D_6$): δ −17.9.

(b) Trichlorooxobis(triphenylphosphine)rhenium(V) with bis(2-(ditertiarybutylphosphino)ethyl)amine

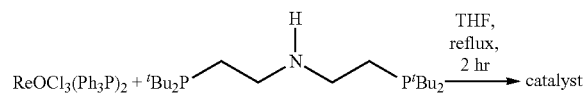

Trichlorooxybis(triphenylphosphine)rhenium(V) (ReOCl$_3$(Ph$_3$P)$_2$ (0.25 g, 0.3 mmol) and bis(2-(ditertiarybutylphosphino)ethyl)amine (0.11 g, 0.3 mmol) were mixed in tetrahydrofuran (25 ml). After stirring for 5 minutes, the solid dissolved to form a brown solution. The solution was then allowed to reflux for 2 hours. The solvent was then pumped off and the solid was washed with diethyl ether. The solid was then dried under vacuum to obtain a pale brown solid. Yield: 0.137 g (74%). $^1$H NMR($C_6D_6$), δ: 6.90 (br, 1H, NH), 3.00 (m, 2H, CH$_2$), 2.15 (m, 2H, CH$_2$), 1.20 (vt, 18H, CH$_3$), 1.11 (vt, 18H, CH$_3$). $^{31}P\{^1H\}$ NMR($C_6D_6$), δ: 20.6. 10 ml of water and 10 ml of tetrahydrofuran was added to 10 mg of the material in a scintillation vial to form a brown solution. The material was tested for ammonia borane hydrolysis.

Reactions of aminodiphosphine ligands with various other transition metal sources such as molybdenum(III)chloride, iron(II) tetrafluoroborate hexahydrate, trichlorooxybis(triphenylphosphine)rhenium(V), dichloro(1,5-cyclooctadiene)palladium(II), or nickel (II)bromide were attempted. These reactions formed mixtures from which single compounds were not isolated but the in situ prepared complexes were used as catalysts.

Example 33

(a) Reaction of 2,6-bis((diisopropylphosphino)methyl)pyridine with cobalt(II) chloride

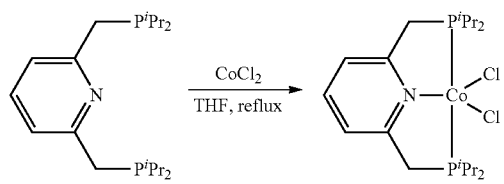

To a solution of 2,6-bis((diisopropylphosphino)methyl) pyridine (0.20 g, 0.58 mmol) in tetrahydrofuran (30 ml) was added cobalt(II)chloride (CoCl$_2$) (0.08 g, 0.58 mmol). The reaction mixture was then stirred at room temperature for 2 hours and then refluxed for 2 hours. The solvent was then evaporated, and the residue was precipitated by the addition of hexanes. The precipitate was filtered and then washed with hexanes to obtain a blue solid. Yield: 0.16 g. 10 mg of the product was dissolved in 10 ml of tetrahydrofuran and 10 ml of water in a scintillation vial to form a pink solution. The material was tested for ammonia borane hydrolysis.

The reaction of 2,6-bis((diisopropylphosphino)methyl)pyridine with cobalt(II)chloride proceeded smoothly to afford the paramagnetic blue complex 2,6-bis((diisopropylphosphino)methyl)pyridinedichlorocobalt(II).

(b) 2,6-bis((diisopropylphosphino)methyl)pyridine with chorobis(cyclooctene)-iridium(I)dimer

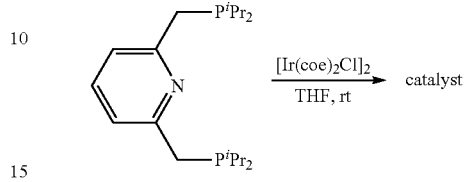

To a solution of 2,6-bis((diisopropylphosphino)methyl) pyridine (0.20 g, 0.58 mmol) in tetrahydrofuran (30 ml) was added chlorobis(cyclooctene)iridium(I)dimer [Ir(COE)$_2$Cl]$_2$ (0.26 g, 0.29 mmol). The reaction mixture was then stirred at room temperature for 2 hours until all of the solid dissolved. The solvent was then evaporated, and the residue was precipitated by the addition of hexanes. The precipitate was filtered and then washed with hexanes to obtain a pale yellow solid. $^{31}P\{^1H\}$ NMR (162 MHz, $C_6D_6$): δ 12.1. Yield: 0.114 g. 10 mg of the product was dissolved in 10 ml of tetrahydrofuran and 10 ml of water in a scintillation vial to form a red solution. Ammonia borane was added (50 mg, 1.620 mmol) and the hydrolysis rate was moderate.

Attempts to prepare iridium or rhenium complexes containing the ligand 2,6-bis((di-iso-propylphosphino)methyl) pyridine. It was found that mixtures were formed that were used in situ.

(c) 2,6-bis((diisopropylphosphino)methyl)pyridine with benzene-dichlororuthenium(II)dimer

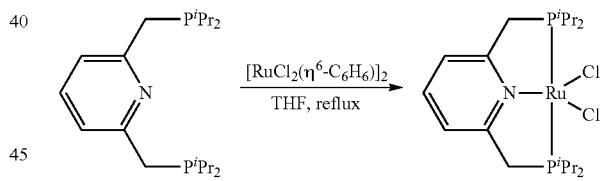

To a solution of 2,6-bis((diisopropylphosphino)methyl) pyridine (0.20 g, 0.58 mmol) in tetrahydrofuran (30 ml) was added benzenedichlororuthenium(II)dimer [RuCl$_2$(η$^6$-C$_6$H$_6$)]$_2$ (0.15 g, 0.29 mmol). The reaction mixture was then stirred at room temperature and then refluxed for 5 hours. The insoluble solid was then filtered off. The solvent was then evaporated, and the residue was precipitated by the addition of hexanes. The precipitate was filtered and then washed with hexanes to obtain a pale brown solid. $^1$H NMR (400 MHz, C$_6$D$_6$): δ 7.47 (m, 1H, Ar—H), 7.22 (m, 2H, Ar—H), 3.90 (b, 2H, CH$_2$), 2.60 (b, 2H, CH$_2$), 0.80-1.40 (b, 28H, —CH (CH$_3$)$_2$). $^{31}P\{^1H\}$ NMR (162 MHz, C$_6$D$_6$): δ 43.2. Yield: 0.1 g. 10 mg of the product was dissolved in 10 ml of tetrahydrofuran and 10 ml of water in a scintillation vial to form a red solution. Ammonia borane was added (50 mg, 1.620 mmol) and the hydrolysis rate was moderate.

When 2,6-bis((diisopropylphosphino)methyl)pyridine was reacted with dichloro benzene ruthenium dimer, a single compound could be isolated that displayed a single $^{31}$P NMR resonance at 43.2 ppm. The $^1$H NMR spectrum of the complex showed only resonances due to the metal bound 2,6-bis ((diisopropylphosphino)methyl)pyridine ligand. Although the material was not characterized via X-ray crystallography, the compound 2,6-bis((diisopropylphosphino)methyl)(pyridine)-dichlororuthenium(II) indicated in the scheme above was most likely formed.

Example 34

N,N'-(phenylphosphinediyl)bis(methylene)dipropan-2-amine with cobalt(II) chloride

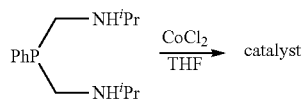

A 45 mg (0.347 mmol) sample of cobalt(II)chloride and 100 mg (0.396 mmol) of N,N'-(phenylphosphinediyl)bis(methylene)dipropan-2-amine PhP(CH$_2$NH$^i$Pr)$_2$ were mixed in 20 ml of tetrahydrofuran. The solution was heated to reflux for five minutes and the solvent was removed in vacuo. The residue was extracted into diethyl ether, filtered through Celite and then the solvent was removed in vacuo to give a green oil. The material was tested for ammonia borane hydrolysis.

Example 35

Bis(di-m-isopropylphosphino-di-p-tolyl)amine with chlorobis(cyclo-octene)iridium(I)dimer

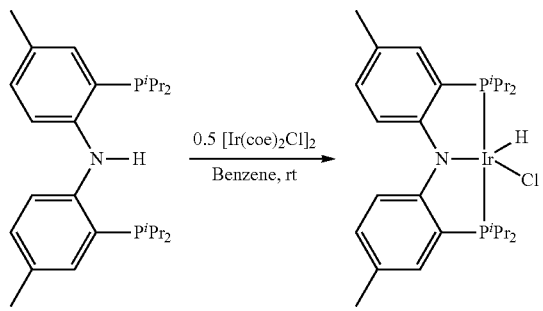

Bis(di-m-isopropylphosphino-di-p-tolyl)amine (0.2 g, 0.46 mmol) and chlorobis(cyclooctene)iridium(I)dimer [Ir(COE)$_2$Cl]$_2$ (0.2 g, 0.23 mmol) and toluene (10 ml) were placed into a schlenk flask. The solution was stirred overnight at room temperature and then the volatiles were removed in vacuo. Hexanes was added and then the orange solid was then filtered off and the green filtrate was evaporated to dryness to obtain a dark green solid (0.23 g, 75%). $^1$H NMR (400 MHz, C$_6$D$_6$): δ 8.28 (t, 1H, J$_{P-H}$=8 H, NH), 7.66 (dd, 1H, PhH), 6.98 (d, 1H, PhH), 6.50 (dd, 1H, PhH), 2.18 (d, 6H, PhCH$_3$), 1.75 (m, 4H, CHCH$_3$), 1.15 (b, 24H, CHCH$_3$), −27.00 (t, 1H, IrH). $^{31}$P{$^1$H} NMR (162 MHz, C$_6$D$_6$): δ 25.0. 10 mg of the product was dissolved in 10 ml of tetrahydrofuran and 10 ml of water in a scintillation vial to form a red solution. Ammonia borane was added (50 mg, 1.620 mmol) and the hydrolysis rate was good and comparable to that of the complex bis(2-(diisopropylphosphino)ethyl)aminechlorodihydridoiridium (III).

The bis(di-m-isopropylphosphino-di-p-tolyl)amine ligand should be much more difficult to activate because of the 'phenylene' backbone and thus complexes of bis(di-m-isopropylphosphino-di-p-tolyl)amine should be more stable. The reaction of bis(di-m-isopropylphosphino-di-p-tolyl)amine with chlorobis(cyclooctene)iridium(I)dimer proceeds relatively cleanly and affords a product which displays a $^{31}$P NMR resonance at δ 25.0. The $^1$H NMR spectrum displays the signals expected from the metal-bound ligand in addition to a hydride resonance at δ−27.00. Although the complex has not been characterized crystallographically we propose the tentative structure shown in scheme above.

Example 36

Bis(di-m-isopropylphosphino-di-p-tolyl)aminedichlororuthenium(II)

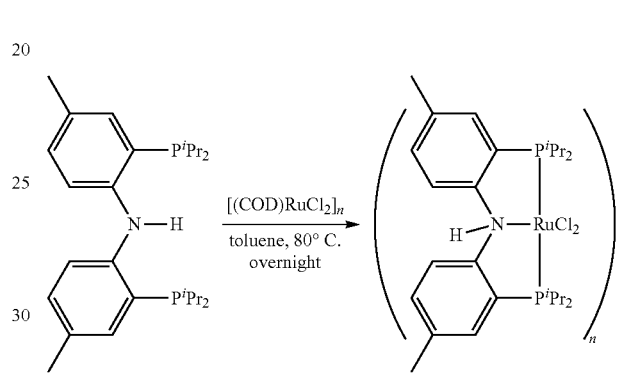

This compound was prepared according to the literature procedure (Celenligil-Cetin, R.; Watson, L. A.; Guo, C.; Foxman, B. M.; Ozerov, O. V. *Organometallics*, 2005, 24, 186-189). Yield: 0.23 g, 66%. 10 mg of the product was dissolved in 10 ml of tetrahydrofuran and 10 ml of water in a scintillation vial to form a red solution. Ammonia borane was added (50 mg, 1.620 mmol) and the hydrolysis rate was moderate.

The reaction of bis(di-m-isopropylphosphino-di-p-tolyl)amine with dichloro(1,5-cyclooctadiene)ruthenium(II) polymer cleanly produces the previously reported polymeric complex bis(di-m-isopropylphosphino-di-p-tolyl)aminedichlororuthenium(II).

Example 37

Bis(di-m-isopropylphosphino-di-p-tolyl)-aminedichlorocobalt(II)

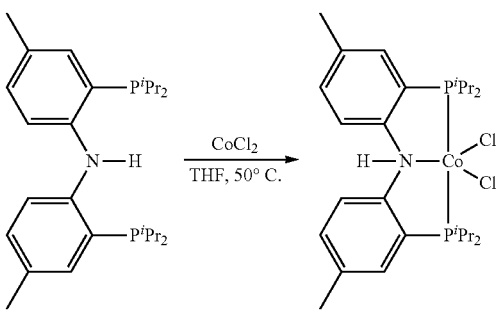

A mixture of cobalt(II)chloride (CoCl$_2$) (0.03 g, 0.23 mmol) and di-m-isopropylphosphino-di-p-tolylamine (0.10 g, 0.23 mmol) in tetrahydrofuran (50 ml) was stirred under argon at 50° C. for 3 hours. After cooling, the solvent was evaporated off and the solid was precipitated with hexanes to afford a dark purple solid. Yield: 0.1 g, 77%. 10 mg of the product was dissolved in 10 ml of tetrahydrofuran and 10 ml of water in a scintillation vial to form a red solution. The material was tested for ammonia borane hydrolysis.

A base metal complex of di-m-isopropylphosphino-di-p-tolylamine was prepared by heating a slight excess of bis(di-m-isopropylphosphino-di-p-tolyl)amine with cobalt(II)chloride to 50° C. The reaction affords the dark purple paramagnetic complex bis(di-m-isopropylphosphino-di-p-tolyl)amine(dichloro)cobalt(II). The structure is expected to be analogous to that of bis(2-(diisopropylphosphino)ethyl) aminedichlorocobalt(II).

Metal Complexes with (—P—N—N—) Ligands

Example 38

(a) (Diadamantylphosphino)ethyl-(diethylamino) ethyl amine with chlorobis(cyclooctene)iridium(I) dimer

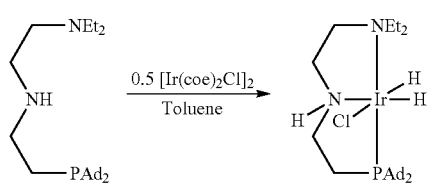

To a solution of (diadamantylphosphino)ethyl(diethylamino)ethyl amine (0.05 g, 0.12 mmol) in toluene (20 ml) was added chloro bis(cyclooctene)iridium(I)dimer [Ir(COE)₂Cl]₂ (0.05 g, 0.06 mmol). The reaction mixture was then stirred at room temperature overnight. The solvent was then evaporated, and the residue was precipitated by the addition of hexanes. The pale brown precipitate was filtered and then washed with hexanes to obtain a yellow solid. Yield: 0.07 g, 92%. $^{31}$P{$^1$H} NMR (162 MHz, C₆D₆): δ 63.7. 10 mg of the product was dissolved in 10 ml of tetrahydrofuran and 10 ml of water in a scintillation vial to form a brown solution. Ammonia borane was added (50 mg, 1.620 mmol) and the hydrolysis rate was moderate.

The reaction of (di-adamantylphosphino)ethyl(diethylamino) ethyl amine with chlorobis(cyclooctene)iridium(I) dimer afforded a poorly soluble brown material of questionable purity. A single peak was observed in the $^{31}$P NMR spectrum of the material at 63.7 ppm. Although a clean $^1$H NMR spectrum was not obtained we propose the tentative structure shown in the scheme above.

(b) (Diadamantylphosphino)ethyl (diethylamino)ethylamine with cobalt(II) chloride

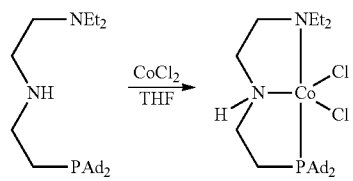

The cobalt complexes were prepared analogously in situ and the reaction mixture was refluxed for 1 hour in tetrahydrofuran under reflux. Yield: 0.2 g, 78%. 10 mg of the product was dissolved in 10 ml of tetrahydrofuran and 10 ml of water in a scintillation vial to form a pink solution. The material was tested for ammonia borane hydrolysis.

A cobalt complex of (di-adamantylphosphino)ethyl(diethylamino)ethyl amine was readily obtained by reaction with cobalt(II)chloride as depicted in the scheme above. The complex was not characterized owing to its paramagnetic nature.

Metal Complexes with (—P—O—P—) Ligands

Example 39

(a) 2,2'-oxybis(ethane-1,2-diyl)bis(di-iso-propylphosphine) dichloro cobalt

R=$^i$Pr

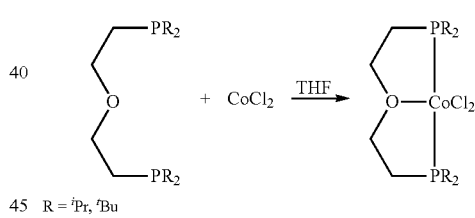

R = $^i$Pr, $^t$Bu

A solution of 150 mg (0.490 mmol) of 2,2'-oxybis(ethane-1,2-diyl)bis(di-iso-propylphosphine) O(CH₂CH₂P$^i$Pr₂)₂ in 5 ml of tetrahydrofuran was added to a suspension of 34 mg (0.262 mmol) of cobalt dichloride in 5 ml of tetrahydrofuran. The mixture was refluxed for 30 minutes and the solvent was then removed in vacuo. The solid was triturated in 5 ml of hexanes and was then collected on a frit and dried in vacuo. Yield: 70 mg, 50'%.

(b) 2,2'-oxybis(ethane-1,2-diyl)bis(di-tert-butylphosphine) cobalt dichloride

R=$^t$Bu

A solution of 110 mg (0.303 mmol) of 2,2'-oxybis(ethane-1,2-diyl)bis(di-tert-butylphosphine) O(CH₂CH₂P$^t$Bu₂)₂ in 5 ml of tetrahydrofuran was added to a mixture of 32 mg (0.246 mmol) of cobalt dichloride and 5 ml of tetrahydrofuran. The mixture was refluxed for 30 minutes and then the solvent was removed in vacuo. The solid was triturated in 5 ml of hexanes, collected on a frit and dried in vacuo. Yield: 95 mg, 77° A).

Example 40

(a) 2,2'-oxybis(ethane-2,1-diyl)bis(diisopropylphosphine) with bis(cyclooctene) iridium(I)dimer

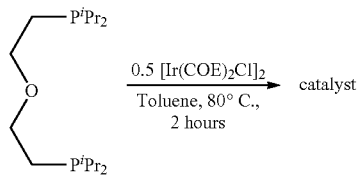

30 ml of toluene was added to 50 mg (0.163 mmol) of 2,2'-oxybis(ethane-2,1-diyl)bis(di-iso-propylphosphine) and 73 mg (0.082 mmol) of [iridium bis(cyclooctene)chloride]dimer [Ir(COE)$_2$Cl]$_2$ and the mixture was heated to 80° C. for 2 hours. The solvent was removed in vacuo and 30 ml of hexanes was added. The hexanes solution was filtered and then the solvent was removed in vacuo. The solid was then dissolved in 2 ml of tetrahydrofuran and 2 ml of water. The addition of ca. 50 mg (1.62 mmol) of AB resulted in the formation of a large amount of hydrogen.

(b) 2,2'-oxybis(ethane-2,1-diyl)bis(ditertiarybutylphosphine) with bis(cyclooctene)iridium(I)dimer

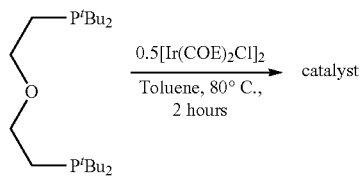

30 ml of toluene was added to 50 mg (0.138 mmol) of 2,2'-oxybis(ethane-2,1-diyl)bis(di-tert-butylphosphine) and 62 mg (0.062 mmol) of [iridium bis(cyclooctene)chloride]dimer [Ir(COE)$_2$Cl]$_2$ and the mixture was heated to 80° C. for 2 hours. The solvent was removed in vacuo and 30 ml of hexanes was added. The hexanes solution was filtered and then the solvent was removed in vacuo. The solid was then dissolved in 2 ml of tetrahydrofuran and 2 ml of water. The addition of 50 mg (1.62 mmol) of AB resulted in the formation of a large amount of hydrogen.

The reaction of the 'POP' ligands O(CH$_2$CH$_2$PR$_2$)$_2$ (R=isopropyl, tertiarybutyl) with iridium and cobalt sources was examined. Thus, the reaction chlorobis(cyclooctene)iridium(I)dimer with the ligands produced mixtures of compounds which could not be separated (R=isopropyl; R=tertiarybutyl). Reaction with cobalt(II)chloride (R=isopropyl; R=tertiary butyl) afforded uniform looking materials which were not fully characterized due to the paramagnetic nature of the material.

Metal Complexes with (—P—O-phenylene-O—P—) Ligands

Example 41

(a) 1,3-bis-(di-iso-propyl-phosphinooxy)benzene and [iridium bis(cyclooctene) chloride]dimer

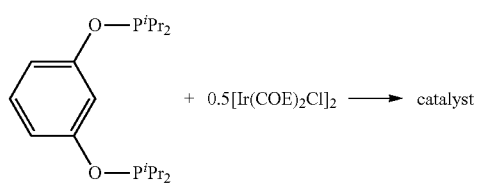

To a solution of [iridium bis(cyclooctene)chloride]dimer [Ir(COE)$_2$Cl]$_2$ (1.3 g, 1.46 mmol) in degassed iso-propanol (50 ml) was added a solution of 1,3-bis-(di-iso-propyl-phosphinooxy)benzene (1 g, 2.92 mmol) in iso-propanol (10 ml). The mixture was stirred at room temperature for 30 minutes, then at 60° C. for 30 minutes, and finally refluxed at 110° C. for 2 days. The solvent was then removed in vacuo, and hexanes was added to the residue. Filtration of the hexanes suspension afforded an orange solid and red solution. The filtrate was then pumped dry to afford a bright red solid. Yield: 0.584 g (35%). $^1$H NMR (400 MHz, C$_6$D$_6$): δ 7.00-6.60 (m, 3 H, Ph-H), 2.20-1.80 (m, 4H, CH(CH$_3$)$_2$), 1.50-0.80 (m, 12H, CH(CH$_3$)$_2$), −20.89 (d, 1H, (NH), −36.66 (s, br, 1H, ft-H). $^{31}$P{$^1$H} NMR (400 MHz, C$_6$D$_6$): δ 169, 145, 121. (The $^1$H & $^{31}$P NMR data is different from the literature reported value: Morales-Morales, D.; Redon, R.; Yung, C.; Jensen, C. M. *Inorganica Chimica Acta* 2004, 357, 2953-2956).

(b) 1,3-bis(di-tert-butylphosphinooxy)benzene hydrido chloro iridium

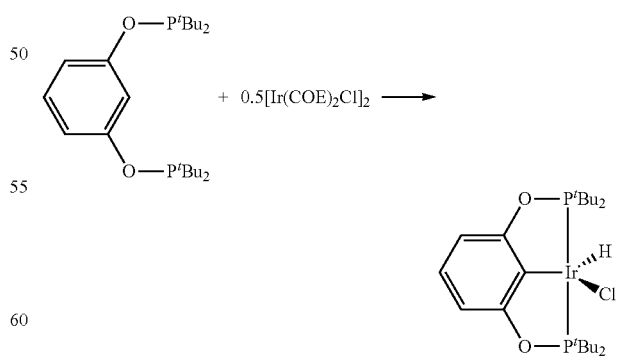

The compound was prepared according to the literature procedure (Göttker-Schnetmann, I.; White, P.; Brookhart, M. *J. Am. Chem. Soc.* 2004, 126, 1804-1811) Yield: 0.30 g (87%). $^1$H NMR (400 MHz, CD$_2$Cl$_2$): δ 6.76 (t, $^3$J$_{H-H}$=8.0

Hz, 1H, 4-H), 6.54 (d, $^3J_{H-H}$=8.0 Hz, 2H, 3- and 5-H), 1.35 (m, 36H, 4×tBu), −41.39 (t, $^2J_{P-H}$=13.1 Hz, 1H, IrH).

$^{31}P\{^1H\}$ NMR (400 MHz, $CD_2Cl_2$): δ 175.8.

(c) 1,3-bis(diethylphosphinooxy)benzene hydrido chloro iridium

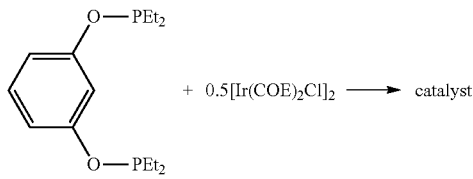

To a solution of [iridium bis(cyclooctene)chloride]dimer [Ir(COE)$_2$Cl]$_2$ (0.39 g, 0.435 mmol) in degassed iso-propanol (25 ml) was added a solution of 1,3-bis(diethylphosphinooxy)benzene (0.25 g, 0.87 mmol) in iso-propanol (10 ml). The mixture was stirred at room temperature for 30 minutes, then at 60° C. for 30 minutes, and finally refluxed at 110° C. for 2 days. The solvent was then removed in vacuo and hexanes was added to the residue. The precipitate was filtered off and was washed with hexanes to obtain a greenish brown solid. Yield: 0.21 g (47%). $^1H$ NMR (400 MHz, $CD_2Cl_2$): δ 7.00-6.00 (m, 3H, Ph-H), 2.50-1.00 (m, 8H, $CH_2CH_3$), 1.00-0.50 (m, 12H, $CH_2CH_3$), −20.50 (d, 1H, Ir—H). $^{31}P\{^1H\}$ NMR (400 MHz, $CD_2Cl_2$): δ 147, 112, 64.

(d) 1,3-bis(diphenylphosphinooxy)benzene hydrido chloro iridium

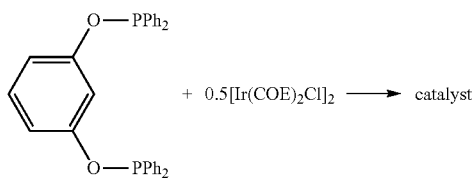

To a solution of [iridium bis(cyclooctene)chloride]dimer [Ir(COE)$_2$Cl]$_2$ (0.23 g, 0.261 mmol) in degassed iso-propanol (20 ml) was added a solution of 1,3-bis(diphenylphosphinooxy)benzene (0.25 g, 0.52 mmol) in iso-propanol (10 ml). The mixture was stirred at room temperature for 30 minutes, then at 60° C. for 30 minutes, and was then refluxed at 110° C. for 2 days. The solvent was then removed in vacuo, and the residue was precipitated by adding hexanes. The precipitate was collected by filtration and was then washed with hexanes to obtain a green solid. Yield: 0.3 g (82%). $^1H$ NMR (400 MHz, $CD_2Cl_2$): d 8.00-6.00 (m, 23 H, Ph-H), −19.02 (dd, $^2J_{PH}$=15.2 Hz, 1H, Ir—H). $^{31}P\{^1H\}$ NMR (400 MHz, $CD_2Cl_2$): d 115, 86.

Transition metal complexes of 'POP' or 1,3-$C_6H_4(OPR_2)_2$ ligands (R=ethyl, isopropyl, phenyl or tertiarybutyl) were prepared. For R=tertiarybutyl, the known complex 1,3-bis(ditertiarybutyloxy)benzenechlorohydridoiridium(III) was obtained. For all other R groups attempted, mixtures were obtained which were used as catalysts in situ. These ligands were also reacted with trichlorooxybis(triphenylphosphine)rhenium(V) and ruthenium(III)chloride hydrate. Complex mixtures formed.

Example 42

1,3-bis(diisopropylphosphinooxy)benzenebromonickel(II)

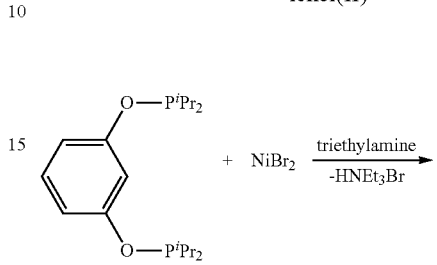

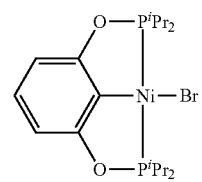

The compound was prepared with a slight modification to the literature procedure: (Pandarus, V.; Zargarian, D. *Chem. Commun.* 2007, 978-980). Yield: 0.66 g (95%). $^1H$ NMR (400 MHz, CDCl$_3$): δ 6.96 (t, $J_{H-H}$=8.0 Hz, 1H, PhH), 6.42 (d, $J_{H-H}$=8.0 Hz, 2H, PhH), 2.46 (m, 4H, PCH(CH$_3$)$_2$), 1.43 (dt, $J_{H-H}$=7.1 Hz, $J_{H-P}$=7.6 Hz, 12H, CH$_3$), 1.33 (dt, $J_{H-H}$=7. Hz, $J_{H-P}$=7.1 Hz, 12H, CH$_3$). $^{31}P$ NMR (162 MHz, CDCl$_3$): δ 188 (s).

The reaction of 1,3-bis(diisopropylphosphinooxy)benzene with nickel(II) bromide in the presence of triethylamine proceeded with elimination of triethylammonium chloride to afford the known complex bis(diisopropylphosphinooxy)benzenebromonickel(II).

Example 43

1,3-bis(diisopropylphosphinooxy)benzene with iron(II)chloride

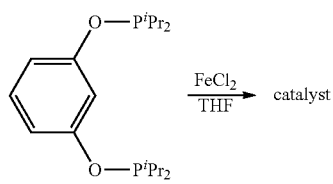

Iron(II)chloride (FeCl$_2$) (7 mg g, 0.0552 mmol) was added to a solution of 1,3-bis(diisopropylphosphinooxy)benzene (0.020 g, 0.0584 mmol) in tetrahydrofuran (30 ml). The reaction mixture was then stirred at room temperature for 30 minutes followed by 80° C. for 3 hours. Solid potassium tertiary butoxide (ca. 10 mg, 0.0891 mmol) was added followed by ammonia borane (ca. 50 mg, 1.62 mmol) at room temperature, no gas evolution was observed.

Example 44

Bis(diisopropylphosphinooxy)benzene with cobalt(II)chloride

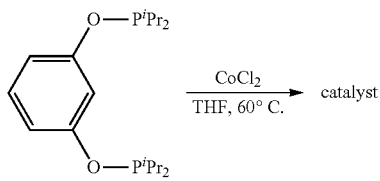

Cobalt(II)chloride (0.008 g, 0.0584 mmol) was added to a solution of bis(diisopropylphosphinooxy)benzene (0.020 g, 0.0584 mmol) in tetrahydrofuran (30 ml). The reaction mixture was then stirred at room temperature for 30 minutes, then at 60° C. for 3 hours. The color of the reaction mixture remained blue. Then potassium tertiary butoxide (ca. 10 mg, 0.0891 mmol) was added followed by ammonia borane (ca. 50 mg, 1.62 mmol) at room temperature. No gas evolution was observed.

The reaction of bis(diisopropylphosphinooxy)benzene with both iron(II) chloride and cobalt(II)chloride were attempted but the products were not fully characterized.

Metal Complexes with (—P-phenylene-P—) Ligands

Example 45

1,3-bis((ditertiarybutylphosphino)methyl)benzenechlorohydridoiridium(III)

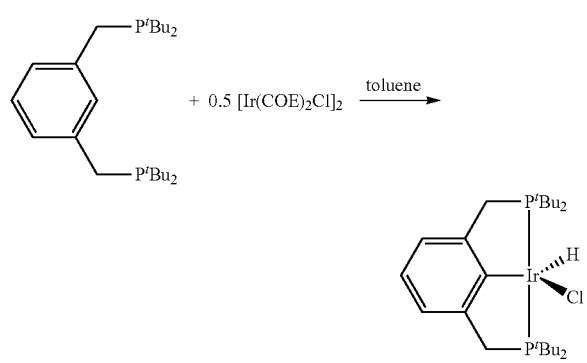

The compound was prepared according to the literature procedure (Moulton, C. J.; Shaw, B. L. *J. C. S. Chem. Comm. Dalton Trans.* 1976, 1020-1024). Yield: 0.60 g (38%). $^1$H NMR (400 MHz, CD$_2$Cl$_2$): δ 7.00 (d, $^3J_{H-H}$=8.0 Hz, 1H, 4-H), 6.98 (m, 2H, 3- and 5-H), 3.14 (m, 4H, CH$_2$), 1.39 (m, 36H, t-Bu), −43.0 (t, $^2J_{P-H}$=12.0 Hz, 1H, IrH). $^{31}$P{$^1$H} NMR (162 MHz, CD$_2$Cl$_2$): δ 68.0

Pincer complexes containing 'PCP' (1,3-C$_6$H$_4$(CH$_2$PR$_2$)$_2$) (R=isopropyl, tertiarybutyl) ligands have been synthesized. The reaction of 1,3-bis((ditertiarybutylphosphino)methyl)benzene with chlorobis(cyclooctene)iridium(I)dimer affords the known complex 1,3-bis((ditertiarybutylphosphino)methyl)benzene chlorohydridoiridium(III).

Example 46

1,3-bis((diisopropylphosphino)methyl)benzene with chlorobis(cyclooctene)iridium(I)dimer

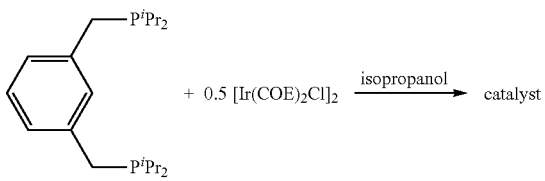

The compound was prepared according to the literature procedure: (Moulton, C. J.; Shaw, B. L. *J. C. S. Chem. Comm. Dalton Trans.* 1976, 1020-1024). 20 mg of the solid and 7 mg (0.062 mmol) of potassium tertiary butoxide were dissolved in tetrahydrofuran and then 50 mg (1.62 mmol) of ammonia borane was added, resulting in the evolution of a large amount of hydrogen.

This reaction resulted in a mixture of compounds.

Example 47

1,3-bis(ditertiarybutylphosphine)methylpenzenechlorotriphenyl-phosphineruthenium(II)

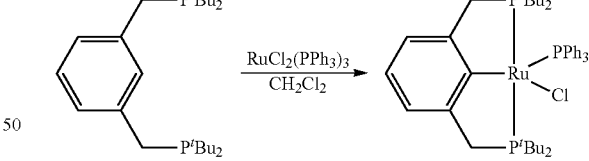

This compound was prepared in a similar fashion to the phenyl analogue: Karlen, T.; Dani, P.; Grove, D. M.; Steenwinkel, P., van Koten, G. *Organometallics* 1996, 15, 5687-5694. Yield: 0.448 g. $^{31}$P{$^1$H} NMR (162 MHz, C$_6$D$_6$): δ 32.6 (ca. 65%), −7.3 (ca. 35%). 10 mg of the product was dissolved in 10 ml of tetrahydrofuran and 10 ml of water in a scintillation vial to form a yellow solution. Ammonia borane was added (50 mg, 1.620 mmol) and the hydrolysis rate was moderate.

The reaction of 1,3-bis((ditertiarybutylphosphino)methyl) benzene with dichlorotris(triphenylphosphine)ruthenium(II) provided the previously reported complex 1,3-bis((ditertiarybutylphosphino)methyl)benzenechlorotriphenyl-phosphineruthenium(II).

Example 48

1,3-bis((ditertiarybutylphosphino)methyl)benzene with ruthenium(III)chloride hydrate

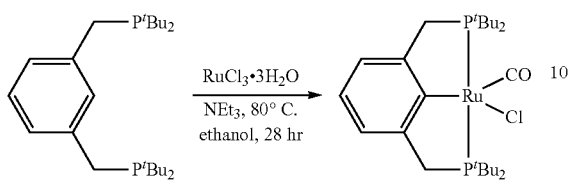

The compound was prepared according to the literature procedure (Gusev, D. G.; Madott, M.; Dolgushin, F. M.; Lyssenko, K. A.; Antipin, M. Y. *Organometallics* 2000, 19, 1734-1739). Yield: 0.05 g. 10 mg of the product was dissolved in 10 ml of tetrahydrofuran and 10 ml of water in a scintillation vial to form a red solution. The material was tested for ammonia borane hydrolysis. $^1$H NMR (400 MHz, $C_6D_6$): δ 7.06 (m, 3H, $C_6H_3$), 3.13 (overlapped, 4H, $CH_2$), 1.10, 1.34 (vt, J=6.5 Hz, 36H, $CH_3$). $^{31}P\{^1H\}$ NMR (162 MHz, $C_6D_6$): δ 69.0.

Refluxing 1,3-bis((ditertiarybutylphosphino)methyl)benzene with ruthenium(III)chloride hydrate in ethanol produced the known complex 1,3-bis((ditertiarybutylphosphino)methyl)benzene(carbonyl)chlororuthenium(II). The carbonyl ligand is formed by decarbonylation of the ethanol solvent.

Example 49

1,3-bis(di-t-butylphosphine)methyl)benzenechlorohydridoruthenium(II)

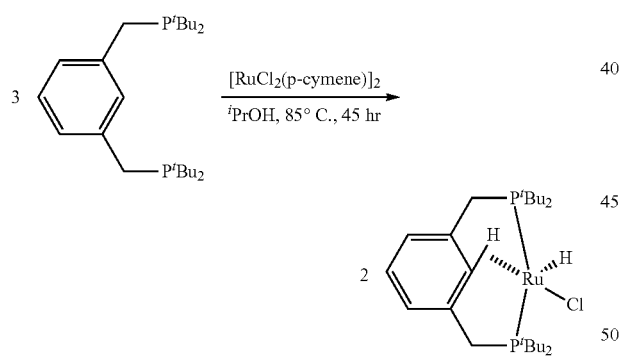

The compound was prepared according to the literature procedure (Gusev, D. G.; Madott, M.; Dolgushin, F. M.; Lyssenko, K. A.; Antipin, M. Y. *Organometallics* 2000, 19, 1734-1739). Yield: 0.126 g. 10 mg of the product was dissolved in 10 ml of tetrahydrofuran and 10 ml of water in a scintillation vial to form a red solution. Ammonia borane was added (50 mg, 1.620 mmol) and the hydrolysis rate is moderate. $^1$H NMR (400 MHz, $CD_2Cl_2$): δ 7.07 (m, 2H, phenyl-H), 6.93 (m, 1H, phenyl-H), 3.06 (m, 4H, $CH_2$), 1.27, 1.34 (vt, J=9.4 Hz, 36H, $CH_3$), −15.53 (t, $^2J_{HP}$=13.0 Hz, 2H, RuH). $^{31}P\{^1H\}$ NMR (162 MHz, $C_6D_6$): δ 63.7.

A complex was prepared by the reaction of 1,3-bis((di-tert-butylphosphino)methyl)benzene with dichloro(p-cymene)ruthenium(II)dimer. This reaction resulted in the formation of the previously reported pincer complex where the coordination sphere of the metal is taken up by two phosphine groups, a hydride and chloride ligand and an agostic interaction with a phenyl C—H bond

Metal Complexes with (—P—N-phenylene-N—P—) Ligands

Example 50

$N^1,N^3$-bis(diisopropylphosphino)benzene-1,3-diamine with chlorobis(cyclooctene)iridium

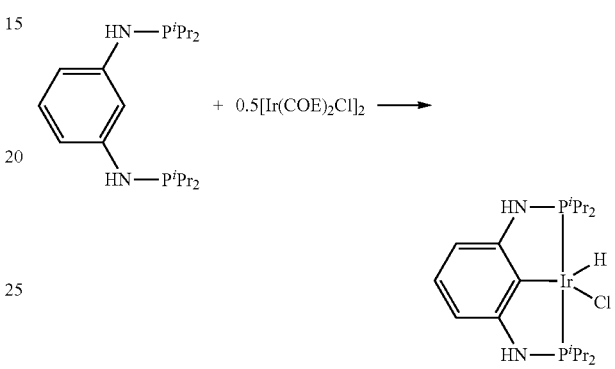

To a solution of chlorobis(cyclooctene)iridium(I)dimer [Ir(COE)$_2$Cl]$_2$ (0.025 g, 0.0294 mmol) in tetrahydrofuran (20 ml) was added $N^1,N^3$-bis(diisopropylphosphino)benzene-1,3-diamine (0.02 g, 0.0587 mmol). The mixture was stirred at room temperature for 30 minutes, then at 80° C. for 3 hours. The solvent was then removed in vacuo, and the residue was precipitated by the addition of hexanes. The precipitate was isolated by filtration and was then washed with hexanes to obtain a solid product. Yield: 15 mg (45%). The compound appears to be moisture sensitive. $^1$H NMR (400 MHz, $CD_2Cl_2$): δ 7.6-6.80 (m, 3 H, Ph-H), 3.10 (s, br, 2H, NH), 2.30-1.80 (m, 4H, $CH(CH_3)_2$), 1.80-1.00 (br, 12H, CH$(CH_3)_2$), −24.6 (dd, $^2J_{PH}$=15.2 Hz, 1H, IrH). $^{31}P\{^1H\}$ NMR (162 MHz, $CD_2Cl_2$): δ 84.0.

The reaction of the ligand with chlorobis(cyclooctene)iridium(1)dimer afforded a single compound that has a $^{31}$P NMR resonance at δ 84.0. The $^1$H NMR spectrum of the product shows the presence of the P—N-phenylene-N—P ligand and also a hydride signal at δ−24.6. We propose the tentative structure in the scheme above for the complex.

Example 51

$N^1,N^3$-bis(diisopropylphosphino)benzene-1,3-diamine with cobalt(II)chloride

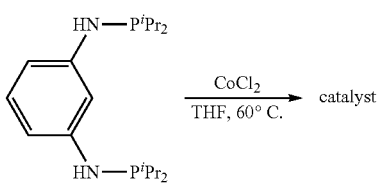

Cobalt(II)chloride (CoCl$_2$) (0.0076 g, 0.0587 mmol) was added to a solution of $N^1,N^3$-bis(diisopropylphosphino)benzene-1,3-diamine (0.020 g, 0.0587 mmol) in tetrahydrofuran (30 ml). The reaction mixture was then stirred at room temperature for 30 minutes, followed by 60° C. for 3 hours resulting in a change of color from blue to bluish green. The material was tested for ammonia borane hydrolysis.

The reaction of $N^1,N^3$-bis(di-iso-propylphosphino)benzene-1,3-diamine with cobalt(II)chloride or trichlorooxybis(triphenylphosphine)rhenium(V) produced mixtures of products Metal Complexes with (—P—N—N—P—) Ligands

Example 52

$N^1,N^2$-bis(2-(diphenylphosphino)benzylidene)cyclohexane with cobalt(II) chloride

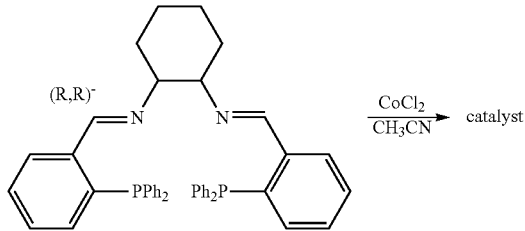

An 835 mg (1.268 mmol) sample of $N^1,N^2$-bis(2-(diphenylphosphino)-benzylidene)cyclohexane-1,2-diamine and 150 mg (1.155 mmol) of cobalt(II) chloride were stirred in 5 ml of acetonitrile for one hour. 40 ml of diethyl ether was added dropwise and then the mixture was stirred for 30 minutes to complete precipitation. The solid was collected by vacuum filtration, washed with 5 ml of diethyl ether and then dried in vacuo. Yield 0.900 g. NMR spectra were not obtained.

The reaction of this ligand system with cobalt(II)chloride in acetonitrile proceeds smoothly to afford a brown material

Example 53

Bis(acetonitrile) $N^1,N^2$-bis(2-(diphenylphosphino)benzylidene)cyclohexane-1,2-diamine iron (II) tetrafluoroborate

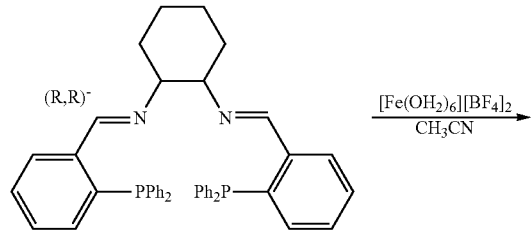

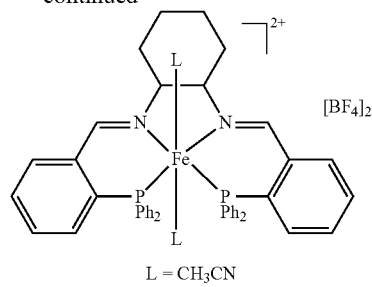

L = CH$_3$CN

Acetonitrile (5 ml) was added to 210 mg (0.319 mmol) of $N^1,N^2$-bis(2-(diphenylphosphino)benzylidene)cyclohexane-1,2-diamine and 102 mg (0.302 mmol) of iron (II) tetrafluoroborate hexahydrate [Fe(OH$_2$)$_6$][BF$_4$]$_2$ and the mixture was stirred for one hour. The solution was concentrated to ca. 1 ml and then 20 ml of diethyl ether was added dropwise. The mixture was stirred for 30 minutes and then the solid was collected on a glass frit and dried in vacuo. Yield 240 mg, 82%. $^1$H NMR (300 Mhz, CD$_3$CN): δ 9.24 (s); 6.67-8.08 (m); 3.55 (m); 2.80 (m); 2.15 (m); 1.55 (m). $^{31}$P NMR (121 Mhz, CD$_3$CN): δ 52.7. The material was tested for ammonia borane hydrolysis.

The addition of $N^1,N^2$-bis(2-(diphenylphosphino)-benzylidene)cyclohexane-1,2-diamine to iron (II) tetrafluoroborate hexahydrate in acetonitrile resulted in the immediate formation of a red solution. The dicationic compound was readily isolated via crystallization. The tentative structure indicated in the scheme above consists of a psueodooctahedral complex with a coordinated P$_2$N$_2$ ligand a two coordinated acetonitrile ligands. The $^1$H NMR spectrum of the material shows the expected resonances, and features a two proton signal at δ 9.24 which corresponds to the N=CH moiety. The $^{31}$P NMR spectrum of the complex has a single resonance at δ 52.7.

Example 54

$N^1,N^2$-bis(2-(diphenylphosphino)benzylidene)cyclohexane-1,2-diamine with nickel(II)bromide

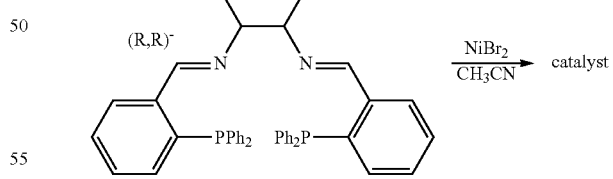

Acetonitrile (10 ml) was added to 751 mg (1.140 mmol) of $N^1,N^2$-bis(2-(diphenylphosphino)benzylidene)cyclohexane-1,2-diamine and 249 mg (1.140 mmol) of nickel(II)bromide. The mixture was heated to reflux for one hour and then was cooled to room temperature. 40 ml of diethyl ether was added dropwise and the precipitate was collected on by vacuum filtration and was dried in vacuo. Yield 1.003 g, 78%. NMR spectra were not obtained due to the low solubility of the compound. The material was tested for ammonia borane hydrolysis.

A nickel complex of $N^1,N^2$-bis(2-(diphenylphosphino)-benzylidene)cyclohexane-1,2-diamine was prepared. The material has not been fully characterized owing to its extremely low solubility.

Example 55

$N^1,N^2$-bis(2-(diphenylphosphino)benzylidene)cyclohexane-1,2-diamine with tetrakis(acetonitrile)copper (I) hexafluorophosphate

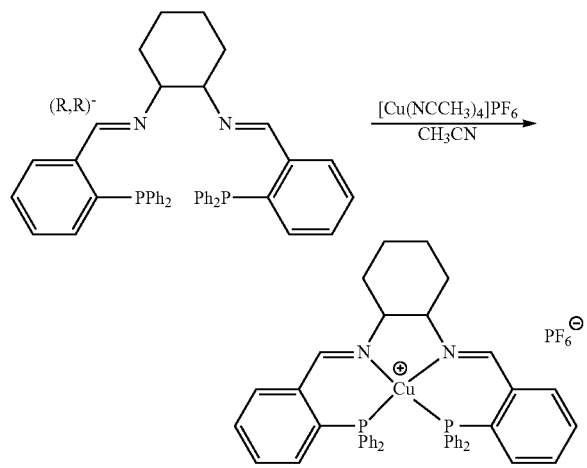

To a solution of $N^1,N^2$-bis(2-(diphenylphosphino)benzyl) cyclohexane-1,2-diamine (0.7 g, 1.06 mmol) in acetonitrile (20 ml) was added tetrakis(acetonitrile)copper(I) hexafluorophosphate (0.38 g, 1.01 mmol). The reaction mixture was then stirred at room temperature for 4 hours. The solvent was removed in vacuo, and the residue was precipitated by the addition of hexanes. The precipitate was filtered and was washed with hexanes and dried in vacuo. The material was used without further purification for ammonia borane hydrolysis experiments. $^1$H NMR (300 Mhz, CD$_2$Cl$_2$): δ 8.47 (s); 7.07-7.72 (m); 3.06 (s); 2.32 (m); 1.83 (m); 1.05 (m). $^{31}$P NMR (121 Mhz, CD$_2$Cl$_2$): δ−3.0. The material was tested for ammonia borane hydrolysis.

A copper containing $P_2N_2$ complex was prepared by the reaction of $N^1,N^2$-bis(2-(diphenylphosphino)benzylidene) cyclohexane-1,2-diamine with tetrakis(acetonitrile) copper (I) hexafluorophosphate as depicted in the scheme above. The $^{31}$P NMR spectrum of the complex displays a single resonance at δ−3.0. The $^1$H NMR spectrum shows a signal for the N═CH group at δ 8.47.

Example 56

$N^1,N^2$-bis(2-(diphenylphosphino)benzyl)cyclohexane-1,2-diamine with chlorobis(cyclooctene)iridium (I)dimer [Ir(COE)$_2$Cl]$_2$

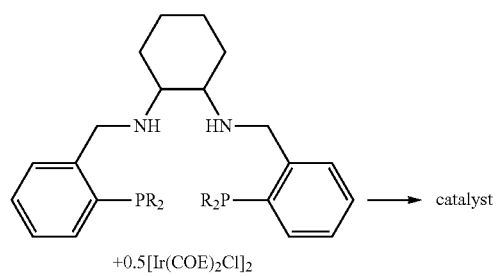

+0.5[Ir(COE)$_2$Cl]$_2$

R = Ph, Tol, Xyl
R = phenyl

To a solution of $N^1,N^2$-bis(2-(diphenylphosphino)benzyl) cyclohexane-1,2-diamine (0.300 g, 0.417 mmol) in tetrahydrofuran (20 ml) was added chlorobis(cyclooctene)iridium(I) dimer [Ir(COE)$_2$Cl]$_2$ (0.180 g, 0.208 mmol). The reaction mixture was then stirred at room temperature for 30 minutes, and then at 80° C. for 3 hours. The solvent was removed in vacuo, and the residue was precipitated by the addition of hexanes. The precipitate was filtered and was washed with hexanes to obtain a solid product. The material was used without further purification for ammonia borane hydrolysis experiments. Yield: 0.28 g (70%). $^1$H NMR (400 MHz, CD$_2$Cl$_2$): δ 7.58-6.80 (m, 20 H, Ph-H), 4.40-3.50 (m, 4H, NCH$_2$), 2.23 (m, br, 24H, CH$_3$), 1.90-0.20 (m, br, 8H, cyclohexane-H), −21.05 (dd, $^2J_{PH}$=20.5 Hz, 1H, IrH). $^{31}$P{$^1$H}NMR (400 MHz, CD$_2$Cl$_2$): δ−7.0 (ca. 50%), −17.5 (ca. 50%). (The $^{31}$P NMR data is different from the literature reported value: Li, Y.-Y.; Zhang, H.; Chen, J. -S.; Liao, X. -L.; Dong, Z. -R.; Gao, J. -X. *Journal of Molecular Catalysis A: Chemical* 2004, 218, 153-156).

The reactivity of diamine diphosphine ligand $N^1N^2$-bis(2-(diphenylphosphino)benzyl)cyclohexane-1,2-diamine towards chlorobis(cyclooctene)iridium(I)dimer was investigated. This reaction produced a mixture of two compounds with resonances in the $^{31}$P NMR spectrum at δ−2.7 and −15.1. Separation of the compounds was not achieved.

Example 57

(a) $N^1N^2$-bis(2-(diphenylphosphino)benzyl)cyclohexane-1,2-diaminedichloro-cobalt(II)

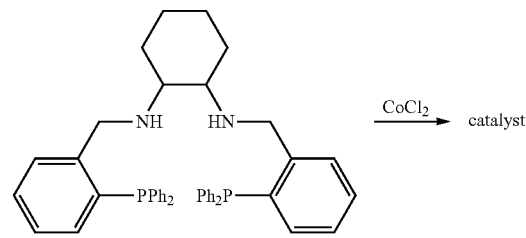

Cobalt(II)chloride (0.0015 g, 0.12 mmol) was added to a solution of $N^1N^2$-bis(2-(diphenylphosphino)benzyl)cyclohexane-1,2-diamine (0.076 g, 0.115 mmol) in tetrahydrofuran (3 ml). The reaction mixture was then heated at 80° C. until all cobalt(II)chloride dissolved (<3 minutes). A 1 ml portion of the reaction mixture was taken and water was added, followed by ammonia borane (ca. 50 mg, 1.62 mmol), resulting in extensive hydrogen evolution.

(b) $N^1,N^2$-bis(2-(di-p-tolylphosphino)benzyl)cyclohexane-1,2-diamine dichlorocobalt(II)

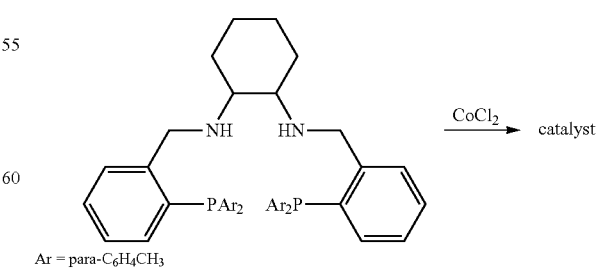

Ar = para-C$_6$H$_4$CH$_3$

Tetrahydrofuran (3 ml) of was added with stirring to 230 mg (0.320 mmol) of $N^1,N^2$-bis(2-(di-p-tolylphosphino)benzyl)cyclohexane-1,2-diamine and 38 mg (0.293 mmol) of cobalt(II)chloride. The mixture initially turned pink and after stirring for 1 hour had turned dark green. The solvent was removed in vacuo and the solid was triturated with 2×5 ml of hexanes and was then dried in vacuo to afford an olive green powder. Yield: 230 mg, 93%.

The compounds $N^1N^2$-bis(2-(diphenylphosphino)benzyl)cyclohexane-1,2-diamine and $N^1N^2$-bis(2-(di-p-tolylphosphino)benzyl)cyclohexane-1,2-diamine were reacted with cobalt(II)chloride. The dark green complexes were readily obtained by removal of the solvent in vacuo and triturating the material in hexanes. The compounds are paramagnetic and were not characterized further.

Metal Complexes with (—N—N—N—N—) Ligands

Example 58

$N^1,N^2$-bis(pyridin-2-ylmethylene)cyclohexane-1,2-diamine with iron (II) tetrafluoroborate hexahydrate

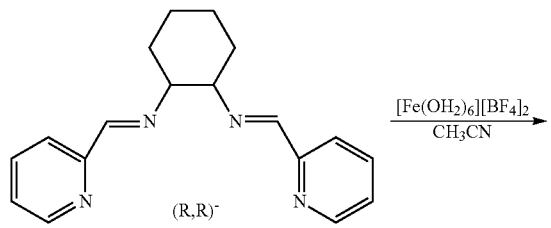

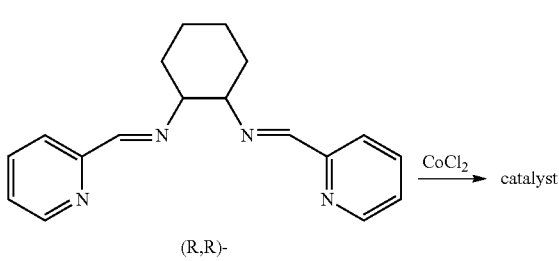

Degassed acetonitrile (10 ml) of was added to 200 mg (0.684 mmol) of $N^1,N^2$-bis(pyridin-2-ylmethylene)cyclohexane-1,2-diamine and 210 mg (0.622 mmol) of iron(II) tetrafluoroborate hexahydrate $[Fe(OH_2)_6][BF_4]_2$ resulting in the formation of a deep purple solution. The mixture was stirred for one hour, filtered through Celite and then concentrated in vacuo to ca. 1 ml. 10 ml of diethyl ether was added dropwise resulting in the formation of a purple solid that was collected by vacuum filtration and dried in vacuo. $^1$H NMR (300 Mhz, $CD_2Cl_2$): δ 9.41 (m, br); 7.17-8.33 (m, br); 3.61 (br); 3.24 (br); 2.96 (br); 2.35 (br); 1.11-1.83 (m). Yield 270 mg, 73%. The material was tested for ammonia borane hydrolysis.

Example 59

$N^1,N^2$-bis(pyridin-2-ylmethylene)cyclohexane-1,2-diamine with tetrakis(acetonitrile)copper(I) hexafluorophosphate

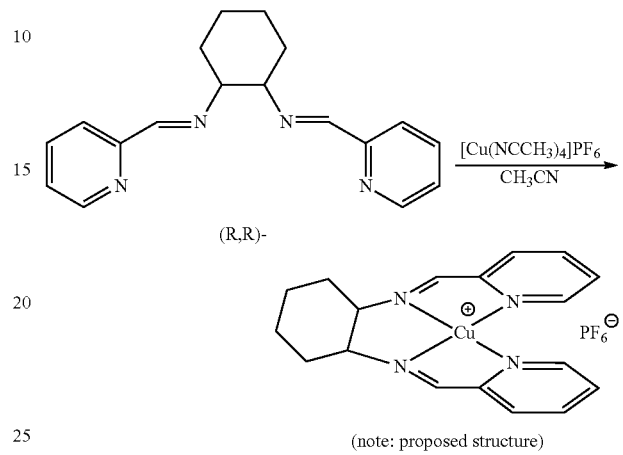

(note: proposed structure)

Degassed acetonitrile (10 ml) was added to 100 mg (0.342 mmol $N^1,N^2$-bis(pyridin-2-ylmethylene)cyclohexane-1,2-diamine and 110 mg (0.295 mmol) tetrakis(acetonitrile)copper(I) hexafluorophosphate $[Cu(NCCH_3)_4]PF_6$ and the mixture was stirred for one hour. The solution was filtered through Celite and then the solvent volume was reduced in vacuo to ca. 1 ml. 10 ml of diethyl ether was added dropwise and the red precipitate was collected on a frit and dried in vacuo. Yield 110 mg, 75%. $^1$H NMR (300 Mhz, $CD_2Cl_2$): δ 8.51 (s); 7.91 (m); 7.74 (m); 7.35-7.43 (m); 3.88 (m); 2.05 (m); 1.18-1.81 (m). The material was tested for ammonia borane hydrolysis.

Example 60

$N^1,N^2$-bis(pyridin-2-ylmethylene)cyclohexane-1,2-diamine with cobalt(II) chloride Tetrahydrofuran (10 ml) of was added to 220 mg (0.752 mmol) of $N^1,N^2$-bis(pyridin-2-ylmethylene)cyclohexane-1,2-diamine and 80 mg (0.616 mmol) of cobalt(II)chloride. The mixture was heated to reflux for three hours and was then cooled to room temperature and the solid that had formed was collected by vacuum filtration and then dried in vacuo. Yield 259 mg, 99%. NMR spectra were not obtained. The material was tested for ammonia borane hydrolysis.

Example 61

N¹,N²-bis(pyridin-2-ylmethylene)cyclohexane-1,2-diamine with nickel(II) bromide

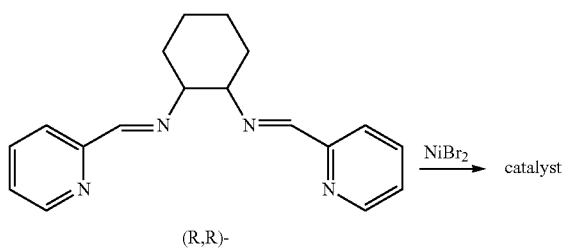

(R,R)-

A 0.700 g (2.394 mmol) sample of N¹,N²-bis(pyridin-2-ylmethylene)cyclohexane-1,2-diamine and 0.455 g (2.082 mmol) of nickel(II) bromide were refluxed in 10 ml of degassed acetonitrile for one hour. 40 ml of diethyl ether was added dropwise and then the solid was collected by vacuum filtration. Yield 850 mg, 80%. NMR spectra were not obtained due to the low solubility of the compound.

Complexes containing the 'N—N—N—N' ligand N¹,N²-bis(pyridin-2-ylmethylene)cyclohexane-1,2-diamine were also prepared. The reaction of the ligand with iron (II) tetrafluoroborate hexahydrate or tetrakis(acetonitrile) copper (I) hexafluorophosphate proceeded rapidly and afforded single products as indicated by $^1$H NMR spectroscopy. The spectra showed the expected resonances for the "N—N—N—N" adducts. Cobalt and nickel complexes were prepared analogously. Further characterization was not attempted due to the very low solubility (metal=nickel) or paramagnetic nature (metal=cobalt) of the complexes.

Example 62

1,1'-(pyridine-2,6-diyl)bis(3-butyl-1H-imidazol-3-ium)chloride with chlorobis(cyclooctene)iridium(I) dimer

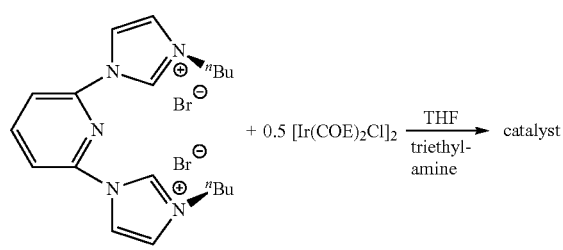

To a solution of 1,1'-(pyridine-2,6-diyl)bis(3-butyl-1H-imidazol-3-ium) chloride (1.0 g, 2.06 mmol) in tetrahydrofuran (30 ml) was added chlorobis(cyclooctene)iridium(I) dimer [Ir(COE)₂Cl]₂ (0.92 g, 1.03 mmol) and triethylamine (0.40 g, 4.1 mmol). The reaction mixture was then stirred at room temperature for 30 minutes, then at 80° C. overnight. The solvent was then evaporated, and the residue was precipitated by the addition of hexanes. The precipitate was filtered and then washed with hexanes to obtain an orange brown color solid. Yield: 0.52 g (36%) $^1$H NMR (400 MHz, CD₂Cl₂): δ 7.63-6.90 (m, 7H, imidazole & pyridine H), 4.30 (t, 4H, NCH₂CH₂CH₂CH₃), 1.84-0.14 (m, 14H, NCH₂CH₂CH₂CH₃), −15.5 (s, 1H, Ir—H), −23.8 (s, 1H, Ir—H).

The reaction of 1,1'-(pyridine-2,6-diyl)bis(3-butyl-1H-imidazol-3-ium) chloride with chlorobis(cyclooctene)iridium(I)dimer in the presence of excess triethylamine was performed. A complex mixture was formed as indicated by NMR spectroscopy.

Example 63

1,1'-(pyridine-2,6-diyl)bis(3-butyl-1H-imidazol-3-ium)chloride with cobalt(II) chloride

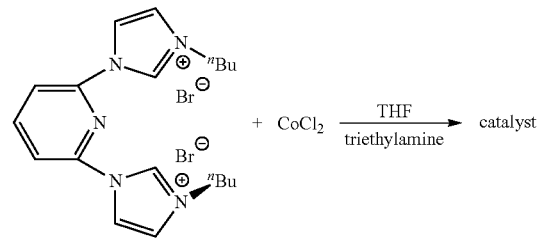

To a solution of 1,1'-(pyridine-2,6-diyl)-bis-(3-butyl-1H-imidazol-3-ium) chloride (0.2 g, 0.41 mmol) in THF (30 ml) was added cobalt dichloride (0.05 g, 0.41 mmol) and triethylamine (0.08 g, 0.82 mmol). The reaction mixture was then stirred at room temperature for 30 minutes, and then at 80° C. for 3 hours. The solvent was then evaporated, and the residue was then precipitated into hexanes. The precipitate was filtered and washed with hexanes to obtain a pale blue solid. Yield: 0.12 g (48%).

The reaction of 1,1'-(pyridine-2,6-diyl)bis(3-butyl-1H-imidazol-3-ium) chloride with cobalt(II)chloride produced a paramagnetic blue solid material that was not completely characterized.

Example 64

2,6-bis(1-n-butylimidazolium)pyridine dibromide with dichloro-1,5-cyclooctadieneruthenium(II) polymer

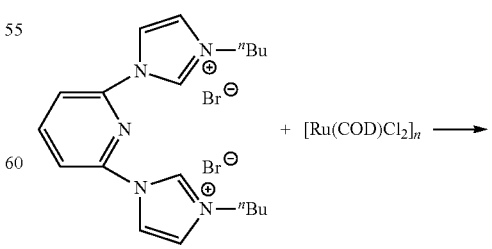

-continued

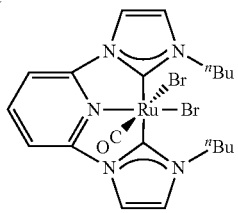

The compound was prepared according to the literature procedure (Poyatos, M.; Mata, J. A.; Falomir, E.; Crabtree, R. H.; Peris, E. *Organometallics* 2003, 1110-1114). Yield: 25%. $^1$H NMR (400 MHz, DMSO-$d_6$): δ 8.39 (s, 2H, imidazole H), 8.30 (t, 1H, $^3J_{H-H}$=14.0 Hz, pyridine H), 7.91 (d, 2H, $^3J_{H-H}$=13.5 Hz, pyridine H), 7.61 (s, 2H, imidazole H), 4.32 (t, 4H, n-Bu), 1.92 (quintet, 4H, n-Bu), 1.38 (sextet, 4H, n-Bu), 0.92 (t, 6H, n-Bu).

When 1,1'-(pyridine-2,6-diyl)bis(3-butyl-1H-imidazol-3-ium)chloride and dichloro(1,5-cyclooctadiene)ruthenium(II) polymer were refluxed in ethanol in the presence of triethylamine the known compound 2,6-dibromo bis(1-n-butylimidazolium)pyridine(carbonyl)ruthenium(II) was formed. The $^1$H NMR spectrum of the product agreed with the literature report.

Example 65

1,1'-(pyridine-2,6-diyl)bis(3-butyl-1H-imidazol-3-ium)chloride with chlorobis(cyclooctene)iridium(1) dimer

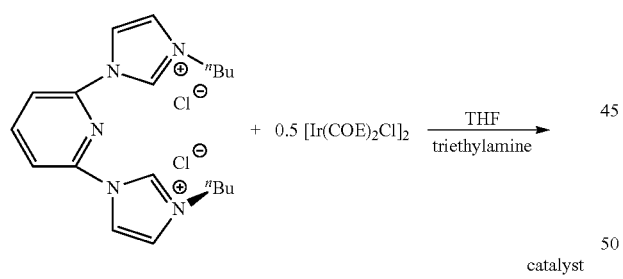

To a solution of 1,1'-(pyridine-2,6-diyl)bis(3-butyl-1H-imidazol-3-ium) chloride (1.0 g, 2.06 mmol) in tetrahydrofuran (30 ml) was added [iridium bis(cyclooctene)chloride] dimer [Ir(COE)$_2$Cl]$_2$ (0.92 g, 1.03 mmol) and triethylamine (0.4 g, 0.412 mmol). The reaction mixture was then stirred at room temperature for 30 minutes, then at 80° C. overnight. The solvent was then evaporated, and the residue was precipitated by the addition of hexanes. The precipitate was filtered and then washed with hexanes to obtain an orange brown color solid. Yield: 0.52 g (36%) $^1$H NMR (400 MHz, CD$_2$Cl$_2$): δ 7.63-6.90 (m, 7H, imidazole & pyridine H), 4.30 (t, 4H, NCH$_2$CH$_2$CH$_2$CH$_3$), 1.84-0.14 (m, 14H, NCH$_2$CH$_2$CH$_2$CH$_3$), −15.5 (s, 1H, Ir—H), −23.8 (s, 1H, Ir—H).

Example 66

1,1'-(1,3-phenylenebis(methylene))bis(3-butyl-1H-imidazol-3-ium)chloride with chlorobis(cyclooctene)iridium(I)dimer

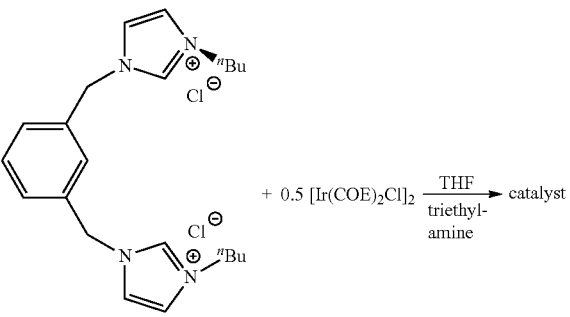

To a solution of 1,1'-(1,3-phenylenebis(methylene))bis(3-butyl-1H-imidazol-3-ium)chloride (1.0 g, 2.36 mmol) in tetrahydrofuran (30 ml) was added chlorobis(cyclooctene)iridium(I)dimer (1.06 g, 1.18 mmol) and triethylamine (0.48 g, 4.72 mmol). The reaction mixture was then stirred at room temperature for 30 minutes, then at 80° C. overnight. The solvent was then removed in vacuo, and the residue was precipitated by the addition of hexanes. The precipitate was filtered and washed with hexanes to obtain an orange brown color solid. Yield: 0.74 g (48%). $^1$H NMR (400 MHz, CD$_2$Cl$_2$): δ 7.14-6.12 (m, 7H, imidazole & pyridine-H), 5.61 (m, 4H, CH$_2$), 4.24 (t, 4H, NCH$_2$CH$_2$CH$_2$CH$_3$), 1.84-0.40 (m, br, 14H, NCH$_2$CH$_2$CH$_2$CH$_3$), −27.2 (s, 1H, Ir—H).

The synthesis of pincer complexes by the reaction of 1,1'-(1,3-phenylenebis(methylene))bis(3-butyl-1H-imidazol-3-ium)chloride with chloro-bis(cyclooctene)iridium(I)dimer was attempted. The $^1$H NMR spectrum of the product showed that a complex mixture had formed.

Example 67

1,1'-(1,3-phenylenebis(methylene))bis(3-butyl-1H-imidazol-3-ium)chloride with cobalt(II)chloride

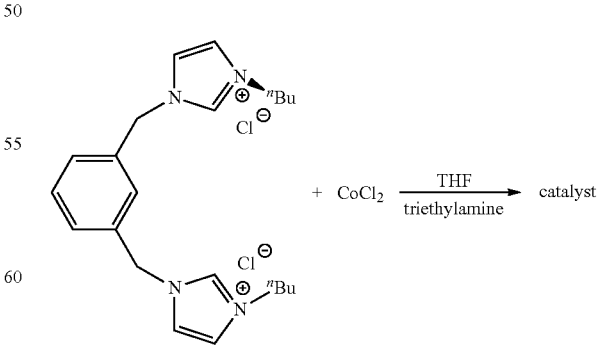

Cobalt(II)chloride (0.15 g, 1.18 mmol) was added to a solution of 1,1'-(1,3-phenylenebis(methylene))bis(3-butyl-1H-imidazol-3-ium)chloride (0.5 g, 1.18 mmol) and 2 equivalents of triethylamine (0.23 g, 2.63 mmol) in tetrahydrofuran (30 ml). The reaction mixture was then stirred at room temperature for 30 minutes, then at 80° C. for 3 hours. The solvent was removed, and the residue was precipitated by the addition of hexanes. The precipitate was filtered and washed with hexanes to obtain a pale blue solid.

Yield: 0.56 g (92%).

When 1,1'-(1,3-phenylenebis(methylene))bis(3-butyl-1H-imidazol-3-ium)chloride and cobalt(II)chloride were heated in the presence of excess triethylamine a paramagnetic blue solid was obtained in high yield. Further characterization was not attempted.

Example 68

(2-bis(1-n-butylimidazolium)ethyl)amine with chlorobis(cyclooctene)iridium(I)dimer

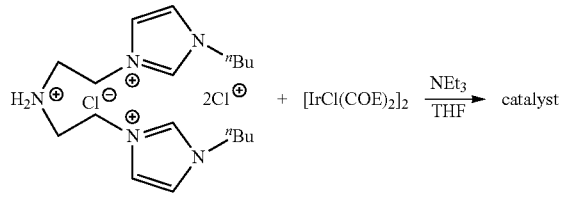

A 105 mg (0.117 mmol) portion of chlorobis(cyclooctene) iridium(I) dimer [IrCl(COE)$_2$]$_2$ was added to 110 mg of (2-bis (1-n-butylimidazolium)ethyl)amine in 10 ml of degassed isopropanol. 350 ml of degassed triethylamine was added and the mixture was refluxed overnight. The solution was concentrated to ca. 3 ml and then the solid was collected via filtration and dried in vacuo. NMR spectroscopy indicated that a mixture of compounds was present. The mixture displayed a low reactivity towards ammonia borane hydrolysis.

Metal Complexes with (N—S) Ligands

Example 69

Thiophen-2-ylmethanamine with dichlorotris(triphenylphosphine)ruthenium(II)

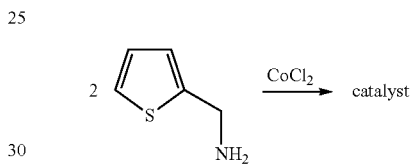

(note: proposed geometry)

Thiophen-2-ylmethanamine (200 μl, 1.949 mmol) of was added to 1.272 g of dichlorotris(triphenylphosphine)ruthenium(II) [RuCl$_2$(PPh$_3$)$_3$] in 10 ml of tetrahydrofuran. The mixture was stirred for two hours and then the solvent was removed in vacuo. The residue was dissolved in 5 ml of tetrahydrofuran and then 30 ml of hexanes was added dropwise and the mixture was allowed to stir for 30 minutes. The solid was collected by vacuum filtration and was then dried in vacuo. Yield 694 mg. $^1$H NMR (400 Mhz, CD$_2$Cl$_2$): δ 6.51-7.46 (m, 15H, C$_6$H$_5$); 3.78 (s, 2H, CH$_2$); 3.12 (s, 2H, NH$_2$). $^{31}$P NMR (162 Mhz, CD$_2$Cl$_2$): δ 45.7. The material was tested for ammonia borane hydrolysis.

The addition of thiophen-2-ylmethanamine to dichlorotris (triphenyl-phosphine)ruthenium (II) proceeds within two hours and the product isolated had a single $^{31}$P NMR resonance at δ 45.7. The $^1$H NMR spectrum of the product showed the presence of triphenylphosphine and thiophen-2-ylmethanamine in a 1:1 ratio and accordingly, the structure may possess trans chloride ligands, and the triphenylphosphine and thiophen-2-ylmethanamine ligands in the trigonal plane corresponds to the material formed in the reaction

Example 70

Thiophen-2-ylmethanamine with cobalt(II)chloride

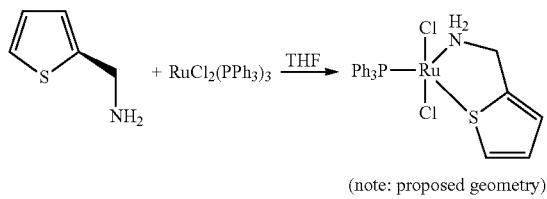

Acetonitrile (5 ml) was added to 98.6 mg (0.759 mmol) of cobalt(II) chloride and the mixture was warmed gently (ca. 40° C.) until the solid dissolved. Thiophen-2-ylmethanamine (160 μl, 1.560 mmol) of was added slowly (over ca. 3 minutes) resulting in the precipitation of a blue solid. The mixture was stirred for one hour and the solid was collected on a frit and dried in vacuo. Yield 200 mg. The material was tested for ammonia borane hydrolysis.

When two equivalents of thiophen-2-ylmethanamine were added to a solution of cobalt(II)chloride a blue precipitate rapidly formed. The material was readily isolated and the likely structure is indicated in the scheme above.

Metal Complexes with 'Pybox' Ligands

Example 71

1,3-bis((R)-4-isopropyl-4,5-dihydrooxazol-2-yl)benzene with cobalt(II)chloride

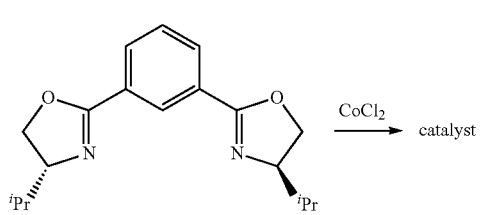

A sample of 1,3-bis((R)-4-isopropyl-4,5-dihydrooxazol-2-yl)benzene (30 mg, 0.100 mmol) and 20 mg (0.092 mmol)

of cobalt(II)chloride were refluxed in 10 ml of tetrahydrofuran overnight. The material was tested for ammonia borane hydrolysis.

Example 72

1,3-bis((R)-4-isopropyl-4,5-dihydrooxazol-2-yl)benzene with chlorobis-(cyclooctene)iridium(I)dimer

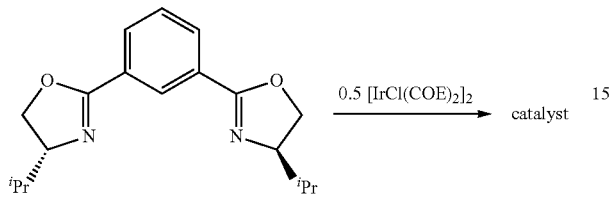

A 1 ml sample of perdeutero benzene ($C_6D_6$) was added to 10.0 mg (0.0333 mmol) of 1,3-bis((R)-4-isopropyl-4,5-dihydrooxazol-2-yl)benzene and 15.0 mg (0.0167 mmol) of chlorobis(cyclooctene)iridium(I)dimer. NMR spectra recorded after one hour showed that mostly starting material was present. After three days at room temperature the mixture consisted mostly of starting material. The material was tested for ammonia borane hydrolysis.

Preparation of Metal Complexes in Situ.

Example 73

Bis-(2-(di-iso-propylphosphino)ethyl)amine with iron dichloride

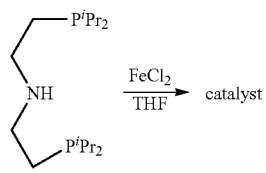

Iron dichloride [$FeCl_2$] (0.008 g, 0.0631 mmol) was added to a solution of bis-(2-(di-iso-propylphosphino)ethyl)amine (0.020 g, 0.0655 mmol) in tetrahydrofuran (30 ml). The reaction mixture was then stirred at room temperature for 30 minutes, then at 80° C. for 3 hours. Then KO$^t$Bu (ca. 10 mg, 0.0891 mmol) was added followed by ammonium borane (AB) (ca. 50 mg, 1.62 mmol) at room temperature. Moderate hydrogen evolution occurred which ceased rapidly.

Example 74

Trichlorooxobis(triphenylphosphine)rhenium(V) with bis(2-(diisopropylphosphino)ethyl)amine

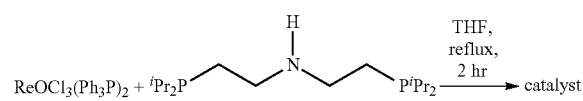

This compound was prepared in situ analogously to the R=tertiarybutyl analogue above in Example 32 (b). Yield: 0.08 g (57%). 10 ml of water and 10 ml of tetrahydrofuran was added to 10 mg of the material in a scintillation vials to form a brown solution. The material was tested for ammonia borane hydrolysis.

Example 75

Bis(2-(diisopropylphosphino)ethyl)amine with nickel(II)bromide

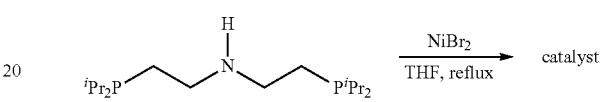

This compound was prepared in situ. To a solution of bis(2-(diisopropylphosphino)ethyl)amine (0.20 g, 0.65 mmol) in tetrahydrofuran (20 ml) was added nickel(II)bromide (0.14 g, 0.65 mmol). The reaction mixture was then refluxed for 5 hours, concentrated to about 5 ml, and then precipitated by adding hexanes to obtain a pale brown color solid. Yield: 0.28 g. 10 mg of the product was dissolved in 10 ml of tetrahydrofuran and 10 ml of water in a scintillation vial to form a pale brown solution. The material was tested for ammonia borane hydrolysis. No metal precipitate was observed.

Example 76

2,6-bis((diisopropylphosphino)methyl)pyridine with trichlorooxybis-(triphenylphosphine)rhenium(V)

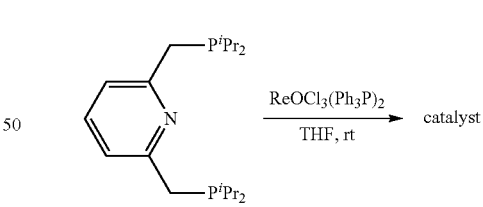

This compound was prepared in situ. Trichlorooxybis (triphenylphosphine)rhenium(V) ReOCl$_3$(Ph$_3$P)$_2$ (0.50 g, 0.60 mmol) was added to a solution of 2,6-bis((diisopropylphosphino)methyl)-pyridine (0.20 g, 0.58 mmol) in tetrahydrofuran (20 ml). The reaction mixture was then stirred at room temperature for 15 minutes. The greenish yellow trichlorooxybis(triphenylphosphine)rhenium(V) slowly dissolved to form a clear dark green solution. After one hour, precipitates start to form. The product was isolated and washed with diethyl ether to remove any triphenylphosphine. Yield: 0.35 g. 5 mg of the product was dissolved in 10 ml of tetrahydrofuran and 10 ml of water in a scintillation vial to form a yellow solution. Ammonia borane was added (50 mg, 1.620 mmol) and the hydrolysis rate was moderate.

Example 77

1,3-bis(di-iso-propylphosphinooxy)benzene with iron dichloride

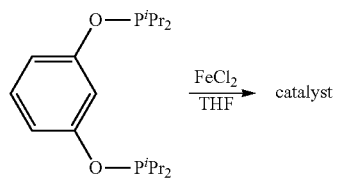

Iron dichloride [FeCl$_2$] (7 mg g, 0.0552 mmol) was added to a solution of 1,3-bis(di-iso-propylphosphinooxy)benzene (0.020 g, 0.0584 mmol) in tetrahydrofuran (30 ml). The reaction mixture was then stirred at room temperature for 30 minutes followed by 80° C. for 3 hours. The material was tested for ammonia borane hydrolysis.

Example 78

Trichlorooxybis(triphenylphosphine)rhenium(V) with 1,3-bis(ditertiarybutylphosphinooxy)benzene

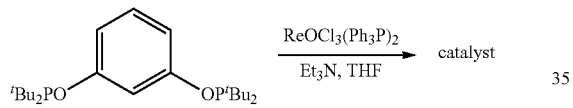

This compound was prepared in situ. Trichlorooxybis(triphenylphosphine)rhenium(V) ReOCl$_3$(Ph$_3$P)$_2$ (0.42 g, 0.50 mmol) was added to a solution of 1,3-bis(ditertiarybutylphosphinooxy)benzene (0.20 g, 0.50 mmol) in tetrahydrofuran (30 ml) with 1 equivalent of triethylamine (0.05 g, 0.50 mmol). The reaction mixture was then stirred at room temperature for 30 minutes followed by reflux overnight. The product was purified by precipitation into diethyl ether. Yield: 0.23 g. 5 mg of the product was dissolved in 10 ml of tetrahydrofuran and 10 ml of water in a scintillation vial to form a yellow solution. The material was tested for ammonia borane hydrolysis.

Example 79

1,3-bis(ditertiarybutylphosphinooxy)benzene with ruthenium(III)chloride hydrate

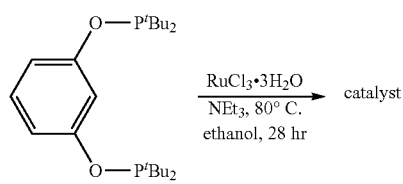

This compound was prepared in situ. A suspension containing ruthenium(III)chloride hydrate (0.13 g), 1,3-bis(ditertiarybutylphosphinooxy)benzene (0.20 g, 0.50 mmol) and triethylamine (0.106 g) in ethanol (20 ml) was stirred for 24 at 80° C. The solvent was removed in vacuo and the product was extracted into hexanes (50 ml×2). The solvent was then evaporated to obtain a red solid. Yield: 0.1 g. 10 mg of the product was dissolved in 10 ml of tetrahydrofuran and 10 ml of water in a scintillation vial to form a yellow solution. Ammonia borane was added (50 mg, 1.620 mmol) and the hydrolysis rate was moderate.

Example 80

Bis-(di-iso-propylphosphinooxy)benzene with cobalt dichloride

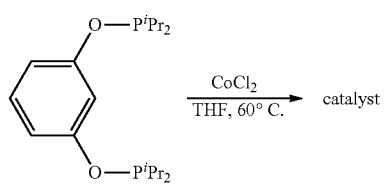

CoCl$_2$ (0.008 g, 0.0584 mmol) was added to a solution of bis-(di-iso-propylphosphinooxy)benzene (0.020 g, 0.0584 mmol) in tetrahydrofuran (30 ml). The reaction mixture was then stirred at room temperature for 30 minutes, then at 60° C. for 3 hours. The color of the reaction mixture remained blue. The material was tested for ammonia borane hydrolysis.

Example 81

N$^1$,N$^3$-bis(diisopropylphosphino)benzene-1,3-diamine with trichlorooxy-bis(triphenylphosphine)rhenium(V)

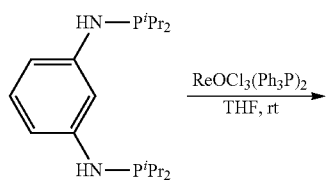

This compound was prepared in situ. To a solution of N$^1$,N$^3$-bis(diisopropylphosphino)benzene-1,3-diamine (0.20 g, 0.58 mmol) in tetrahydrofuran (30 ml) was added trichlorooxybis(triphenylphosphine)rhenium(V) ReOCl$_3$(Ph$_3$P)$_2$ (0.49 g, 0.58 mmol) and triethylamine (0.4 g, 4.0 mmol). The reaction mixture was then stirred at room temperature for 4 hours. The trichlorooxybis(triphenylphosphine)rhenium(V) slowly dissolved to form a pale blue color solution. The solvent was then evaporated, and the residue was precipitated by the addition of diethyl ether. The precipitate was filtered and then washed with hexanes to obtain a brown color solid. Yield: 0.19 g. 5 mg of the product was dissolved in 10 ml of tetrahydrofuran and 10 ml of water in a scintillation vial to form a yellow solution. The material was tested for ammonia borane hydrolysis.

Example 82

N$^1$,N$^3$-bis(di-iso-propylphosphino)benzene-1,3-diamine with cobalt dichloride

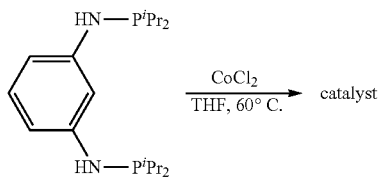

CoCl$_2$ (0.0076 g, 0.0587 mmol) was added to a solution of N$^1$,N$^3$-bis(di-iso-propylphosphino)benzene-1,3-diamine (0.020 g, 0.0587 mmol) in tetrahydrofuran (30 ml). The reaction mixture was then stirred at room temperature for 30 minutes, followed by 60° C. for 3 hours resulting in a change of color from blue to bluish green. The material was tested for ammonia borane hydrolysis.

Example 83

1,3-bis((diisopropylphosphino)methyl)benzene with ruthenium(III)chloride hydrate

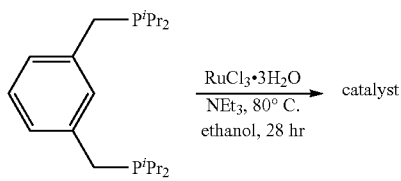

This compound was prepared in situ. A suspension containing ruthenium(III)chloride hydrate (RuCl$_3$.3H$_2$O) (0.15 g, 0.60 mmol), the 1,3-bis((diisopropylphosphino)methyl)benzene (0.20 g, 0.60 mmol) and triethylamine (0.12 g, 1.20 mmol) in ethanol (10 ml) was stirred for 24 hours at 80° C. After the reaction mixture was cooled down, the solids were filtered off, washed with ethanol (5 ml×3), and then dried in vacuo. The product was purified by extraction with hexanes (50 ml×2), followed by evaporation the solvent in vacuo to obtain a solid product. Yield: 0.21 g. NMR spectra showed a mixture had formed. 10 mg of the product was dissolved in 10 ml of tetrahydrofuran and 10 ml of water in a scintillation vial to form a brown solution. The material was tested for ammonia borane hydrolysis.

Example 84

Triphenylphospine with cobalt dichloride

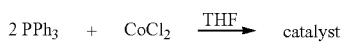

A mixture of 20 mg (0.154 mmol) of cobalt dichloride and 90 mg (0.343 mmol) of triphenylphosphine was warmed to 60° C. in 5 ml of tetrahydrofuran for 5 minutes and then 5 ml of water was added. AB (ca. 50 mg, 1.62 mmol) was added at room temperature resulting in hydrogen evolution.

Example 85

1,4-bis(diphenylphosphino)butane with cobalt dichloride

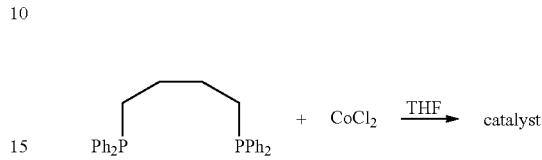

A mixture of 20 mg (0.154 mmol) of cobalt dichloride and 75 mg (0.176 mmol) of 1,4-bis(diphenylphosphino)butane was warmed to 60° C. in 5 ml of tetrahydrofuran for 5 minutes and then 5 ml of water was added. AB (ca. 50 mg, 1.62 mmol) was added at room temperature resulting in hydrogen evolution.

Example 86

N$^1$,N$^2$-bis-(2-(diphenylphosphino)benzyl)cyclohexane-1,2-diamine with cobalt dichloride

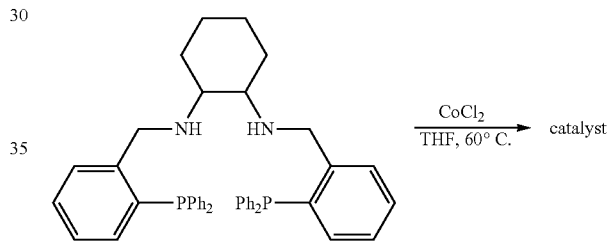

CoCl$_2$ (0.0015 g, 0.115 mmol) was added to a solution of N$^1$,N$^2$-bis-(2-(diphenylphosphino)benzyl)cyclohexane-1,2-diamine (0.076 g, 0.115 mmol) in tetrahydrofuran (3 ml). The reaction mixture was then heated at 80° C. until all CoCl$_2$ dissolved (<3 minutes), resulting in the formation of a blue solution. A 1 ml portion of the reaction mixture was taken and water was added, and the color of the reaction mixture turned red. Then ammonium borane (AB) (ca. 50 mg, 1.62 mmol) was added at room temperature, resulting in extensive hydrogen evolution.

Example 87

1,3-bis(di-iso-propylphosphino)methyl)benzene with [iridium bis(cyclooctene) chloride]dimer

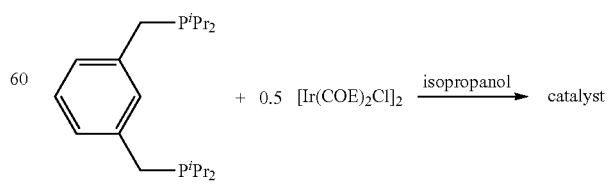

The title compound was prepared according to the literature procedure: (Moulton, C. J.; Shaw, B. L. *J. C. S. Chem.*

Comm. Dalton Trans. 1976, 1020-1024). 20 mg of the solid and 7 mg (0.062 mmol) were dissolved in tetrahydrofuran and then 50 mg (1.62 mmol) of ammonium borane (AB) was added, resulting in the evolution of a large amount of hydrogen.

Example 88

(a) Isolation of the free 2-(benzylthio)ethanamine ligand

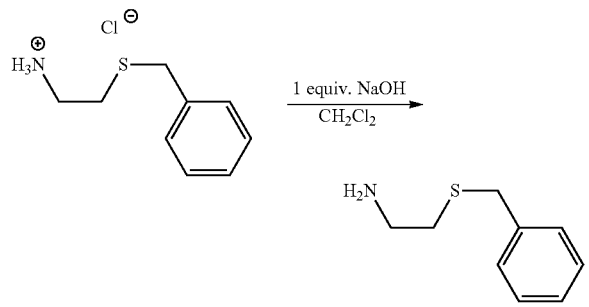

To a suspension of the benzylthio ethanamine hydrochloride (0.5 g, 2.4 mmol) in dichloromethane (5 ml) was added sodium hydroxide (0.1 g, in 5 ml of water). The suspension was stirred vigorously and the two layers were separated. The solvent was removed under vacuum at 0° C. The ligand was obtained as a yellow liquid.

(b) 2-(benzylthio)ethanamine with metal complexes

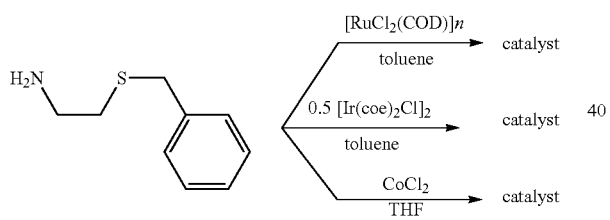

This compound was prepared in situ as described above. In a typical experiment, benzylthio ethanamine (0.2 g, 1.2 mmol) was dissolved in toluene (5 ml) and the solution was then added to a suspension of dichloro 1,5-cyclooctadiene ruthenium polymer $[RuCl_2(COD)]_n$ in toluene (5 ml). The mixture was then stirred under argon at 100° C. for 2 hours. The solvent volume was reduced in vacuo to approximately 3 ml and a solid was precipitated by adding ether (10 ml) to obtain a reddish brown product. The activities of these catalysts are low for the hydrolysis of ammonia borane. The reactions with cobalt(II)chloride ($CoCl_2$) and chlorobis(cyclooctene)iridium(I)dimer $[IrCl(COE)_2]_2$ were performed similarly. The three catalysts prepared in the section (section b) were all tested for ammonia borane hydrolysis.
Homogeneous Catalytic Ammonia Borane Hydrolysis Example 89

Figure 9:
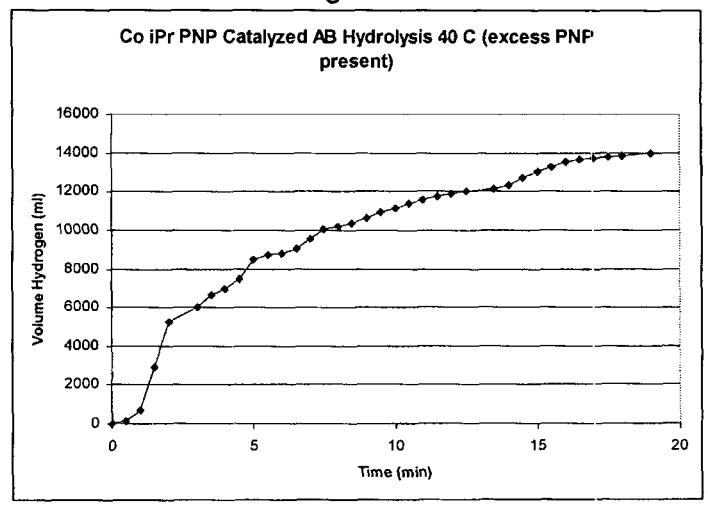
FIG. 9 is a graph showing the volume of hydrogen gas generated over time for the hydrolysis of AB using [Co{HN (CH$_2$CH$_2$P$^i$Pr$_2$)$_2$}Cl$_2$] as the catalyst.

$[Co\{HN(CH_2CH_2P^iPr_2)_2\}Cl_2]$ catalyzed AB hydrolysis 319 mg (0.732 mmol) of $[Co\{HN(CH_2CH_2P^iPr_2)_2\}Cl_2]$ was dissolved in 20 ml of tetrahydrofuran and then 20 ml of water and 107 mg (0.350 mmol) of $HN(CH_2CH_2P^iPr_2)_2$ were added. The flask was immersed in a water bath that was held at 40° C. and the temperature was allowed to equilibrate for 5 minutes. AB was added in portions (2.432 g, followed by five ca. 1.0 g portions) and the hydrogen evolved was measured in an inverted 8000 ml graduated cylinder. The first two AB additions were performed under an argon atmosphere and the subsequent runs were in air. 5 ml of tetrahydrofuran and 5 ml of water were added to the mixture prior to the third run. The results are shown in FIG. 9.

Example 90

Figure 10:
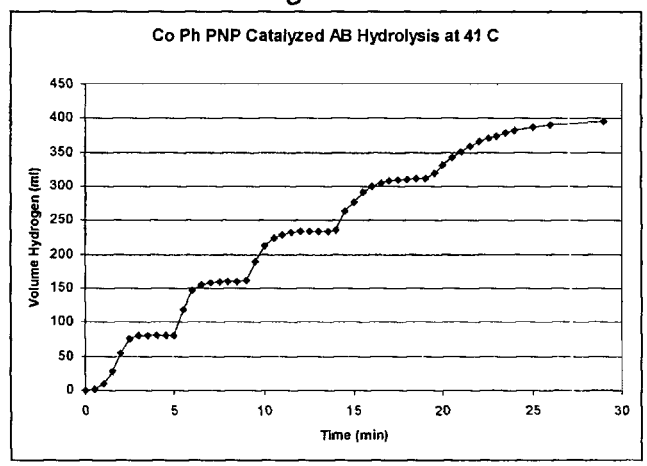
FIG. 10 is a graph showing the volume of hydrogen gas generated over time for the hydrolysis of AB using [Co{HN (CH$_2$CH$_2$PPh$_2$)$_2$}Cl$_2$] as the catalyst.

$[Co\{HN(CH_2CH_2PPh_2)_2\}Cl_2]$ catalyzed AB hydrolysis 24 mg (0.042 mmol) of $[Co\{HN(CH_2CH_2PPh_2)_2\}Cl_2]$ was dissolved in 10 ml of tetrahydrofuran and 10 ml of water at 41° C. in an argon atmosphere to form a yellow solution. AB was added in ca. 50 mg (1.620 mmol) portions (with the initial addition resulting in the formation of a red colored solution) and the hydrogen evolution was measured with a 100 ml burette. The results are shown in FIG. 10.

Example 91

Figure 11:
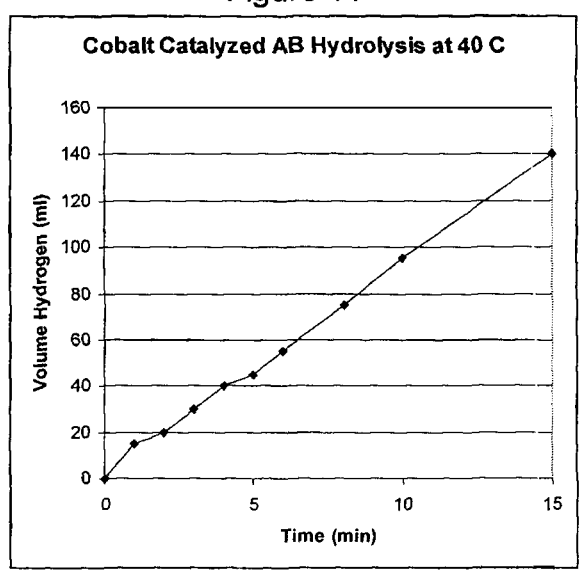
FIG. 11 is a graph showing the volume of hydrogen gas generated over time for the hydrolysis of AB using $N^1$,$N^2$-bis (2-(di-p-tolylphosphino)benzyl)cyclohexane-1,2-diamine cobalt dichloride as the catalyst.

$N^1,N^2$-bis(2-(di-p-tolylphosphino)benzyl)cyclohexane-1,2-diamine cobalt dichloride A sample of 55 mg of $N^1,N^2$-bis(2-(di-p-tolylphosphino)benzyl)cyclohexane-1,2-diamine cobalt dichloride (0.0648 mmol) was dissolved in 10 ml of tetrahydrofuran and 10 ml of water under an argon atmosphere and the mixture was warmed to 40° C. AB (945 mg, 30.61 mmol) was added and the hydrogen that formed was measured with a 2 L graduated cylinder. The results are shown in FIG. 11.

Example 92

$[Ru(binap)(H_2NCH_2CH_2PPh_2)Cl_2]$

Figure 12:
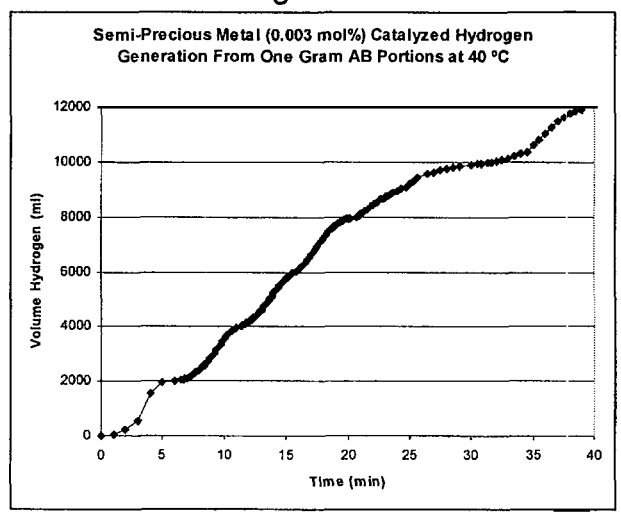
FIG. 12 is a graph showing the volume of hydrogen gas generated over time for the hydrolysis of AB using [Ru(binap)(H$_2$NCH$_2$CH$_2$PPh$_2$)Cl$_2$] as the catalyst.

A sample of 6 mg (0.00586 mmol) of $[Ru(binap)-(H_2NCH_2CH_2PPh_2)Cl_2]$ was dissolved in 20 ml of a 1:1 mixture of tetrahydrofuran and water. The flask was sealed and connected to an inverted 2000 ml graduated cylinder, and then placed in a water bath at ca. 40° C. and the temperature was allowed to stabilize for 5 minutes. Ammonia borane was added to the mixture in ca. 1.0 g (0.0324 mol) portions. The first five runs were performed under an argon atmosphere and the last run was performed in air. The results are shown in FIG. 12.

Example 93

Figure 13:
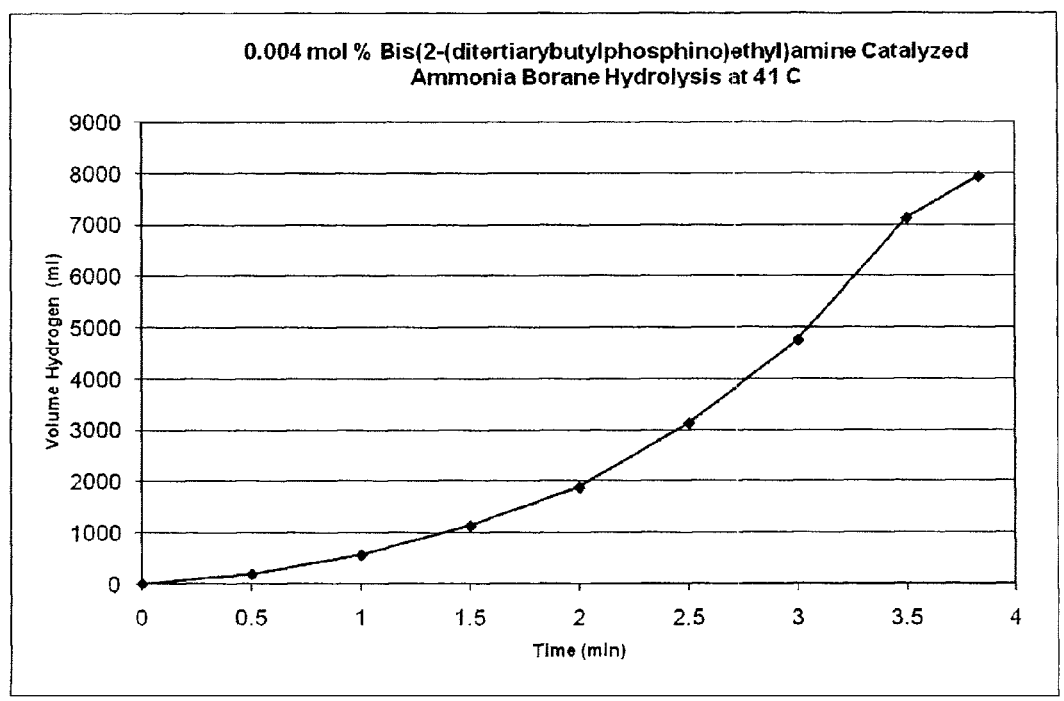
FIG. 13 is a graph showing the volume of hydrogen gas generated over time for the hydrolysis of AB using [Ir{HN (CH$_2$CH$_2$P$^t$Bu$_2$)$_2$}(C$_8$H$_{13}$)(H)(Cl)] as the catalyst.

$[Ir\{HN(CH_2CH_2P^tBu_2)_2\}_2(C_8H_{13})(H)(Cl)]$ 0.5 ml of a 10 mg/ml tetrahydrofuran solution (5 mg, 0.00715 mmol) of $[Ir\{HN(CH_2CH_2P^tBu_2)_2\}_2(C_8H_{13})(H)(Cl)]$ was added in air to 20 ml of tetrahydrofuran and then 20 ml of water was added. The flask was connected to an inverted graduated cylinder (ca. 8000 ml) and was then immersed in a water bath at 41° C. Ammonia borane (6.00 g, 0.194 mol) was added rapidly through a solid addition funnel and the flask was sealed and then opened to the hydrogen measurement apparatus. The results are shown in FIG. 13.

Example 94

Chlorocyclooctenylhydridobis(2-(ditertiarybutylphosphino)ethyl)amine-iridium(III) catalyzed ammonia borane hydrolysis

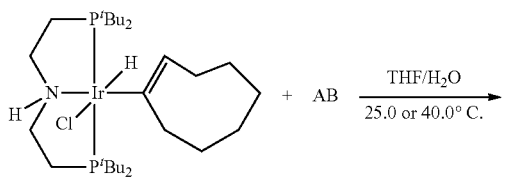

(Note: the following two experiments are the 25° C. and 40° C. standards to which 'std. 1-3' in the following Figures refer)

Standard ammonia borane hydrolysis conditions utilizing bis(2-(ditertiarybutylphosphino)ethyl)aminechlorocyclooctenylhydridoiridium(III) [Ir(H)(Cl)(C$_8$H$_{13}$){NH(CH$_2$CH$_2$P$^t$Bu$_2$)$_2$}] at 25° C. or 40° C.:

a) (25° C.): 1.0 ml (10.0 mg, 0.0143 mmol) of a 10.0 mg/ml tetrahydrofuran solution of bis(2-(ditertiarybutylphosphino)ethyl)aminechlorocyclooctenyl-hydridoiridium (III) [Ir(H)(Cl)(C$_8$H$_{13}$){NH(CH$_2$CH$_2$P$^t$Bu$_2$)$_2$}] was added in air to 80 ml of a 1:1 mixture of tetrahydrofuran/water that had been immersed for five minutes in a water bath held at 25.0° C. Ammonia borane was added in three ca. 0.5 g portions (run 1: 0.5000 g; run 2: 0.4992 g; run 3: 0.4997 g) and the hydrogen formation was measured after each addition. The results are shown in Table 1.

b) (40° C.): 1.0 ml (1.0 mg, 1.43×10$^{-3}$ mmol) of a 10.0 mg/ml tetrahydrofuran solution of bis(2-(ditertiarybutylphosphino)ethyl)aminechlorocyclooctenyl-hydridoiridium (III) [Ir(H)(Cl)(C$_8$H$_{13}$){NH(CH$_2$CH$_2$P$^t$Bu$_2$)$_2$}] was added in air to 80 ml of a 1:1 mixture of tetrahydrofuran/water that had been immersed for five minutes in a water bath held at 40.0° C. Ammonia borane was added in three ca. 0.5 g portions (run 1: 0.5000 g; run 2: 0.5004 g; run 3: 0.5002 g) and the hydrogen formation was measured after each addition. The results are shown in Table 2.

The present disclosure demonstrates that iridium complexes with the (R$_2$PCH$_2$CH$_2$)$_2$NH ligand system (R=tertiarybutyl, isopropyl and related groups) exhibited good to remarkably high activities. In particular, it was found that the complex bis(2-(ditertiarybutyl)ethyl)aminechlorocyclooctenyl-hydridoiridium(III) is capable of producing a 78% yield of hydrogen in 7-8 minutes at 25° C. with a catalyst loading of 0.03 mol % (for ca. 1.5 g of ammonia borane). Since a PEM fuel cell is expected to operate at 60° C. or higher the catalyst efficiency at a higher temperature was determined. At 40° C., it was found that the catalyst bis(2-(ditertiarybutylphosphine)-ethyl)aminechlorocyclooctenyl-hydridoiridium(III) can effect hydrogen formation in yields approaching 78% in 10-11 minutes with a remarkably low catalyst loading of 3×10$^{-3}$ mol %. The runs described above at 25 and 40° C. are now the standard runs to which all other catalysts are compared. Higher hydrogen yields can be obtained with higher purity ammonia borane. A high purity ammonia borane sample, prepared in house gave hydrogen yields ranging from 91 to 93% within 10 minutes at 40° C.

When the catalyst is added to the water/tetrahydrofuran or to neat methanol or ethanol, a red solution is immediately formed. The red species forms reversibly and upon removing the solvent the starting material bis(2-(ditertiarybutylphosphine)ethyl)aminechlorocyclooctenylhydridoiridium(III) was recovered. Indeed, X-ray quality crystals of the starting material bis(2-(ditertiarybutylphosphine)ethyl)aminechlorocyclooctenylhydridoiridium(III) were obtained from a deep red ethanol solution of the compound at −45° C. $^{31}$P NMR spectroscopy of the mixture in methanol-D$_4$ shows that a new phosphorus containing species is present that exhibits two $^{31}$P resonances at δ 45.9 and 41.2 which display a large P—P coupling of 325 Hz. The $^1$H NMR spectrum shows the presence of the bis(2-(ditertiarybutyl)ethyl)amine and cyclooctenyl ligands. Hydride and the N—H resonances were observed although this may be due to rapid hydrogen/deuterium exchange with the solvent methanol.

Figure 14:
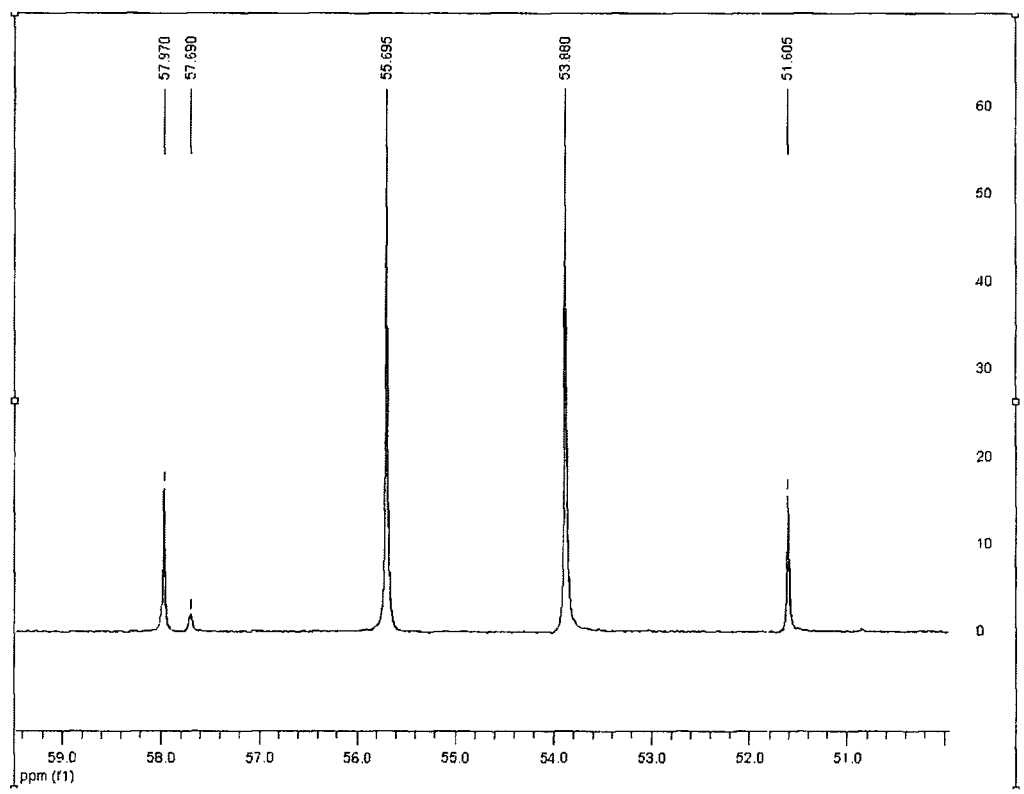
FIG. 14 is a $^{31}$P NMR spectrum of bis(2-(ditertiarybutylphosphine)-ethyl)amine(cyclooctene)iridium(I) in benzene-D$_6$.

A product with a similar $^{31}$P NMR spectrum (as seen in FIG. 14) has been obtained via the reaction of bis(2-(ditertiarybutyl)ethylphosphine)aminechlorocyclooctenylhydridoiridium(III) with potassium tertiary butoxide. The $^{31}$P NMR spectrum of the product shows two doublets at δ 56.8 and 52.7 (J$_{PP}$=368 Hz) and the $^1$H NMR spectrum shows the presence of cyclooctene and bis(2-(ditertiarybutylphosphine)ethyl)amine ligands.

A single crystal was obtained and a preliminary X-ray structure indicated that hydrochloric acid elimination from the molecule had been effected and the complex bis(2-(ditertiarybutylphosphine)-ethyl)amine(cyclooctene)iridium(I) had formed. Without being bound by theory, it is possible that the reaction proceeds via formation of intermediate bis(2-(ditertiarybutylphosphine)ethyl)aminecyclooctenylhydridoiridium(III) species (B in the scheme below) which then reductively eliminates cyclooctene to form the product. The asymmetry indicated by the $^{31}$P NMR spectrum is presumably a result of restricted rotation of the η$^2$-cyclooctene ligand caused by the bulky phosphorus-bound tertiary butyl groups.

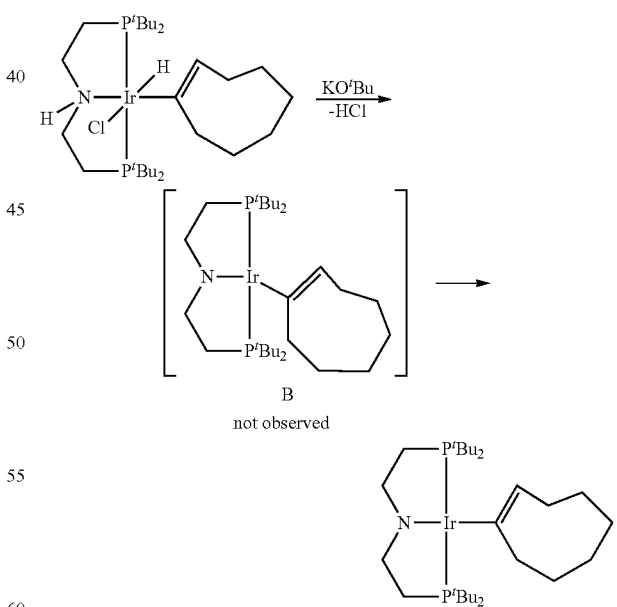

Synthesis of bis(2-(ditertiarybutyl)ethyl)amine(cyclooctene)iridium

It was observed that a solution of bis(2-(ditertiarybutylphosphine)-ethyl)amine chlorocyclooctenylhydridoiridium(III) in either tetrahydrofuran-$D_8$ or benzene-$D_6$ spontaneously loses hydrochloric acid to form the $\eta^2$-cyclooctene complex upon standing overnight under an argon atmosphere (as seen in the scheme below). This indicates that the formation of this complex is thermodynamically favorable. That bis(2-(ditertiarybutylphosphine)-ethyl)aminechlorocyclooctenylhydridoiridium(III) can be isolated from these solvents indicates that the reactions occurring are completely reversible. Accordingly, it is proposed that the red complex formed in alcohol or tetrahydrofuran/water solvents is the $\eta^2$-cyclooctene complex and that it forms immediately in these solvents due to the highly favorable solvation of the liberated hydrochloric acid by the polar solvent environment (as seen in the scheme below).

Example 96

Solvent effects upon bis(2-(ditertiarybutylphosphino) ethyl)aminechloro-cyclo-octenylhydridoiridium(III) [Ir(H)(Cl)($C_8H_{13}$){NH($CH_2CH_2P^tBu_2$)$_2$}] catalyzed ammonia borane hydrolysis The reaction was carried out as described in procedure 1a (25° C.) or 1b (40° C.) above except that the solvent mixture utilized was a) 1:1 diglyme/water at 25.0° C. or b) 1:1 triglyme/water at 25° C. or c) 1:1 ethanol/water at 40.0° C. The results are shown in Tables 4 and 5.

The catalytic reaction described above was performed in a 1:1 mixture of tetrahydrofuran and water. The anticipated

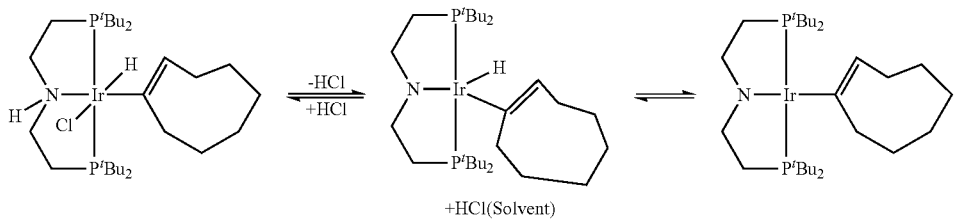

It is believed that the differences in $^{31}$P NMR shifts in the benzene or tetrahydrofuran and tetrahydrofuran/water are due to solvent effects. We also note that the $^{31}$P NMR spectra obtained in methanol-$D_4$ and tetrahydrofuran/water are very similar. Significantly, the N—$CH_3$ analogue 2-(ditertiarybutylphosphino)-N-(2-(ditertiarybutylphosphino)ethyl)-N-methylethanaminechlorocyclooctenylhydridoiridium(III) (vide infra), which cannot lose hydrochloric acid in an analogous fashion, shows a singlet only in the $^{31}$P NMR spectrum upon dissolution in methanol-$D_4$.

Figure 15:
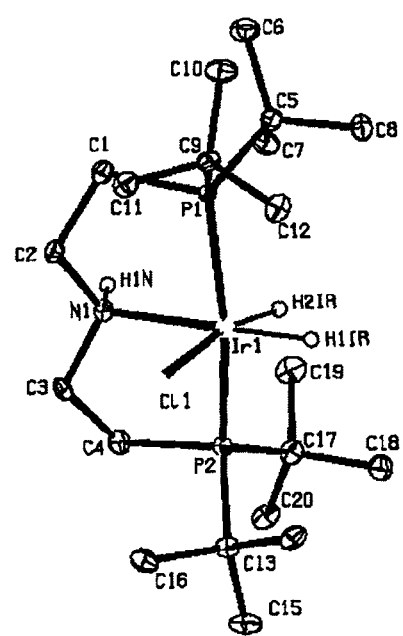
FIG. 15 is an ORTEP diagram of bis(2-(ditertiarybutyl) ethyl)aminechloro-dihydridoiridium(III).

A single complex from the tetrahydrofuran/water mixture was isolated after a large excess of ammonia borane was hydrolyzed. The material displays a $^{31}P\{^1H\}$ NMR resonance at δ 64.0 (in dichloromethane-$D_2$) and the $^1$H NMR spectrum of the complex shows resonances due to the bis(2-(ditertiarybutyl)ethyl)amine ligand in addition to a hydrido signal at δ−23.99. We obtained an X-ray structure of the complex which indicated that the complex bis(2-(ditertiarybutyl)ethyl)aminechlorodihydridoiridium(III) had formed. The structure (as seen in FIG. 15) features a pseudooctahedral ligand arrangement with a meridionally coordinated bis(2-(ditertiarybutyl)ethyl)amine ligand. The hydride ligands are bound to the metal center in a cis orientation.

environmental concerns regarding the utilization of a solvent such as tetrahydrofuran led to the examination of a variety of other solvents. Diethylene glycol dimethyl ether and triethylene glycol dimethyl ether (diglyme and triglyme, respectively) were chosen as suitable ether substitutes owing to their low volatility. It was found that the reaction proceeds with an almost identical rate in a 1:1 mixture of diglyme and water and with a significantly lower rate in triglyme/water. The potential of ethanol as a solvent, which is expected to have a significantly lower environmental impact than tetrahydrofuran or diglyme, was also examined. Significantly, at 40° C. it was found that substituting tetrahydrofuran/water (1:1) with ethanol/water (25:75) results in no change in the rate of the reaction. If the solvent composition was changed to a 75:25 ethanol:water ratio, a remarkable effect on reactivity was observed: the hydrogen yield was increased to 98% after 10 minutes (as compared to 72% after 10 minutes in our standard run). In absolute ethanol, the rate of hydrogen evolution was increased further and the reaction was completed (99% yield of hydrogen) in ca. four minutes. In the latter case the reaction is likely proceeding by alcoholysis, rather than a hydrolysis reaction.

Example 95

Effect of ammonia borane purity upon utilizing bis (2-(ditertiarybutylphosphino)ethyl)aminechlorocyclooctenylhydridoiridium(III) [Ir(H)(Cl)($C_8H_{13}$){NH($CH_2CH_2P^tBu_2$)$_2$}] catalyzed ammonia borane hydrolysis The reaction was carried out as described in procedure 1b above. The results are shown in Table 3.

Example 97

Effect of ethanol concentration on rate of bis(2-(ditertiarybutylphosphino)-ethyl)aminechlorocyclooctenylhydridoiridium(III) [Ir(H)(Cl)($\eta^1$-$C_8H_{13}$){NH ($CH_2$—$CH_2P^tBu_2$)$_2$}] catalyzed ammonia borane hydrolysis at 40° C.

The reaction was described as in (i) above except the solvent composition was either (a) ethanol:water 25:75; (b) ethanol:water 19:81; (c) ethanol:water 12.5:87.5 or (d) ethanol: water 75:25. The results are shown in Table 6.

Example 98

Effect of added inorganic salts (i.e. sodium chloride, lithium chloride or tetraethyl ammonium chloride) in bis(2-(ditertiarybutylphosphino)ethyl)-amine-chloro-cyclooctenylhydridoiridium(III) [Ir(H)(Cl)($\eta^1$-$C_8H_{13}$){NH($CH_2CH_2P^tBu_2$)$_2$}$_2$] catalyzed ammonia borane hydrolysis The reaction was carried out as described in (i) above except water was replaced with either (a) 40 ml of saturated aqueous sodium chloride, (b) lithium chloride (548 mg) dissolved in 40 ml of water, or (c) two equivalents (4.6 mg) of tetraethylammonium chloride dissolved in 40 ml of water. The results are shown in Table 7.

The effect of a limited number of additives on the bis(2-(ditertiarybutylphosphino)ethyl)aminechlorocyclooctenyl-hydrido-iridium(III) catalyzed reaction was also examined. When the reaction was performed in a 1:1 mixture of saturated aqueous sodium chloride and tetrahydrofuran the activity was substantially lower. This likely due to the lower water concentration in the organic phase due to the separation of two liquid phases under these conditions. In a 1:1 water/tetrahydrofuran that contained either 0.162 M lithium chloride or two equivalents (based on iridium) of tetraethylammonium chloride little effect on the reaction rate was observed.

Example 99

Effect of hydrogen (structure I) vs. methyl (structure II) substituents on nitrogen in bis(2-(ditertiarybutylphosphino)ethyl)amine type iridium complexes in catalytic ammonia borane hydrolysis

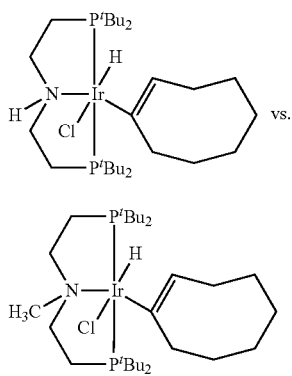

Used standard conditions as described in procedure 94b above: 1 ml of a 1.03 mg/ml solution of 2-(ditertiarybutylphosphino)-N-(2-(ditertiarybutylphosphino)ethyl)-N-methylethanaminechlorocyclooctenyl-hydridoiridium(III) was added 80 ml of a 1:1 mixture of tetrahydrofuran/water that had been preheated to 40° C. for five minutes. Ammonia borane was added in ca. 0.5 g portions (run 1: 500.3 mg; 2: 499.5 mg; 3: 500.0 mg) and the hydrogen evolution was measured. The results are shown in Table 8.

Ligand substituent effects on the catalytic reaction were examined. For example, substituting the NH in bis(2-(ditertiarybutyl)ethylphosphine)aminechlorocyclooctenyl hydridoiridium(III) for a N(CH$_3$) group in 2-(ditertiarybutyl)-N-(2-(di-tertiarybutylphosphino)ethyl)-N-methylethanaminechlorocyclooctenylhydridoiridium(III) (as seen in structure II in the scheme above) results in a slight drop in activity in catalytic ammonia borane hydrolysis. This indicates that the NH moiety is not essential for excellent catalytic activities and will allow for the study of a range of ligands where the N—H moiety is substituted for N—R groups (R=alkyl, aryl, etc.).

Example 100

Bis(2-(diadamantylphosphino)ethyl)aminechlorodihydridoiridium(III) catalyzed ammonia borane hydrolysis at 25° C. or 40° C.

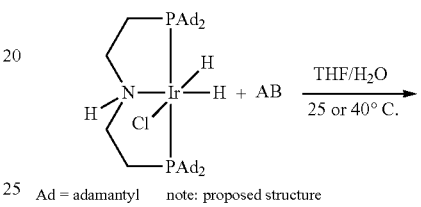

Ad = adamantyl    note: proposed structure a) 25.0° C.: A 14.8 mg (0.0158 mmol) sample of bis(2-(diadamantylphosphino)ethyl)aminechlorodihydridoiridium (III) was added to 80 ml of a 1:1 mixture of tetrahydrofuran and water that had been equilibrated in a 25.0° C. water bath for five minutes. Ammonia borane was added in three ca. 0.500 g portions (run 1: 0.5005 g; run 2: 0.4982 g; run 3: 0.5026 g) and the hydrogen evolved was measured. The results are shown in Table 9.

b) 40.0° C.: A methanol solution of bis(2-(diadamantylphosphino)ethyl)aminechlorodihydridoiridium(III) (1.0 ml, 1.5 mg/ml, 1.60×10$^{-3}$ mmol) was added to 80 ml of a 1:1 mixture of tetrahydrofuran and water that had been equilibrated in a 40.0° C. water bath for five minutes. Ammonia borane was added in three ca. 0.500 g portions (run 1: 0.4995 g; run 2: 0.5001 g; run 3: 0.5002 g) and the hydrogen evolved was measured. The results are shown in Table 10.

When the substituents on phosphorus are changed from tertiarybutyl to adamantyl, then the catalytic reaction proceeds at a very similar rate at 25° C. to the standard test run. At 40° C., the adamantyl substituted catalyst showed a slightly lower activity than the standard test run.

Example 101

Bis(2-(dicyclohexylphosphino)ethyl)aminechlorodihydridoiridium(III) catalyzed ammonia borane hydrolysis at 25° C. or 40° C.

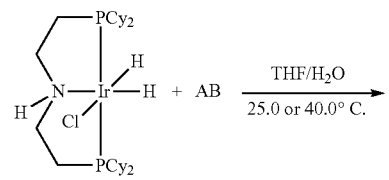

a) 25.0° C.: A 10.2 mg sample of bis(2-(dicyclohexylphosphino)ethyl)aminechlorodihydridoiridium(III) was added to 80 ml of a 1:1 mixture of tetrahydrofuran and water that had been equilibrated in a 25.0° C. water bath for five minutes. Ammonia borane (500.0 mg) was added in portions and the hydrogen evolved was measured.

b) 40.0° C.: A methanol solution of bis(2-(dicyclohexylphosphino)ethyl)aminechlorodihydridoiridium(III) (1.0 ml, 1.5 mg/ml, 1.60×10$^{-3}$ mmol) was added to 80 ml of a 1:1 mixture of tetrahydrofuran and water that had been equilibrated in a 40.0° C. water bath for five minutes. Ammonia borane (500.0 mg) was added and the hydrogen evolved was measured. The results are shown in Tables 11 and 12.

For the cyclohexyl substituted catalyst, a significant drop in catalytic activity was observed at both 25° C. and 40° C.

Example 102

2,6-Bis((diisopropylphosphino)methyl)pyridinedichlorohydrido-iridium(III) catalyzed ammonia borane hydrolysis

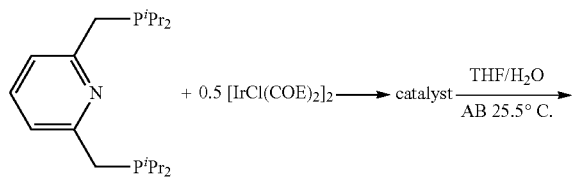

This reaction was performed under an argon atmosphere. 1.0 ml of a ca. 0.8 mg/ml tetrahydrofuran solution of 2,6-bis((diisopropylphosphino)methyl)pyridinedichlorohydridoiridium(III) was added to 80 ml of a 1:1 mixture of tetrahydrofuran and water that had been immersed in a 25.5° C. water bath for 5 minutes. 0.5027 g of ammonia borane was added the hydrogen evolution was measured. The results are shown in Table 13.

Example 103

Catalytic ammonia borane hydrolysis by catalyst derived from bis(2-(diisopropylphosphino)-4-methylphenyl)amine and chlorobis(cyclooctene)iridium(I) dimer

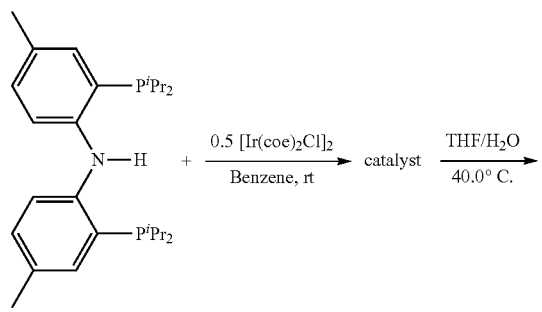

The reaction was performed as described in procedure Example 94b above except 0.95 mg in 1 ml of tetrahydrofuran of the iridium containing catalyst was used and the reaction was performed under an argon atmosphere. 0.5004 g of ammonia borane was added and the evolved hydrogen was measured. The results are shown in Table 14.

Other PNP ligand containing iridium complexes that we have tested include 2,6-bis((diisopropylphosphino)methyl)pyridinedichlorohydrido-iridium(III) and the bis(2-(diisopropylphosphino)-4-methylphenyl)amine derived iridium catalyst. The ammonia borane hydrolysis rate for these catalysts were of a similar magnitude to the bis(2-(dicyclohexylphosphino)-ethyl)amine derived iridium catalyst.

Example 104

Bis(2-(ditertiarybutylphosphino)ethyl)amine-2,4-pentanedionate-rhodium(I) catalyzed ammonia borane hydrolysis at 40° C.

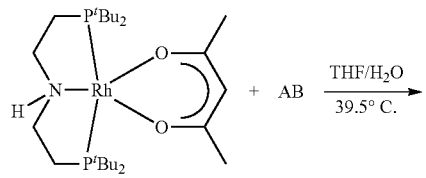

One ml of a 8.3 mg/ml tetrahydrofuran solution of bis(2-(ditertiarybutylphosphino)ethyl)amine-2,4-pentanedionaterhodium(I) was added to 80 ml of a 1:1 mixture of tetrahydrofuran/water mixture that had been equilibrated in a 39.5° C. water bath for five minutes. 0.4994 g of ammonia borane was added and the hydrogen evolution was measured. The results are shown in Table 15.

A PNP ligand containing rhodium complex has also been tested. This catalyst also had an ammonia borane hydrolysis rate that was comparable to that of the bis(2-(dicyclohexylphosphino)ethyl)amine iridium catalyst.

Example 105

Bis(2-(dialkylphosphino)ethyl)amine (alkyl=isopropyl, cyclohexyl) and bis(diphenylphosphino)ethyl)aminedichlorocobalt(II) catalyzed ammonia borane hydrolysis

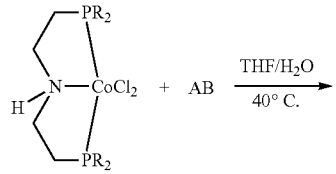

R = $^i$Pr, Ph, Cy a) Bis(2-(diisopropylphosphino)ethyl)aminedichlorocobalt(II) [Co{HN(CH$_2$CH$_2$P$^i$Pr$_2$)$_2$}Cl$_2$] catalyzed ammonia borane hydrolysis: A 319 mg (0.732 mmol) sample of Bis(2-(diisopropylphosphino)ethyl)aminedichlorocobalt(II) [Co{HN(CH$_2$—CH$_2$P$^i$Pr$_2$)$_2$}Cl$_2$] was dissolved in 20 ml of tetrahydrofuran and then 20 ml of water and 107 mg (0.350 mmol) of bis(2-(diisopropylphosphino)ethyl)amine HN(CH$_2$CH$_2$P$^i$Pr$_2$)$_2$ were added. The flask was immersed in a water bath that was held at 40° C. and the temperature was allowed to equilibrate for 5 minutes. Ammonia borane was added in portions (2.432 g, followed by five ca. 1.0 g portions) and the hydrogen evolved was measured in an inverted 8000 ml graduated cylinder. The first two ammonia borane additions were performed under an argon atmosphere and the subsequent runs were in air. 5 ml of tetrahydrofuran and 5 ml of water were added to the mixture prior to the third run. The results are shown in Table 16.

b) Bis(2-(diphenylphosphino)ethyl)aminedichlorocobalt (II) [Co{HN(CH$_2$—CH$_2$PPh$_2$)$_2$}Cl$_2$] catalyzed ammonia borane hydrolysis: 24 mg (0.042 mmol) of bis(2-(diphenylphosphino)ethyl)aminedichlorocobalt(II) [Co{HN(CH$_2$CH$_2$PPh$_2$)$_2$}Cl$_2$] was dissolved in 10 ml of tetrahydrofuran and 10 ml of water at 41° C. in an argon atmosphere to form a yellow solution. Ammonia borane was added in 50 mg (1.62 mmol) portions (with the initial addition resulting in the formation of a red colored solution) and the hydrogen evolution was measured with a 100 ml burette. The results are shown in Table 17.

c) Bis(2-(dicyclohexylphosphino)ethyl)aminedichlorocobalt(II) [CoCl$_2${NH(CH$_2$CH$_2$PCy$_2$)$_2$}] catalyzed ammonia borane hydrolysis utilizing standard 40° C. conditions: A 1.0 ml sample of a 0.98 mg/ml (0.98 mg, 0.002 mmol) dichloromethane solution was added to a 500 ml three-necked flask under an argon atmosphere and the solvent was removed with an argon flush. 80 ml of a 1:1 tetrahydrofuran/water mixture was added and then the flask was connected to the hydrogen measurement apparatus and equilibrated in a 40.0° C. water bath for five minutes. 0.5003 g (16.2 mmol) of ammonia borane was added and then the hydrogen evolved was measured. The results are shown in Table 18.

For base metal complexes containing N(H)(CH$_2$CH$_2$PR$_2$)$_2$ ligands (R=tertiarybutyl, isopropyl, phenyl, cyclohexyl), the cobalt containing catalysts proved to be the most active. The tertiarybutyl substituted complex proved to have low activity. In contrast, the isopropyl, phenyl and cyclohexyl substituted complexes were more active than the tertiarybutyl analogue and these latter examples had similar activities to one another. Table 16 shows that for bis(2-(diisopropylphosphino)ethyl)aminedichlorocobalt(II), ammonia borane could be added in multi-gram quantities and the catalyst still retained activity. Table 17 shows that the complex bis(2-(diphenylphosphino)ethyl)-aminedichlorocobalt(II) is capable of hydrolyzing ammonia borane when added in multiple portions, and Table 18 shows the activity of the complex bis(2-(dicyclohexylphosphino)ethyl)aminedichloro-cobalt(II).

Example 106

Bis(2-(diisopropylphosphino)ethyl)aminedichlorocobalt(II) [CoCl$_2${NH(CH$_2$—CH$_2$P$^i$Pr$_2$)$_2$}] vs. bis(2-(diisopropylphosphino)ethyl)aminedibromonickel(II) [NiBr$_2${NH(CH$_2$CH$_2$P$^i$Pr$_2$)$_2$}] catalyzed ammonia borane hydrolysis with standardized conditions (25.0° C.)

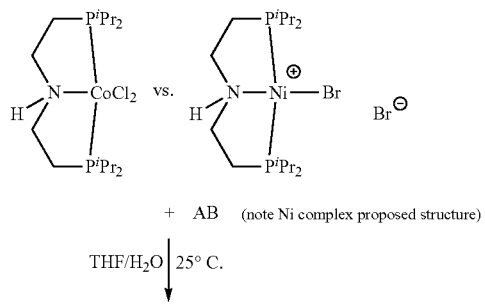

a) Bis(2-(diisopropylphosphino)ethyl)aminedichlorocobalt(II): 6.8 mg (0.0156 mmol) of bis(2-(diisopropylphosphino)ethyl)aminedichlorocobalt(II) in ca. 3 ml of tetrahydrofuran was added to 80 ml of a 1:1 mixture of tetrahydrofuran and water (equilibrated in a 25.0° C. water bath for five minutes). 500.2 mg of ammonia borane was added and the hydrogen evolution was measured.

b) Bis(2-(diisopropylphosphino)ethyl)aminedibromonickel(II): 8.0 mg of bis(2-(diisopropylphosphino)ethyl)aminedibromonickel(II) was dissolved in 40 ml of water and 40 ml of tetrahydrofuran and placed in a 500 ml three-necked flask. The vessel was placed in a 25.0° C. water bath and allowed to equilibrate for five minutes. 498.4 mg of ammonia borane was added and the hydrogen evolution was measured. The results are shown in Table 19.

The complex bis(2-(di-iso-propylphosphino)ethyl) aminedibromo-nickel(II) was slightly less active than bis(2-(diisopropylphosphino)ethyl)aminedichlorocobalt(II).

Example 107

Bis(2-(diisopropylphosphino)ethyl) aminedichlororuthenium(II)dimer catalyzed ammonia borane hydrolysis at 40° C.

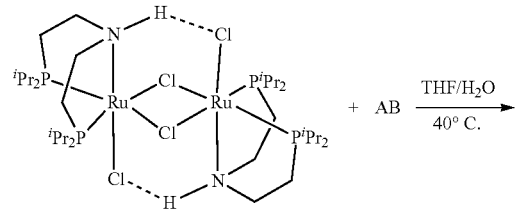

A 1 ml sample of a 6.8 mg/ml solution of bis(2-(diisopropylphosphino)-ethyl)aminedichlororuthenium(II)dimer was added to 80 ml of a 1:1 mixture of tetrahydrofuran/water. The flask was sealed and connected to an inverted 2000 ml graduated cylinder, and then placed in a water bath at ca. 40° C. and the temperature was allowed to stabilize for 5 minutes. Ammonia borane (0.5013 g, 16.2 mmol) was added to the mixture and the hydrogen volume was recorded at one minute intervals. The results are shown in Table 20.

The complex bis(2-(diisopropylphosphino)ethyl) aminedichloro-ruthenium(II)dimer was tested under the standardized conditions. The activity of the catalyst is quite high but is lower than the iridium standard bis(2-(di-tertiarybutylphosphino)ethyl)aminechlorocyclooctenyl-hydridoiridium(III).

Example 108

2,2'-Bis(diphenylphosphino)-1,1'-binaphthyl 2-(diphenylphosphino)-ethanaminedichlororuthenium(II) [Ru(binap)(H$_2$NCH$_2$CH$_2$PPh$_2$)Cl$_2$] catalyzed ammonia borane hydrolysis

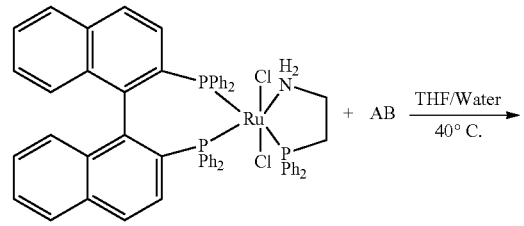

A sample of 6 mg (0.0059 mmol) of 2,2'-bis(diphenylphosphino)-1,1'-binaphthyl 2-(diphenylphosphino)ethanaminedichlororuthenium(II) was dissolved in 20 ml of a 1:1 mixture of tetrahydrofuran and water. The flask was sealed and connected to an inverted 2000 ml graduated cylinder, and then placed in a water bath at ca. 40° C. and the temperature was allowed to stabilize for 5 minutes. Ammonia borane was added to the mixture in ca. 1.0 g (0.0324 mol) portions. The first five runs were performed under an argon atmosphere and the last run was performed in air. The results are shown in Table 21.

A ruthenium diphosphine aminophosphine complex 2,2′-bis(diphenylphosphino)-1,1′-binaphthyl 2-(diphenylphosphino)ethanamine-dichlorideruthenium(II) was also tested. As indicated in Table 21, ammonia borane can be added repeatedly with the catalyst retaining significant activity over time.

Example 109

1,3-Bis((ditertiarybutylphosphino)methyl)benzenecarbonylchloro-ruthenium(II) catalyzed ammonia borane hydrolysis

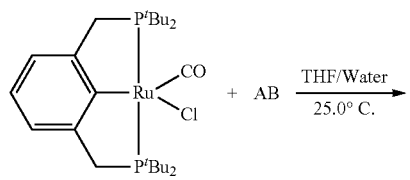

A 7.8 mg (0.0140 mmol) sample of 1,3-bis((ditertiarybutylphosphino)methyl)benzenecarbonylchlororuthenium(II) was dissolved in 80 ml of 1:1 tetrahydrofuran/water and the reaction vessel was placed in a water bath at 25.0° C. 500.3 mg of ammonia borane was added and the hydrogen evolution was measured. The results are shown in Table 22.

The activity of the 'PCP pincer complex 1,3-bis((ditertiarybutylphosphine)methyl)benzenecarbonylchlorideruthenium(II) towards ammonia borane hydrolysis was determined and was found to be of a similar magnitude to bis(2-(dicyclohexylphosphino)ethyl)aminechlorocyclooctenylhydridoiridium(III).

Example 110

Catalytic ammonia borane hydrolysis by catalyst derived from bis(2-(ditertiarybutylphosphino)ethyl)amine and trichlorooxybis(triphenylphosphine)-rhenium(V)

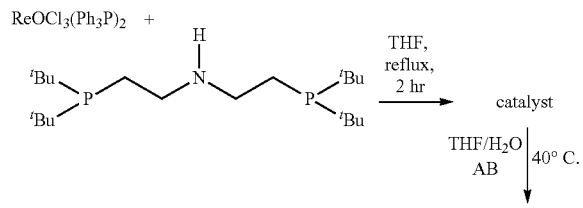

Rhenium catalyzed ammonia borane hydrolysis: 10 ml of tetrahydrofuran and 10 ml of water were added to 22 mg of the material formed in the reaction of trichlorooxybis(triphenylphosphinerhenium(V) with bis(dialkylphosphino)ethylamine (where alkyl=tertiarybutyl or isopropyl) above. 54 mg (1.749 mmol) of ammonia borane was added and the hydrogen evolution was recorded. A black solid appeared in the reaction mixture after ca. 14 minutes. The results are shown in Table 23.

Example 111

Solvent effects upon bis(2-(ditertiarybutylphosphino) ethyl)aminechlorocyclo-octenylhydridoiridium(III) [Ir(H)(Cl)(C$_8$H$_{13}$){NH(CH$_2$CH$_2$P$^t$Bu$_2$)$_2$}] catalyzed ammonia borane hydrolysis or solvolysis under pressure These reactions were carried out in a similar fashion and only the tetrahydrofuran/water sample is described: (a) A 1.980 g (0.641 mol) sample of ammonia borane was added to 150 ml of a 1:1 mixture of tetrahydrofuran/water in a ca. 600 ml Parr bomb. The bomb was sealed and sealed and the solution was pressurized to 24 psi with argon and then vented to atmospheric pressure (this process was repeated four times). A 1.03 mg (1 ml of a 1.03 mg/ml tetrahydrofuran solution, 1.5×10$^3$ mmol) of bis(2-(ditertiarybutylphosphino) ethyl)aminechlorocyclooctenylhydridoiridium(III) was added via syringe and then the vessel was sealed and the gas pressure was measured as a function of time. (b) For the ethanol/water run the ammonia borane mass was 2.0010 g (0.0648 mol) and the catalyst mass was 1.02 mg 1.5×10$^{-3}$ mmol). (c) For the 100% ethanol run the ammonia borane mass was 1.999 g (0.0648 mol) and the catalyst mass was 1.0 mg (1.4×10$^3$ mmol). The results are shown in Table 24.

Catalytic ammonia borane hydrolysis under pressure was investigated using bis(2-(ditertiarybutylphosphine)ethyl) aminechlorocyclooctenylhydrido iridium(III) as the catalyst. The ethanol/water (1:1) and tetrahydrofuran/water (1:1) runs afforded similar results. In absolute ethanol the reaction proceed faster than in either ethanol/water (1:1) or tetrahydrofuran/water (1:1).

Table 25 provides a summary of the catalysts tested and their respective catalytic activity with respect to ammonia borane hydrolysis.

Example 112

Effect of Alcohol Solvents on the Production of Hydrogen from Ammonia Borane

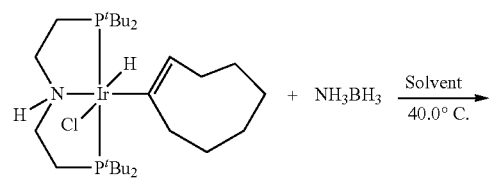

Experimental Procedure:

An 80 ml sample of the solvent was added to a 500 ml 3-necked flask and was heated to ca. 40° C. for 5 minutes. An L-shaped solid addition tube containing ca. 500 mg of ammonia borane was connected to the flask and then ca. 1 mg (1 ml of a 1 mg/ml solution of the catalyst in the appropriate solvent) of the catalyst bis(2-(di-tert-butylphosphino)ethyl)aminechlorocyclooctenylhydridoiridium(III) was added. The flask was sealed and was then inverted several times to add the ammonia borane to the reaction mixture. The gas volume was then recorded at one minute intervals.

a) Solvent=100% ethanol. Amount of ammonia borane: 500.3 mg (16.21 mmol); amount of bis(2-(di-tert-butylphosphino)ethyl)aminechlorocyclooctenyl-hydridoiridium (III): 1.00 mg (0.0014 mmol); T=40.0° C.
b) Solvent=50% ethanol, 50% water. Amount of ammonia borane: 500.0 mg (16.20 mmol); amount of bis(2-(di-tert-butylphosphino)ethyl)aminechlorocyclooctenyl-hydridoiridium(III): 0.99 mg (0.0014 mmol); T=40.0° C.
c) Solvent=100% n-butanol. Amount of ammonia borane: 501.7 mg (16.25 mmol); amount of bis(2-(di-tert-butylphosphino)ethyl)aminechlorocyclooctenyl-hydridoiridium(III): 1.03 mg (0.0015 mmol); T=40.0° C.
d) Solvent=50% n-butanol, 50% water. Amount of ammonia borane 500.7 mg (16.22 mmol); amount of bis(2-(di-tert-butylphosphino)ethyl)aminechlorocyclooctenyl-hydridoiridium(III): 0.98 mg (0.0014 mmol); T=41.0° C.
e) Solvent=100% isopropanol. Amount of ammonia borane: 503.3 mg (16.30 mmol); amount of bis(2-(di-tert-butylphosphino)ethyl)aminechlorocyclooctenyl-hydridoiridium(III): 1.02 mg (0.0015 mmol); T=40.7° C.
f) Solvent=75% isopropanol, 25% water. Amount of ammonia borane: 499.9 mg (16.19 mmol); amount of bis(2-(di-tert-butylphosphino)ethyl)aminechlorocyclooctenyl-hydridoiridium(III): 1.00 mg (0.0014 mmol); T=41.0° C.
g) Solvent=50% isopropanol, 50% water. Amount of ammonia borane: 500.0 mg (16.20 mmol); amount of bis(2-(di-tert-butylphosphino)ethyl)aminechlorocyclooctenyl-hydridoiridium(III): 1.02 mg (0.0015 mmol); T=42.0° C.
h) Solvent=25% isopropanol, 75% water. Amount of ammonia borane: 500.8 mg (16.22 mmol); amount of bis(2-(di-tert-butylphosphino)ethyl)aminechlorocyclooctenyl-hydridoiridium(III): 0.99 mg (0.0014 mmol); T=41.0° C.
i) Solvent=100% methanol. Amount of ammonia borane: 502.8 mg (16.29 mmol); amount of bis(2-(di-tert-butylphosphino)ethyl)aminechlorocyclooctenyl-hydridoiridium(III): 1.00 mg (0.0014 mmol); T=40.3° C.
j) Solvent=75% methanol, 25% water. Amount of ammonia borane: 502.7 mg (16.28 mmol); amount of bis(2-(di-tert-butylphosphino)ethyl)aminechlorocyclooctenyl-hydridoiridium(III): 1.06 mg (0.0015 mmol); T=40.0° C.
k) Solvent=50% methanol, 50% water. Amount of ammonia borane: 499.6 mg (16.18 mmol); amount of bis(2-(di-tert-butylphosphino)ethyl)aminechlorocyclooctenyl-hydridoiridium(III): 1.07 mg (0.0015 mmol); T=40.0° C.

Figure 16:
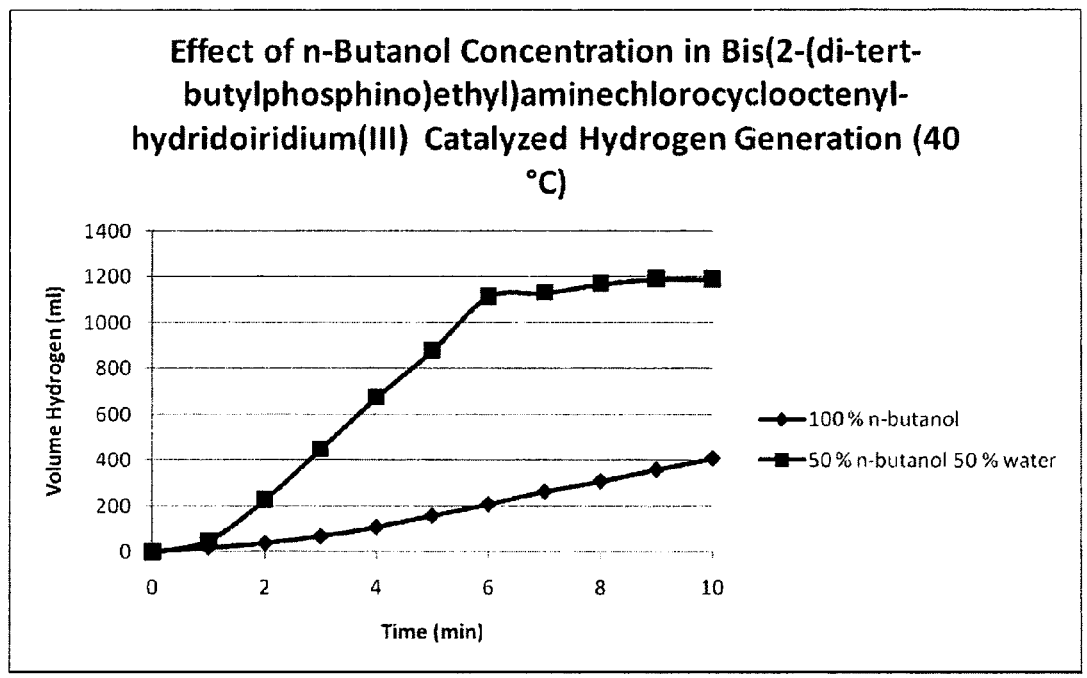
FIG. 16 is a graph showing the effect of n-butanol concentration in bis(2-(di-tert-butylphosphino)ethyl)aminechlorocyclooctenylhydridoiridium(III) catalyzed hydrogen generation (40° C.).

Results:

The effect of n-butanol concentration in bis(2-(di-tert-butylphosphino)ethyl)aminechlorocyclooctenylhydridoiridium(III) catalyzed hydrogen generation (40° C.) is shown in FIG. 16.

Figure 17:
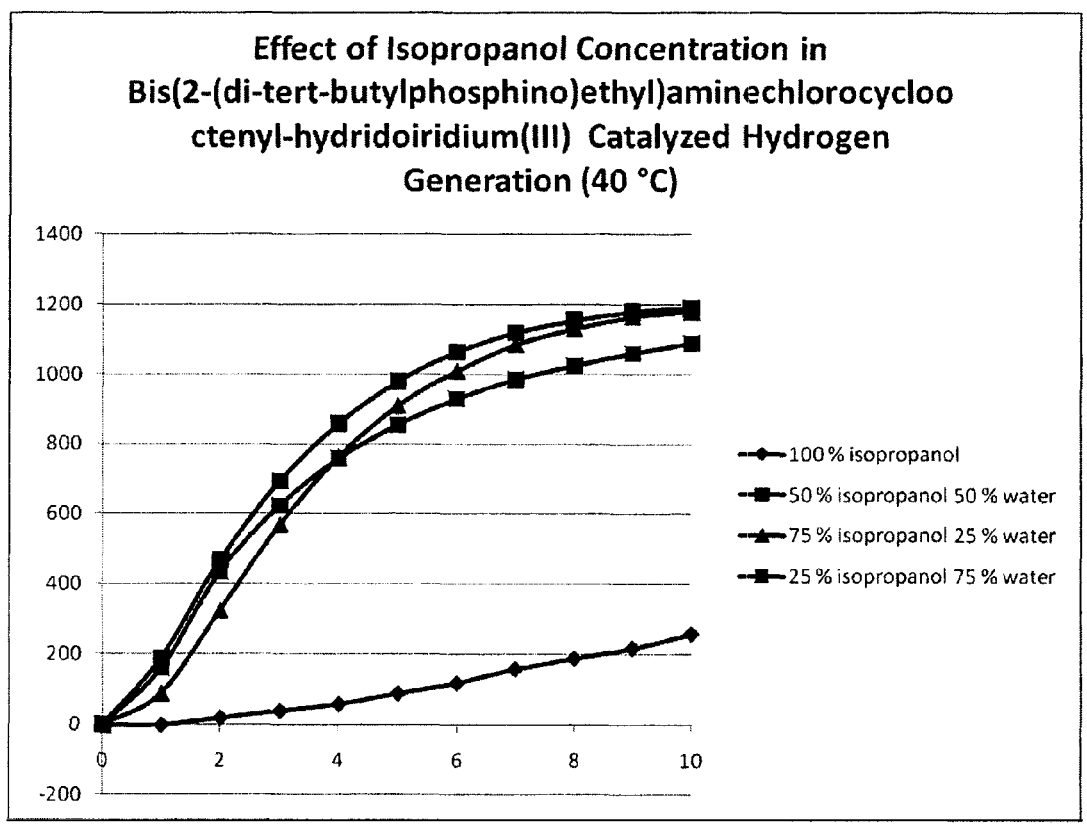
FIG. 17 is a graph showing the effect of isopropanol concentration in bis(2-(di-tert-butylphosphino)ethyl)aminechlorocyclooctenyl-hydridoiridium(III) catalyzed hydrogen generation (40° C.).

The effect of isopropanol concentration in bis(2-(di-tert-butylphosphino)ethyl)aminechlorocyclooctenyl-hydridoiridium(III) catalyzed hydrogen generation (40° C.) is shown in FIG. 17.

Figure 18:
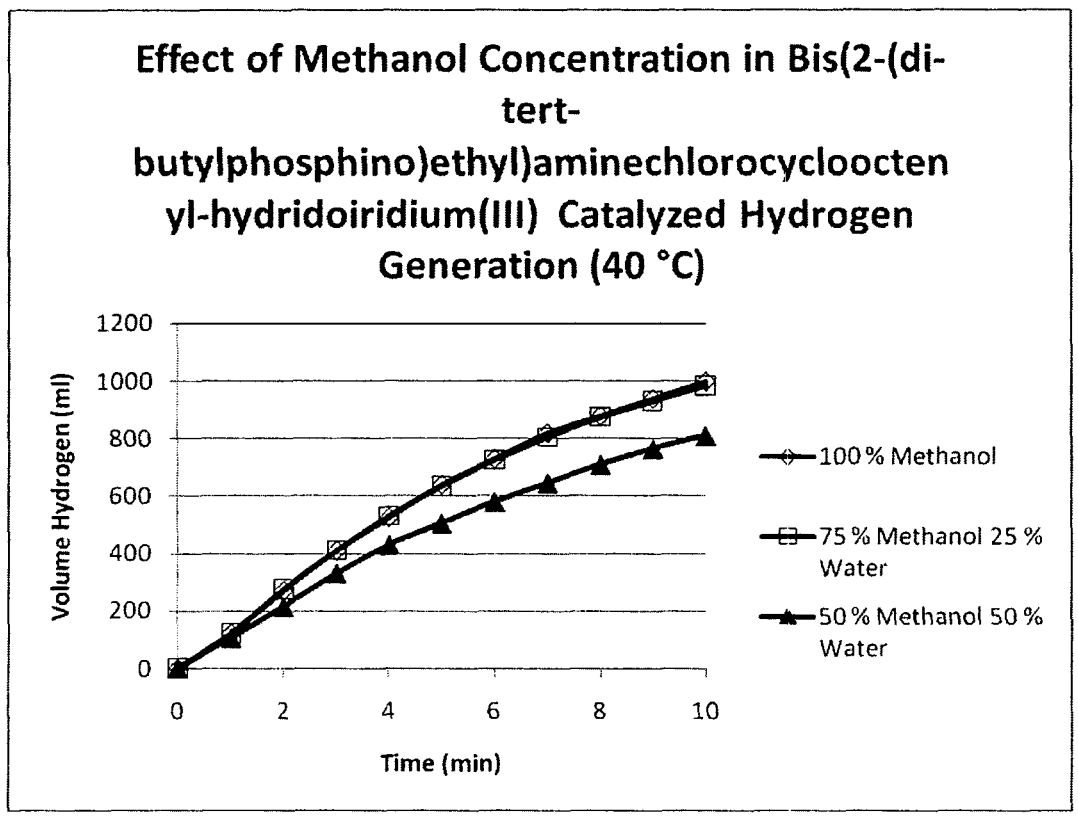
FIG. 18 shows the effect of methanol concentration in bis(2-(di-tert-butylphosphino)ethyl)aminechlorocyclooctenyl-hydridoiridium(III) catalyzed hydrogen generation (40° C.).

The effect of methanol concentration in bis(2-(di-tert-butylphosphino)ethyl)aminechlorocyclooctenyl-hydridoiridium(III) catalyzed hydrogen generation (40° C.) is shown in FIG. 18.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

Bis(2-(ditertiarybutylphosphino)ethyl)minechlorocyclooctenylhydridoiridium(III) catalyzed ammonia borane hydrolysis at 25° C.

| Time (min) | Vol $H_2$ (run 1, ml) | Vol $H_2$ (run 2, ml) | Vol $H_2$ (run 3, ml) |
|---|---|---|---|
| 0 | 0 | 0 | 0 |
| 1 | 98 | 240 | 240 |
| 2 | 285 | 490 | 510 |
| 3 | 515 | 675 | 710 |
| 4 | 705 | 800 | 835 |
| 5 | 830 | 860 | 900 |
| 6 | 890 | 900 | 920 |
| 7 | 915 | 915 | 925 |
| 8 | 920 | 920 | 925 |
| 9 | 920 | 920 | 925 |
| 10 | 920 | 920 | 925 |

TABLE 2

Bis(2-(ditertiarybutylphosphino)ethyl)aminechlorocyclooctenylhydridoiridium(III) catalyzed ammonia borane hydrolysis at 40° C.

| Time (min) | Run 1 (vol $H_2$, ml) | Run 2 (vol $H_2$, ml) | Run 3 (vol $H_2$, ml) |
|---|---|---|---|
| 0 | 0 | 0 | 0 |
| 1 | 120 | 165 | 115 |
| 2 | 290 | 345 | 255 |
| 3 | 440 | 485 | 380 |
| 4 | 565 | 605 | 485 |
| 5 | 670 | 710 | 570 |
| 6 | 745 | 765 | 645 |
| 7 | 810 | 810 | 710 |
| 8 | 855 | 850 | 760 |
| 9 | 890 | 870 | 800 |
| 10 | 910 | 895 | 830 |
| 11 | 925 | 905 | 830 |

TABLE 3

Effect of ammonia borane purity in bis(2-(ditertiarybutylphosphino)ethyl)aminechlorocyclooctenylhydridoiridium(III) catalyzed ammonia borane hydrolysis at 40° C.

| Time (min) | Vol (ml, std 1) | Vol (ml, std 2) | Vol (ml, pure ammonia borane 1) | Vol (ml, pure ammonia borane 2) | Vol (ml, impure ammonia borane 1) | Vol (ml, impure ammonia borane 2) |
|---|---|---|---|---|---|---|
| 0 | 0 | 0 | 0 | 0 | 0 | 0 |
| 1 | 120 | 165 | 80 | 225 | 20 | 120 |
| 2 | 290 | 345 | 270 | 435 | 145 | 280 |
| 3 | 440 | 485 | 485 | 605 | 290 | 430 |
| 4 | 565 | 605 | 670 | 745 | 415 | 520 |
| 5 | 670 | 710 | 820 | 855 | 500 | 590 |
| 6 | 745 | 765 | 925 | 940 | 570 | 640 |
| 7 | 810 | 810 | 1000 | 1005 | 610 | 670 |
| 8 | 855 | 850 | 1040 | 1050 | 640 | 690 |
| 9 | 890 | 870 | 1070 | 1080 | 650 | 700 |
| 10 | 910 | 895 | 1085 | 1110 | 660 | 710 |

TABLE 4

Solvent comparison (diglyme, triglyme or tetrahydrofuran) in bis(2-(ditertiarybutylphosphino)ethyl)aminechlorocyclooctenyl-hydridoiridium(III) catalyzed ammonia borane hydrolysis at 25° C.

| Time (min) | Vol (ml, std 1) | Vol (ml, std 2) | Vol (ml, diglyme 1) | Vol (ml, diglyme 2) | Triglyme (ml, run 2) |
|---|---|---|---|---|---|
| 0 | 0 | 0 | 0 | 0 | 0 |
| 1 | 120 | 165 | 100 | 182 | 40 |
| 2 | 290 | 345 | 325 | 378 | 75 |
| 3 | 440 | 485 | 522 | 535 | 115 |
| 4 | 565 | 605 | 665 | 660 | 155 |
| 5 | 670 | 710 | 765 | 752 | 195 |
| 6 | 745 | 765 | 832 | 820 | 235 |
| 7 | 810 | 810 | 875 | 865 | 272 |
| 8 | 855 | 850 | 905 | 895 | 310 |
| 9 | 890 | 870 | 920 | 920 | 345 |
| 10 | 910 | 895 | 925 | 925 | 380 |

TABLE 5

Solvent comparison (ethanol vs. tetrahydrofuran) in bis(2-(ditertiary-butylphosphino)ethyl)aminechlorocyclooctenylhydridoiridium(III) catalyzed ammonia borane hydrolysis at 40° C.

| Time (min) | Vol (ml, std 1) | Vol (ml, std 2) | Vol (ml, std 3) | Vol (ml, EtOH 1) | Vol (ml, EtOH 2) | Vol (ml, EtOH 3) |
|---|---|---|---|---|---|---|
| 0 | 0 | 0 | 0 | 0 | 0 | 0 |
| 1 | 120 | 165 | 115 | 90 | 160 | 120 |
| 2 | 290 | 345 | 255 | 240 | 320 | 260 |
| 3 | 440 | 485 | 380 | 400 | 460 | 390 |
| 4 | 565 | 605 | 485 | 540 | 580 | 500 |
| 5 | 670 | 710 | 570 | 660 | 670 | 590 |
| 6 | 745 | 765 | 645 | 740 | 750 | 670 |
| 7 | 810 | 810 | 710 | 820 | 810 | 745 |
| 8 | 855 | 850 | 760 | 870 | 860 | 800 |
| 9 | 890 | 870 | 800 | 915 | 890 | 850 |
| 10 | 910 | 895 | 830 | 940 | 920 | 890 |
| 11 | 925 | 905 | 830 | 960 | 940 | 920 |

TABLE 6

Effect of ethanol concentration on rate of bis(2-(ditertiarybutyl-phosphino)ethyl)aminechlorocyclooctenylhydridoiridium(III) [Ir(H)(Cl)($\eta^1$-C$_8$H$_{13}$){NH(CH$_2$CH$_2$P$^t$Bu$_2$)$_2$}] catalyzed ammonia borane hydrolysis at 40° C.

| Time (min) | Std run 1 | 25% ethanol | 19% ethanol | 12.5% ethanol | 75% ethanol | 100% ethanol |
|---|---|---|---|---|---|---|
| 0 | 0 | 0 | 0 | 0 | 0 | 0 |
| 1 | 120 | 150 | 100 | 100 | 180 | 110 |
| 2 | 290 | 320 | 200 | 200 | 480 | 350 |
| 3 | 440 | 460 | 300 | 300 | 740 | 710 |
| 4 | 565 | 580 | 380 | 380 | 900 | 1050 |
| 5 | 670 | 660 | 460 | 440 | 1020 | 1160 |
| 6 | 745 | 740 | 530 | 510 | 1080 | 1180 |
| 7 | 810 | 800 | 600 | 580 | 1120 | 1180 |
| 8 | 855 | 850 | 660 | 620 | 1140 | 1180 |
| 9 | 890 | 900 | 720 | 680 | 1160 | 1180 |
| 10 | 910 | 920 | 780 | 720 | 1160 | 1180 |
| 11 | 925 | 960 | 820 | 760 | 1160 | 1180 |

TABLE 7

Effect of added inorganic salts (i.e. sodium chloride, lithium chloride or tetraethyl ammonium chloride) in bis(2-(ditertiarybutylphosphino)ethyl)-aminechlorocyclooctenylhydridoiridium(III) [Ir(H)(Cl)($\eta^1$-C$_8$H$_{13}$){NH(CH$_2$CH$_2$P$^t$Bu$_2$)$_2$}] catalyzed ammonia borane hydrolysis.

| Time (min) | Vol (ml, std. 1) | Vol (ml, NaCl) | Vol (ml, LiCl) | Vol (ml, Et4NCl) |
|---|---|---|---|---|
| 0 | 0 | 0 | 0 | 0 |
| 1 | 120 | 0 | 90 | 50 |
| 2 | 290 | 10 | 210 | 180 |
| 3 | 440 | 20 | 330 | 320 |
| 4 | 565 | 25 | 430 | 445 |
| 5 | 670 | 35 | 505 | 550 |
| 6 | 745 | 40 | 565 | 640 |
| 7 | 810 | 50 | 605 | 710 |
| 8 | 855 | 60 | 640 | 755 |
| 9 | 890 | 65 | 665 | 790 |
| 10 | 910 | 75 | 680 | 810 |

TABLE 8

Effect of hydrogen (structure I) vs. methyl (structure II) substituents on nitrogen in bis(2-(ditertiarybutylphosphino)ethyl)amine type iridium complexes in catalytic ammonia borane hydrolysis at 40° C.

| | Structure I | | | Structure II | | |
|---|---|---|---|---|---|---|
| Time (min) | Vol (ml, std 1) | Vol (ml, std 2) | Vol (ml, std 3) | Vol (ml, run 1) | Vol (ml, run 2) | Vol (ml, run 3) |
| 0 | 0 | 0 | 0 | 0 | 0 | 0 |
| 1 | 120 | 165 | 115 | 40 | 80 | 80 |
| 2 | 290 | 345 | 255 | 125 | 150 | 135 |
| 3 | 440 | 485 | 380 | 210 | 220 | 190 |
| 4 | 565 | 605 | 485 | 295 | 280 | 250 |
| 5 | 670 | 710 | 570 | 370 | 340 | 300 |
| 6 | 745 | 765 | 645 | 435 | 410 | 350 |
| 7 | 810 | 810 | 710 | 495 | 500 | 450 |
| 8 | 855 | 850 | 760 | 550 | 550 | 495 |
| 9 | 890 | 870 | 800 | 605 | 595 | 540 |
| 10 | 910 | 895 | 830 | 655 | 605 | 580 |
| 11 | 925 | 905 | 830 | 700 | 630 | 620 |

TABLE 9

Bis(2-(diadamantylphosphino)ethyl)aminechlorodihydridoiridium(III) catalyzed ammonia borane hydrolysis at 25° C.

| Time (min) | Vol H$_2$ (ml, std. 1) | Vol H$_2$ (ml, run 1) | Vol H$_2$ (ml, run 2) | Vol H$_2$ (ml, run 3) |
|---|---|---|---|---|
| 0 | 0 | 0 | 0 | 0 |
| 1 | 220 | 285 | 255 | 240 |
| 2 | 535 | 510 | 490 | 490 |
| 3 | 710 | 625 | 635 | 675 |
| 4 | 770 | 680 | 715 | 800 |
| 5 | 790 | 690 | 745 | 860 |
| 6 | 790 | 700 | 745 | 900 |

TABLE 10

Bis(2-(diadamantylphosphino)ethyl)
aminechlorodihydridoiridium(III) catalyzed
ammonia borane hydrolysis at 40° C.

| Time (min) | Vol (std 1 ml) | Vol (ml, run 1) | Vol (ml, run 2) | Vol (ml, run 3) |
|---|---|---|---|---|
| 0 | 0 | 0 | 0 | 0 |
| 1 | 120 | 70 | 55 | 65 |
| 2 | 290 | 165 | 130 | 110 |
| 3 | 440 | 255 | 200 | 160 |
| 4 | 565 | 340 | 270 | 210 |
| 5 | 670 | 415 | 310 | 250 |
| 6 | 745 | 470 | 355 | 285 |
| 7 | 810 | 525 | 395 | 320 |
| 8 | 855 | 560 | 420 | 350 |
| 9 | 890 | 590 | 445 | 375 |
| 10 | 910 | 605 | 465 | 400 |

TABLE 11

Bis(2-(dicyclohexylphosphino)ethyl)
aminechlorodihydridoiridium(III) catalyzed
ammonia borane hydrolysis at 25° C.

| Time (min) | Vol $H_2$ (ml, std. 1) | Vol $H_2$ (ml, run 1) |
|---|---|---|
| 0 | 0 | 0 |
| 1 | 220 | 15 |
| 2 | 535 | 25 |
| 3 | 710 | 40 |
| 4 | 770 | 55 |
| 5 | 790 | 70 |
| 6 |  | 85 |
| 7 |  | 100 |
| 8 |  | 115 |
| 9 |  | 125 |
| 10 |  | 140 |

TABLE 12

Bis(2-(dicyclohexylphosphino)ethyl)
aminechlorodihydridoiridium(III) catalyzed
ammonia borane hydrolysis at 40° C.

| Time (min) | Vol $H_2$ (ml, std. 1) | Vol $H_2$ (ml, run 1) |
|---|---|---|
| 0 | 0 | 0 |
| 1 | 120 | 10 |
| 2 | 290 | 22 |
| 3 | 440 | 45 |
| 4 | 565 | 65 |
| 5 | 670 | 80 |
| 6 | 745 | 100 |
| 7 | 810 | 115 |
| 8 | 855 | 130 |
| 9 | 890 | 145 |
| 10 | 910 | 160 |
| 11 | 925 | 170 |
| 12 |  | 185 |
| 13 |  | 195 |
| 14 |  | 207 |
| 15 |  | 220 |
| 16 |  | 230 |
| 17 |  | 240 |
| 18 |  | 250 |
| 19 |  | 260 |
| 20 |  | 270 |

TABLE 13

2,6-Bis((diisopropylphosphino)
methyl)pyridinedichlorohydridoiridium(III)
catalyzed ammonia borane hydrolysis at 25° C.

| Time (min) | Volume $H_2$ (ml) |
|---|---|
| 0 | 0 |
| 1 | 10 |
| 2 | 15 |
| 3 | 20 |
| 4 | 25 |
| 5 | 30 |
| 6 | 35 |
| 7 | 40 |
| 8 | 42 |
| 9 | 45 |
| 10 | 50 |
| 15 | 65 |
| 30 | 150 |

TABLE 14

Catalytic ammonia borane hydrolysis by catalyst derived
from bis(2-(diisopropylphosphino)-4-methylphenyl)amine
and chlorobis(cyclooctene)iridium(I) dimer.

| Time (min) | Vol (ml) |
|---|---|
| 0 | 0 |
| 1 | 10 |
| 2 | 30 |
| 3 | 45 |
| 4 | 60 |
| 5 | 75 |
| 6 | 80 |
| 7 | 90 |
| 8 | 100 |
| 9 | 105 |
| 10 | 110 |

TABLE 15

Bis(2-(ditertiarybutylphosphino)ethyl)
amine-2,4-pentanedionaterhodium(I) catalyzed
ammonia borane hydrolysis at 40° C.

| Time (min) | Volume $H_2$ (ml) |
|---|---|
| 0 | 0 |
| 1 | 20 |
| 2 | 25 |
| 3 | 35 |
| 4 | 40 |
| 5 | 40 |
| 6 | 40 |
| 7 | 45 |
| 8 | 55 |
| 9 | 60 |
| 10 | 65 |
| 11 | 75 |
| 12 | 80 |
| 13 | 90 |
| 14 | 100 |
| 15 | 115 |
| 16 | 120 |
| 17 | 125 |
| 18 | 135 |
| 20 | 150 |
| 22 | 165 |
| 27 | 200 |
| 30 | 225 |
| 40 | 285 |

TABLE 16

Bis(2-(diisopropylphosphino)ethyl)aminedichlorocobalt(II) [Co{HN(CH$_2$CH$_2$P$^i$Pr$_2$)$_2$}Cl$_2$] catalyzed ammonia borane hydrolysis at 40° C.

| Time (min) | Total Vol. H$_2$ (ml) | Amount ammonia borane |
|---|---|---|
| 0 | 0 | 2.423 g |
| 0.5 | 125 | |
| 1 | 688 | |
| 1.5 | 2888 | |
| 2 | 5250 | |
| 3 | 6010 | 954 mg |
| 3.5 | 6625 | |
| 4 | 6925 | |
| 4.5 | 7488 | 980 mg |
| 5 | 8445 | |
| 5.5 | 8738 | |
| 6 | 8800 | |
| 6.5 | 9040 | 880 mg |
| 7 | 9550 | |
| 7.5 | 10050 | |
| 8 | 10200 | |
| 8.5 | 10400 | |
| 9 | 10640 | 955 mg |
| 9.5 | 10940 | |
| 10 | 11160 | |
| 10.5 | 11400 | |
| 11 | 11587 | |
| 11.5 | 11775 | |
| 12 | 11900 | |
| 12.5 | 12000 | |
| 13.5 | 12150 | |
| 14 | 12338 | 960 mg |
| 14.5 | 12713 | |
| 15 | 13030 | |
| 15.5 | 13290 | |
| 16 | 13525 | |
| 16.5 | 13650 | |
| 17 | 13750 | |
| 17.5 | 13800 | |
| 18 | 13850 | |
| 19 | 14000 | |

TABLE 17

Bis(2-(diphenylphosphino)ethyl)aminedichlorocobalt(II) [Co{HN(CH$_2$CH$_2$PPh$_2$)$_2$}Cl$_2$] catalyzed ammonia borane hydrolysis (41° C.).

| Time (min) | Total Vol H$_2$ (ml) | Amount Ammonia Borane |
|---|---|---|
| 0 | 0 | |
| 0.5 | 2.4 | 48 mg |
| 1 | 10.6 | |
| 1.5 | 28.8 | |
| 2 | 54.6 | |
| 2.5 | 76 | |
| 3 | 80.4 | |
| 3.5 | 81.1 | |
| 4 | 81.2 | |
| 4.5 | 81.4 | |
| 5 | 81.5 | |
| 5.5 | 118.5 | |
| 6 | 146 | 49 mg |
| 6.5 | 155.7 | |
| 7 | 159 | |
| 7.5 | 159.9 | |
| 8 | 160.3 | |
| 8.5 | 160.7 | |
| 9 | 160.8 | |
| 10.5 | 223.9 | |
| 11 | 229.6 | |
| 11.5 | 232.2 | |
| 12 | 233.5 | |
| 12.5 | 234.2 | |
| 13 | 234.6 | |
| 13.5 | 234.8 | |
| 14 | 235 | |
| 14.5 | 264 | |
| 15 | 277.4 | 51 mg |
| 15.5 | 291.8 | |
| 16 | 300.2 | |
| 16.5 | 305 | |
| 17 | 307.7 | |
| 17.5 | 309.3 | |
| 18 | 310.1 | |
| 18.5 | 310.9 | |
| 19 | 311.2 | |
| 19.5 | 319.3 | |
| 20 | 331.6 | 55 mg |
| 20.5 | 342.4 | |
| 21 | 351.5 | |
| 21.5 | 359.4 | |
| 22 | 365.4 | |
| 22.5 | 370.7 | |
| 23 | 375 | |
| 23.5 | 378.8 | |
| 24 | 381.9 | |
| 25 | 386.6 | |
| 26 | 390 | |
| 29 | 396.1 | |

TABLE 18

Bis(2-(dicyclohexylphosphino)ethyl)aminedichlorocobalt(II) [CoCl$_2${NH(CH$_2$CH$_2$PCy$_2$)$_2$}] catalyzed ammonia borane hydrolysis utilizing standard 40° C. conditions.

| Time (min) | Vol (ml) |
|---|---|
| 0 | 0 |
| 1 | 15 |
| 2 | 20 |
| 3 | 30 |
| 4 | 30 |
| 5 | 40 |
| 6 | 40 |
| 7 | 42 |
| 8 | 45 |
| 9 | 50 |
| 10 | 55 |

TABLE 19

Bis(2-(diisopropylphosphino)ethyl)aminedichlorocobalt(II) [CoCl$_2${NH(CH$_2$CH$_2$P$^i$Pr$_2$)$_2$}] vs. bis(2-(diisopropylphosphino)ethyl)aminedibromonickel(II) [NiBr$_2${NH(CH$_2$CH$_2$P$^i$Pr$_2$)$_2$}] catalyzed ammonia borane hydrolysis with standardized conditions (25.0° C.).

| Time (min) | Vol H$_2$ (ml, cobalt) | Vol H$_2$ (ml, nickel) |
|---|---|---|
| 0 | 0 | 0 |
| 1 | 5 | 0 |
| 2 | 10 | 5 |
| 3 | 15 | 5 |
| 4 | 20 | 10 |
| 5 | 30 | 12 |
| 6 | 40 | 20 |

TABLE 19-continued

Bis(2-(diisopropylphosphino)ethyl)aminedichlorocobalt(II) [$CoCl_2\{NH(CH_2CH_2P^iPr_2)_2\}$] vs. bis(2-(diisopropylphosphino)ethyl)aminedibromonickel(II) [$NiBr_2\{NH(CH_2CH_2P^iPr_2)_2\}$] catalyzed ammonia borane hydrolysis with standardized conditions (25.0° C.).

| Time (min) | Vol $H_2$ (ml, cobalt) | Vol $H_2$ (ml, nickel) |
|---|---|---|
| 7 | 55 | 25 |
| 8 | 62 | 30 |
| 9 | 75 | 35 |
| 10 | 85 | 50 |
| 11 | 100 | 55 |
| 12 | 110 | 65 |
| 13 | 120 | 70 |
| 14 | 130 | 80 |
| 15 | 140 | 90 |
| 16 | 145 | 95 |
| 17 | 155 | 100 |
| 18 | 163 | 110 |
| 19 | 175 | 112 |
| 20 | 180 | 120 |
| 25 | 220 | 140 |

TABLE 20

Bis(2-(diisopropylphosphino)ethyl)aminedichlororuthenium(II) dimer vs. iridium standard catalyzed ammonia borane hydrolysis at 40° C.

| Time (min) | Vol $H_2$ (std 1) | Vol $H_2$ (std 2) | Vol $H_2$ (std 3) | Vol $H_2$ (Ru complex) |
|---|---|---|---|---|
| 0 | 0 | 0 | 0 | 0 |
| 1 | 120 | 165 | 115 | 5 |
| 2 | 290 | 345 | 255 | 35 |
| 3 | 440 | 485 | 380 | 70 |
| 4 | 565 | 605 | 485 | 120 |
| 5 | 670 | 710 | 570 | 165 |
| 6 | 745 | 765 | 645 | 180 |
| 7 | 810 | 810 | 710 | 220 |
| 8 | 855 | 850 | 760 | 260 |
| 9 | 890 | 870 | 800 | 300 |
| 10 | 910 | 895 | 830 | 340 |
| 11 | 925 | 905 | 830 | 380 |

TABLE 21

2,2'-Bis(diphenylphosphino)-1,1'-binaphthyl 2-(diphenylphosphino)ethanaminedichlororuthenium(II) [$Ru(binap)(H_2NCH_2CH_2PPh_2)Cl_2$] catalyzed ammonia borane hydrolysis.

| Time (min) | Volume (ml) |
|---|---|
| 0 | 0 |
| 1 | 60 |
| 2 | 210 |
| 3 | 570 |
| 4 | 1540 |
| 5 | 1960 |
| 6 | 2000 |
| 7 | 2110 |
| 8 | 2430 |
| 9 | 2920 |
| 10 | 3550 |
| 11 | 3960 |
| 12 | 4200 |
| 13 | 4630 |
| 14 | 5230 |
| 15 | 5775 |
| 16 | 6095 |
| 17 | 6625 |
| 18 | 7255 |
| 19 | 7720 |
| 20 | 7960 |
| 21 | 8100 |
| 22 | 8450 |
| 23 | 8740 |
| 24 | 8950 |
| 25 | 9230 |
| 27 | 9645 |
| 28 | 9755 |
| 29 | 9855 |
| 30 | 9900 |
| 32 | 10025 |
| 33 | 10130 |
| 34 | 10315 |
| 35 | 10620 |
| 36 | 11060 |
| 37 | 11490 |
| 38 | 11780 |
| 39 | 11900 |

TABLE 22

1,3-Bis((ditertiarybutylphosphino)methyl)benzenecarbonylchlororuthenium(II) catalyzed ammonia borane hydrolysis.

| Time (min) | Vol $H_2$ (ml) |
|---|---|
| 0 | 0 |
| 1 | 2 |
| 2 | 5 |
| 3 | 15 |
| 4 | 20 |
| 5 | 25 |
| 6 | 30 |
| 7 | 35 |
| 8 | 40 |
| 9 | 40 |
| 10 | 45 |
| 11 | 45 |
| 12 | 50 |
| 13 | 50 |
| 14 | 55 |
| 15 | 55 |
| 16 | 59 |
| 17 | 60 |
| 18 | 60 |
| 19 | 60 |
| 20 | 62 |
| 25 | 80 |

TABLE 23

Catalytic ammonia borane hydrolysis by catalyst derived from bis(2-(ditertiarybutylphosphino)ethyl)amine and trichlorooxybis(triphenylphosphine)rhenium(V) (40° C.).

| Time (min) | Volume (ml) |
|---|---|
| 0 | 0 |
| 1 | 6 |
| 2 | 7.8 |
| 3 | 9.2 |
| 4 | 10.6 |
| 5 | 12.5 |
| 6 | 14.1 |
| 7 | 15.6 |
| 8 | 17.4 |
| 9 | 18.9 |
| 10 | 20.8 |
| 15 | 28.7 |

TABLE 24

Solvent effects on bis(2-di-tert-butylphosphine)ethyl)aminechlorocyclooct-1-enyldihydridoiridium(III) catalyzed ammonia borane hydrolysis under pressure at 40° C.

| Time (min) | THF/Water (psi) | Ethanol/Water (psi) | Ethanol (psi) |
|---|---|---|---|
| 1 | 5 | 7.5 | 5 |
| 2 | 12.5 | 20 | 11 |
| 3 | 19 | 25 | 20 |
| 4 | 26 | 35 | 32 |
| 5 | 32.5 | 42 | 42 |
| 6 | 39 | 48 | 52 |
| 7 | 45 | 53 | 63 |
| 8 | 51 | 58 | 72 |
| 9 | 56 | 62 | 80 |
| 10 | 61 | 65 | 87 |
| 11 | 66 | 68 | 92 |
| 12 | 71 | 73 | 96 |
| 13 | 73.5 | 75 | 100 |
| 14 | 77.5 | 78 | 102 |
| 15 | 81 | 83 | 102 |
| 16 | 83 | 84 | 103 |
| 17 | 85.5 | 85 | 105 |
| 18 | 88 | 87 | 105 |
| 19 | 91 | 87 | 105 |
| 20 | 92 | 90 | 105 |
| 21 | 94 | 92 | 105 |
| 22 | 95 | 93 | 105 |
| 23 | 97 | 94 | 105 |
| 24 | 98 | 95 | 105 |
| 25 | 98.5 | 96 | 105 |
| 26 | 99.5 | 96 | 105 |
| 27 | 100 | 97 | 105 |
| 28 | 101 | 98 | 105 |
| 29 | 102 | 99 | 105 |
| 30 | 103 | 100 | 105 |

TABLE 25

Summary of Catalysts and Catalytic Ammonia Borane Hydrolysis.

| Catalyst | $NH_3BH_3$/water |
|---|---|
| [Ru complex with pyridine-bis(imidazole) ligand, Br, nBu, CO] | Moderate hydrogen evolution |
| [BINAP-Ru-Cl2 with ethylenediamine] | Excellent hydrogen evolution |
| [BINAP-Ru-Cl2 with diaminocyclohexane] | Active |
| [Ru complex with ethylenediamine and phosphine ligands, Cl2], R = $^i$Pr, $^t$Bu, Ph | Moderate hydrogen evolution |

TABLE 25-continued

Summary of Catalysts and Catalytic Ammonia Borane Hydrolysis.

| Catalyst | $NH_3BH_3$/water |
|---|---|
| [Ru complex with bis-phospholane ligand and ethylenediamine, with Cl ligands] | Moderate hydrogen evolution |
| [Ru cationic complex with two Ph3P, ethylenediamine, H2 and Cl] | Good hydrogen evolution |
| [Ru complex with two Ph3P, ethylenediamine, two Cl] | Good activity |
| [Ru complex with PNP pincer ligand ($P^iPr_2$), PPh3, two Cl] | Good activity |
| [(p-cymene)Ru cationic complex with P,N ligand, Cl, Cl⁻ counterion] R = $^i$Pr, Ph | Moderate |
| [Ru complex with Ph3P, aminomethyl-thiophene ligand, two Cl] | Hydrogen evolution |
| $(Ph_3P)_3RuCl_2$ | Good hydrogen evolution, deposits black solid slowly. |
| [Co complex with PNP pincer ligand, $CoCl_2$] R = $^i$Pr, Ph | Moderate |

TABLE 25-continued

Summary of Catalysts and Catalytic Ammonia Borane Hydrolysis.

| Catalyst | NH$_3$BH$_3$/water |
|---|---|
| 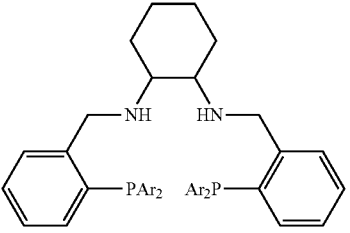  Ar = para-C$_6$H$_4$CH$_3$ | Hydrogen evolution |
| 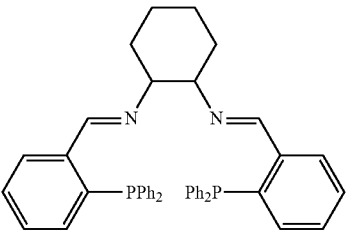 | Moderate activity |
| 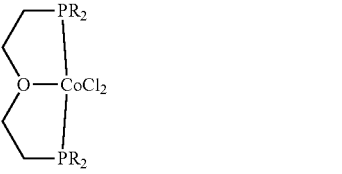  R = $^i$Pr, $^t$Bu | Moderate hydrogen formation, deposits black solid. |
| 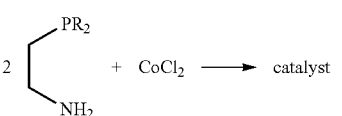  R = $^i$Pr, $^t$Bu | Active, deposits black solid |
| 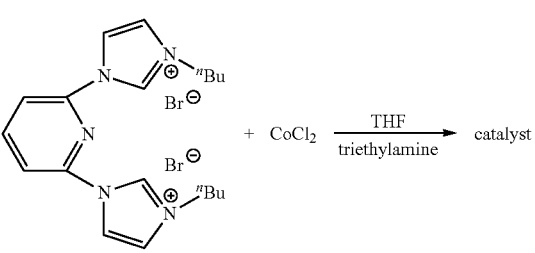 | Moderate hydrogen evolution, black solid deposited |
| 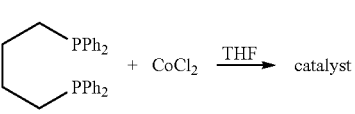 | Moderate hydrogen evolution, deposits black solid. |
| 2 PPh$_3$ + CoCl$_2$ $\xrightarrow{\text{THF}}$ catalyst | Moderate hydrogen evolution, deposits black solid. |

TABLE 25-continued

Summary of Catalysts and Catalytic Ammonia Borane Hydrolysis.

| Catalyst | NH$_3$BH$_3$/water |
|---|---|
| [Ir complex with PNP pincer ligand (P$^i$Bu$_2$), H, Cl, and cycloheptenyl; NH] | Excellent hydrogen evolution, long lifetime. |
| [Ir complex with PNP pincer ligand (P$^i$Bu$_2$), H, Cl, and cycloheptenyl; N–CH$_3$] | Excellent activity, long lifetime |
| [Ir complex with PNP pincer ligand (P$^i$Pr$_2$), H, H, Cl; NH] | Moderate hydrogen evolution, long lifetime. |
| PNP ligand (P$^i$Pr$_2$, N–CH$_3$) + 0.5 [Ir(coe)$_2$Cl]$_2$ / Toluene → catalyst | Good activity |
| PNP ligand (PPh$_2$, NH$_2$$^+$ Cl$^-$) + 0.5 [Ir(COE)$_2$Cl]$_2$ / THF, triethylamine → catalyst | Moderate hydrogen evolution |
| PNP ligand (PPh$_2$, N–CH$_3$) + 0.5 [Ir(COE)$_2$Cl]$_2$ / THF → catalyst | Moderate activity |
| POCOP ligand (resorcinol-based, O–P$^i$Pr$_2$) + 0.5 [Ir(COE)$_2$Cl]$_2$ → catalyst | Excellent hydrogen evolution |

TABLE 25-continued
Summary of Catalysts and Catalytic Ammonia Borane Hydrolysis.
| Catalyst | NH₃BH₃/water |
|---|---|
| 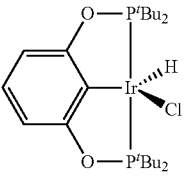 | Excellent hydrogen evolution |
| 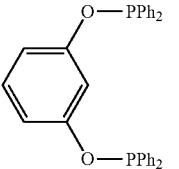 | Moderate hydrogen evolution |
| 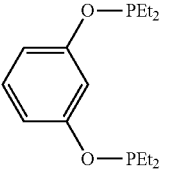 | Hydrogen evolution |
| 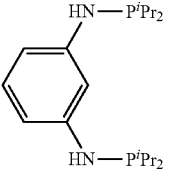 | Hydrogen evolution |
| 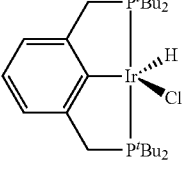 | Moderate hydrogen evolution |
| 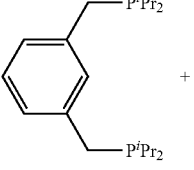 | Good hydrogen evolution |
| 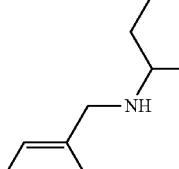 | Excellent hydrogen evolution |

TABLE 25-continued

Summary of Catalysts and Catalytic Ammonia Borane Hydrolysis.

| Catalyst | NH$_3$BH$_3$/water |
|---|---|
| 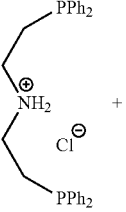 | Moderate activity |
| 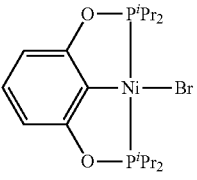 | Moderate hydrogen evolution, black solid deposited |
| 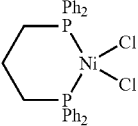 | Good hydrogen evolution, short lifetime |
| (Ph$_3$P)$_2$NiCl$_2$ | Moderate hydrogen evolution, deposits black solid in air. |
| Pd(PPh$_3$)$_4$ | Moderate hydrogen evolution, deposits black solid in air |
| 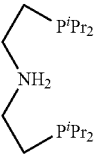 | Moderate hydrogen evolution |

Note that low activity = ≦ ca. 10 ml/min; moderate activity = 10-50 ml/minute, high activity = ≧ ca. 50 ml/minute.

We claim:

1. A process for the production of hydrogen comprising:
   (a) contacting a solution comprising at least one homogeneous ligand-stabilized metal catalyst with at least one compound of the formula I,

R$^1$R$^2$HNBHR$^3$R$^4$ (I), in a solvent under conditions for the solvolysis of at least one compound of formula (I) to form a homogeneous solution,
   wherein R$^1$, R$^2$, R$^3$ and R$^4$ are each simultaneously or independently selected from H, branched or unbranched fluoro-substituted-C$_{1-20}$alkyl, branched or unbranched C$_{1-20}$alkyl and C$_{6-14}$aryl or any two of R$^1$, R$^2$, R$^3$ and R$^4$ are linked to form a branched or unbranched C$_{2-10}$alkylene, which together with the nitrogen and/or boron atoms to which they are attached, forms a ring; and
   (b) optionally collecting hydrogen produced in the solvolysis of at least one compounds of formula (I).

2. The process according to claim 1, wherein R$^1$ to R$^4$ are different.

3. The process according to claim 1, wherein R$^1$, R$^2$, R$^3$ and R$^4$ are each simultaneously or independently selected from H, branched or unbranched fluoro-substituted-C$_{1-10}$alkyl, branched or unbranched C$_{1-10}$alkyl, and C$_{6-10}$aryl or any two of R$^1$, R$^2$, R$^3$ and R$^4$ are linked to form a branched or unbranched C$_{2-6}$alkylene, which together with the nitrogen and/or boron atoms to which they are attached, forms a ring.

4. The process according to claim 1, wherein R$^1$, R$^2$, R$^3$ and R$^4$ are each simultaneously or independently selected from H, branched or unbranched fluoro-substituted-C$_{1-6}$alkyl, branched or unbranched C$_{1-6}$alkyl, and phenyl or R$^1$ and R$^2$ and/or R$^3$ and R$^4$ are linked to form a branched or unbranched C$_{2-6}$alkylene, which together with the nitrogen atom and/or boron atom to which they are attached, forms a ring.

5. The process according to claim 1, wherein R$^1$, R$^2$, R$^3$ and R$^4$ are each H.

6. The process according to claim 1, wherein the solution comprising at least one homogeneous ligand-stabilized metal catalyst is a mixture of water and a water miscible solvent.

7. The process according to claim 6, wherein the ratio by volume of water to the water miscible solvent is between about 90:10 to about 10:90.

8. The process according to claim 7, wherein the ratio by volume is 50:50.

9. The process according to claim 8, wherein the water miscible solvent is an ether or an alcohol.

10. The process according to claim 9, wherein the ether is tetrahydrofuran.

11. The process according to claim 9, wherein the alcohol is ethanol.

12. The process according to claim 1, wherein the solution is an alcohol.

13. The process according to claim 12, wherein the alcohol is a $C_{1-10}$ alcohol.

14. The process according to claim 13, wherein the alcohol is a $C_{1-4}$ alcohol.

15. The process according to claim 14, wherein the alcohol is ethanol, methanol, 1-propanol, 2-propanol, 1-butanol or 2-butanol.

16. The process according to claim 1, wherein the metal catalyst comprises an alkali metal.

17. The process according to claim 16, wherein the alkali metal is lithium (Li), sodium (Na), potassium (K), rubidium (Rb), cesium (Cs) or francium (Fr).

18. The process according to claim 1, wherein the metal catalyst comprises an alkaline earth metal.

19. The process according to claim 18, wherein the alkaline earth metal is beryllium (Be), magnesium (Mg), calcium (Ca), strontium (Sr), barium (Ba) or radium (Ra).

20. The process according to claim 1, wherein the metal catalyst comprises a p-block metal.

21. The process according to claim 20, wherein the p-block metal is aluminum (Al), gallium (Ga), indium (In), tin (Sn), thallium (Tl), lead (Pb), or bismuth (Bi).

22. The process according to claim 1, wherein the metal catalyst comprises a d-block or transition metal.

23. The process according to claim 22, wherein the d-block or transition metal is scandium (Sc), titanium (Ti), vanadium (V), chromium (Cr), manganese (Mn), iron (Fe), cobalt (Co), nickel (Ni), copper (Cu), zinc (Zn), yttrium (Y) zirconium (Zr), niobium (Nb), molybdenum (Mo), technetium (Tc), ruthenium (Ru), palladium (Pd), silver (Ag), cadium (Cd), hafnium (Hf), tantalum (Ta), tungsten (W), rhenium (Re), rhodium (Rh), osmium (Os), iridium (Ir), platinum (Pt), gold (Au) or mercury (Hg).

24. The process according to claim 23, wherein the transition metal is ruthenium (Ru), cobalt (Co), nickel (Ni), rhodium (Rh) or iridium (Ir).

25. The process according to claim 1, wherein the metal catalyst comprises a lanthanide.

26. The process according to claim 25, wherein the lanthanide is lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) or lutetium (Lu).

27. The process according to claim 1, wherein the metal catalyst comprises an actinide.

28. The process according to claim 27, wherein the actinide is actinium (Ac), thorium (Th), protactinium (Pa), uranium (U), neptunium (Np), plutonium (Pu), americium (Am), curium (Cm), berkelium (Bk), californium (Cf), einsteinium (Es), fermium (Fm), mendelevium (Md), nobelium (No) or lawrencium (Li).

29. The process according to claim 1, wherein the catalyst comprises one or more ligands having at least one co-ordinating atom.

30. The process according to claim 29, wherein the co-ordinating atom is phosphorous, nitrogen, oxygen, carbon, silicon, germanium, sulfur, selenium or arsenic.

31. The process according to claim 29, wherein the ligand comprises a phosphine, arsine, diphosphine, imine, pyridine, amine, carbene, aminophosphine, diamine, aminodiphosphine, diaminodiphosphine, dicarbene, aminocarbene, phosphinocarbene, alcohol, ether, aminoether, phosphinoether, aminoalcohol or aminothiol group.

32. The process according to claim 29, wherein the ligands are selected from, one or more of:

(a) phosphines of the formula (II):

$$PR^5R^6R^7 \quad (II)$$

which bidentate or tridentate and are chiral or achiral monodentate phosphine ligands in which $R^5$, $R^6$ and $R^7$ are simultaneously or independently selected from unsubstituted or substituted $C_{1-10}$alkyl, unsubstituted or substituted $C_{2-10}$alkenyl, unsubstituted or substituted $C_{3-10}$cycloalkyl, unsubstituted or substituted $C_{6-14}$aryl, $OR^8$ and $N(R^8)_2$ and $R^8$ is simultaneously or independently selected from unsubstituted or substituted $C_{1-10}$alkyl, unsubstituted or substituted $C_{2-10}$alkenyl, unsubstituted or substituted $C_{3-10}$cycloalkyl, unsubstituted or substituted $C_{6-14}$aryl, or two of $R^5$, $R^6$, $R^7$ and $R^8$ are bonded together to form an unsubstituted or substituted ring having 4 to 8 atoms, including the phosphorous, nitrogen and/or oxygen atom to which said groups are bonded;

(b) bis(phosphino) bi-, tri- or tetradentate ligands of the formula (III):

$$R^9R^{10}P-Q^1-PR^{11}R^{12} \quad (III)$$

wherein $R^9$, $^{10}$, $R^{11}$ and $R^{12}$ are, independently, as defined for $R^5$, $R^6$ and $R^7$, and $Q^1$ is selected from unsubstituted or substituted $C_1$-$C_{10}$alkylene and unsubstituted or substituted $C_1$-$C_{10}$alkenylene where adjacent or geminal substituents on $Q^1$ are joined together to form, including the atoms to which they are attached, one or more unsubstituted or substituted 5-14-membered monocyclic, polycyclic, heterocyclic, carbocyclic, saturated, unsaturated or metallocenyl ring systems, and/or one or more of the carbon atoms in $Q^1$ is optionally replaced with a heteromoiety selected from O, S, NH and $N(C_{1-6}$alkyl) and $Q^1$ is chiral or achiral;

(c) bidentate ligands of the formula (IV):

$$R^{13}R^{14}P-Q^2-NR^{15}R^{16} \quad (IV)$$

wherein $R^{13}$ and $R^{14}$ are, independently, as defined for $R^5$-$R^7$, $Q^2$ is as defined for $Q^1$, and $R^{15}$ and $R^{16}$ are independently selected from H, $C_{6-14}$aryl, $C_{1-10}$alkyl and $C_{3-12}$cycloalkyl, with the $C_{6-14}$aryl and $C_{3-12}$cycloalkyl being optionally substituted;

(d) heterocyclic ligands of the formula (V):

$$Hy-Q^3-Hy \quad (V)$$

which are bi- or tridentate ligands wherein Hy is unsubstituted or substituted aromatic or non-aromatic heterocycle containing from 3 to 10 atoms of which 1 to 3 are a heteromoiety selected from O, S, N, NH and $NC_{1-6}$alkyl with the remaining atoms being C and $Q^3$ is as defined for $Q^1$;

(e) diaminophosphines of the formula (VI) or (VII):

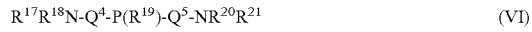

$$R^{17}R^{18}N-Q^4-P(R^{19})-Q^5-NR^{20}R^{21} \quad (VI)$$

or

$$R^{17}NH-Q^4-P(R^{19})-Q^5-NHR^{20} \quad (VII)$$

wherein
$R^{17}$-$R^{21}$ are, independently, as defined for $R^{15}$ and $R^{16}$, $R^{19}$ is as defined for $R^5$ and $Q^4$ and $Q^5$ are as defined for $Q^1$;
(f) diamines of the formula VIII or IX:

$$R^{22}R^{23}N\text{-}Q^6\text{-}NR^{24}R^{25} \quad \text{(VIII)}$$

or $$R^{22}NH\text{-}Q^6\text{-}NHR^{24} \quad \text{(IX)}$$

wherein
$R^{22}$-$R^{24}$ are, independently, as defined for $R^{15}$ and $R^{16}$ and $Q^6$ is as defined for $Q^1$;
(g) thiophenes of the formula (X):

$$T\text{-}Q^7\text{-}NH_2 \quad \text{(X)}$$

which are bidentate, wherein T is unsubstituted or substituted thiophene and $Q^7$ is as defined for $Q^1$; and
(h) amines of the formula (XI):

$$R^{25}S\text{-}Q^8\text{-}NH_2 \quad \text{(XI)}$$

which are bidentate, wherein $R^{25}$ is as defined for $R^5$, $R^6$ or $R^7$, S is sulphur and $Q^8$ is as defined for $Q^1$.

33. The process according to claim 1, wherein the process is performed at a temperature of between about 20° C. to about 60° C.

34. The process according to claim 33, wherein the process is performed at a temperature of 40° C.

35. The process according to claim 6, wherein the catalyst is dissolved in the mixture of water and the water miscible solvent to form a homogenous mixture.

36. The process according to claim 35, wherein the compound of formula I is added directly to the homogenous mixture.

37. The process according to claim 1, wherein the process is performed in an inert atmosphere.

38. The process according to claim 37, wherein the process is performed in an argon atmosphere.

39. A method for the hydrolysis of a compound of formula (I) as defined in claim 1 comprising contacting the compound of formula (I) with at least one homogeneous ligand-stabilized metal catalyst in the presence of water under conditions for the hydrolysis of the compound of formula (I).

40. A method for the solvolysis of a compound of formula (I) as defined in claim 1 comprising contacting the compound of formula (I) with at least one homogeneous ligand-stabilized metal catalyst in the presence of a solvent under conditions for the solvolysis of the compound of formula (I).

* * * * *

UNITED STATES PATENT AND TRADEMARK OFFICE
CERTIFICATE OF CORRECTION

PATENT NO. : 8,518,368 B2  
APPLICATION NO. : 12/600712  
DATED : August 27, 2013  
INVENTOR(S) : Kamaluddin Abdur-Rashid et al.

Page 1 of 1

It is certified that error appears in the above-identified patent and that said Letters Patent is hereby corrected as shown below:

In the Claims

Column 115, Line 61, replace "(Li)." with --(Lr).--.

Signed and Sealed this  
Fourth Day of February, 2014

Michelle K. Lee  
*Deputy Director of the United States Patent and Trademark Office*